(12) United States Patent  (10) Patent No.: US 9,268,364 B2
Parker  (45) Date of Patent: Feb. 23, 2016

(54) ERGONOMIC DATA ENTRY DEVICE

(75) Inventor: Mark Andrew Parker, Cincinnati, OH (US)

(73) Assignee: TREWGrip, LLC, Cincinnati, OH (US)

( * ) Notice: Subject to any disclaimer, the term of this patent is extended or adjusted under 35 U.S.C. 154(b) by 272 days.

(21) Appl. No.: 13/600,564

(22) Filed: Aug. 31, 2012

(65) Prior Publication Data

US 2014/0062885 A1 Mar. 6, 2014

(51) Int. Cl.
G06F 1/16 (2006.01)
G06F 3/02 (2006.01)
G06F 3/023 (2006.01)

(52) U.S. Cl.
CPC ............ *G06F 1/1632* (2013.01); *G06F 1/1683* (2013.01); *G06F 1/1694* (2013.01); *G06F 3/021* (2013.01); *G06F 3/0213* (2013.01); *G06F 3/0216* (2013.01); *G06F 3/0231* (2013.01)

(58) Field of Classification Search
CPC ......... G06F 3/02; G06F 3/0202; G06F 3/021; G06F 3/0213; G06F 3/0216; G06F 3/023; G06F 3/0231; G06F 3/0234; G06F 3/0235; G06F 3/0219; G06F 1/016; G06F 1/1626; G06F 1/1683; G06F 1/1694
See application file for complete search history.

(56) References Cited

U.S. PATENT DOCUMENTS

| | | | |
|---|---|---|---|
| 4,324,976 A | 4/1982 | Lapeyre | |
| 5,410,333 A | 4/1995 | Conway | |
| 5,768,346 A | 6/1998 | Spruijt | |
| 6,107,988 A | 8/2000 | Phillipps | |
| 6,118,432 A | 9/2000 | Kotorov et al. | |
| 6,153,843 A * | 11/2000 | Date et al. | 200/339 |

(Continued)

FOREIGN PATENT DOCUMENTS

| | | |
|---|---|---|
| DE | 10260499 A1 | 7/2004 |
| EP | 1832957 A1 | 9/2007 |

(Continued)

OTHER PUBLICATIONS

Scott, James; Isadi, Shahram; Rezai, Leila Sadat; Ruszkowski, Dominika; Bi, Xiaojun; and Balakrishnan, Ravin, RearType: Text Entry Using Keys on the Back of Device, ACM International Conference Proceeding Series, p. 171-179, 2010, 12th International Conference on Human-Computer Interaction with Mobile Devices and Services, Mobile HCI2010, Sep. 7, 2010-Sep. 10, 2010.

(Continued)

*Primary Examiner* — Srilakshmi K Kumar
*Assistant Examiner* — Sardis Azongha
(74) *Attorney, Agent, or Firm* — Wood, Herron & Evans, LLP

(57) ABSTRACT

A data entry device includes a housing comprising a front and rear surface and laterally separated grip portions each configured to engage with a hand of a user. The user may thereby support the housing by engaging the grip portions of the housing. The rear surface includes first and second generally concave portions disposed proximate the first and second grip portions, which curve generally towards the hand of the user when the housing is supported by the user. The device further includes input keys positioned on each of the first and second generally concave portions of the rear surface such that the user may actuate the input keys with fingers of each hand while engaging the grip portions, and such that the generally concave portions facilitate ergonomic access to the input keys.

20 Claims, 53 Drawing Sheets

(56) References Cited

U.S. PATENT DOCUMENTS

| | | | |
|---|---|---|---|
| 6,297,752 | B1 | 10/2001 | Ni |
| 6,392,870 | B1 | 5/2002 | Miller, Jr. |
| 6,731,725 | B1 | 5/2004 | Merwin et al. |
| D492,294 | S * | 6/2004 | Kim .................. D14/240 |
| 6,760,013 | B2 * | 7/2004 | Willner et al. ............ 345/169 |
| 6,822,854 | B2 | 11/2004 | Te Maarssen et al. |
| D502,180 | S | 2/2005 | Gambaro |
| 6,909,424 | B2 | 6/2005 | Liebenow et al. |
| 6,939,066 | B2 * | 9/2005 | Goodenough ............ 400/477 |
| 7,088,339 | B2 | 8/2006 | Gresham |
| 7,088,342 | B2 | 8/2006 | Rekimoto et al. |
| 7,324,019 | B2 | 1/2008 | Levenson |
| 7,355,583 | B2 * | 4/2008 | Beardsley et al. ......... 345/156 |
| 7,378,991 | B2 | 5/2008 | Dietz et al. |
| 7,417,625 | B2 | 8/2008 | Morris |
| 8,072,423 | B2 | 12/2011 | Rolus Borgward |
| 8,245,158 | B1 * | 8/2012 | Schrick .......... G06F 1/1626 715/710 |
| 8,368,563 | B2 * | 2/2013 | Martin .................... 341/22 |
| 8,567,832 | B2 * | 10/2013 | Kannaka .................. 294/25 |
| 2002/0118176 | A1 * | 8/2002 | Ribak ................... 345/169 |
| 2003/0117374 | A1 * | 6/2003 | McCloud .......... G06F 1/1626 345/168 |
| 2004/0101817 | A1 * | 5/2004 | Boulis ................. 434/307 R |
| 2004/0208681 | A1 | 10/2004 | Dechene |
| 2004/0239631 | A1 | 12/2004 | Gresham |
| 2004/0263484 | A1 | 12/2004 | Mantysalo et al. |
| 2005/0104855 | A1 | 5/2005 | Grossmeyer |
| 2006/0084482 | A1 * | 4/2006 | Saila .................. 455/575.1 |
| 2006/0132447 | A1 | 6/2006 | Conrad |
| 2006/0274045 | A1 * | 12/2006 | Stenbroten ............ 345/168 |
| 2007/0036603 | A1 | 2/2007 | Swoboda |
| 2007/0051792 | A1 | 3/2007 | Wheeler et al. |
| 2007/0201931 | A1 | 8/2007 | Bowen et al. |
| 2007/0268261 | A1 | 11/2007 | Lipson |
| 2008/0058033 | A1 | 3/2008 | Angelhag |
| 2008/0145127 | A1 | 6/2008 | Liu |
| 2010/0064212 | A1 | 3/2010 | Snyder |
| 2011/0102328 | A1 | 5/2011 | Chen |
| 2011/0163945 | A1 | 7/2011 | Jolly |
| 2011/0260982 | A1 | 10/2011 | Trout |
| 2011/0261058 | A1 | 10/2011 | Luo |
| 2011/0291949 | A1 | 12/2011 | Wu et al. |
| 2012/0039021 | A1 | 2/2012 | Karwan |
| 2012/0113034 | A1 | 5/2012 | McDermid |

FOREIGN PATENT DOCUMENTS

| | | | |
|---|---|---|---|
| GB | 2344905 | A | 6/2000 |
| GB | 2467783 | A | 8/2010 |
| GB | 2457868 | B | 12/2010 |
| JP | 7295720 | A | 11/1995 |
| JP | 8305471 | A | 11/1996 |
| JP | 11272360 | A | 10/1999 |
| JP | 2002354085 | A | 12/2002 |
| JP | 2003198703 | A | 7/2003 |
| WO | 9404974 | A1 | 3/1994 |
| WO | 2006052175 | A1 | 5/2006 |
| WO | 2010090521 | A1 | 8/2010 |
| WO | 2010114424 | A1 | 10/2010 |
| WO | 2012001432 | A1 | 1/2012 |
| WO | 2012015333 | A9 | 3/2012 |

OTHER PUBLICATIONS

Anderson, Allison M.; Mirka, Gary A.; and Kaber, David B., "Analysis of Alternative Keyboards Using Learning Curves," Human Factors, vol. X, No. X, Month XXXX, pp. xxx-xxx, 2009 Human Factors and Ergonomics Society.

van Galen, Gerald P.; Hanneke, Liesker; de Haan, Ab, "Effects of a vertical keyboard design on typing performance, user comfort and muscle tension," Applied Ergonomics 38 (2007) 99-107.

"Learn to Type in Half the Time," http://www.alphagrips.com/learning.html, 2000-2008 AlphaGrip, Inc.™.

International Search Report and Written Opinion for Application No. PCT/US13/56626, Mar. 6, 2014.

International Preliminary Report on Patentability for Application No. PCT/US13/56626, Jul. 28, 2014.

* cited by examiner

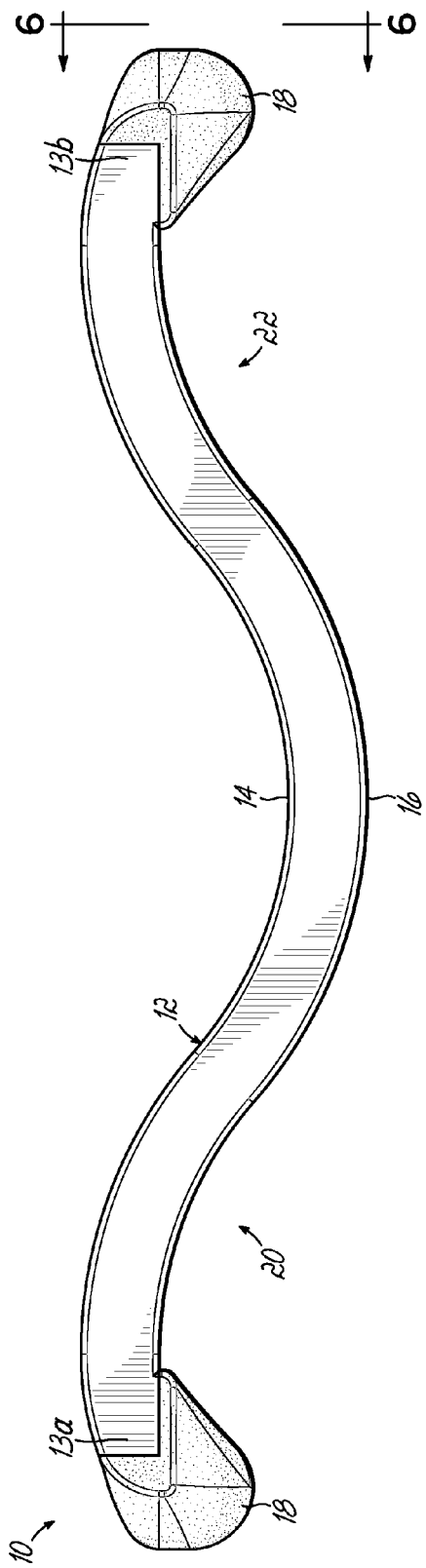
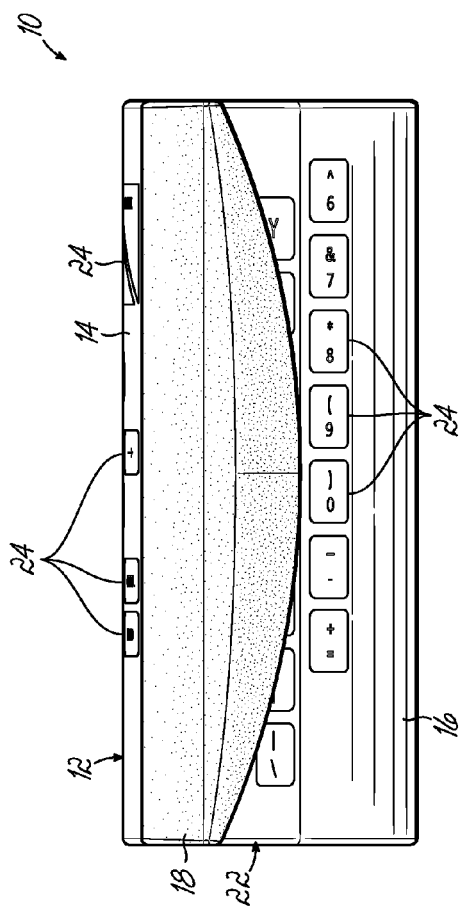
FIG. 5
FIG. 6

ERGONOMIC DATA ENTRY DEVICE

FIELD OF THE INVENTION

The invention is generally related to electronic computing devices, and in particular to data entry devices for such electronic computing devices.

BACKGROUND

Electronic computing devices have realized a steady increase in usage for a variety of purposes. For example, mobile computing devices, such as smart phones and tablets have changed the accessibility and communication of information. In addition, personal computers, such as desktop computers and laptop computers are becoming indispensable in many work environments. Despite the popularity and usefulness of such mobile computing devices, data entry, to some degree, remains an inefficient endeavor.

For mobile computing devices, in many conventional systems, users must interface with small virtual keyboards displayed on a touch screen of the device and/or input peripherals, such as a keyboard, that largely reduce the portability that is generally associated with such mobile computing devices. Similarly, for personal computers, conventional systems primarily utilize a keyboard and mouse/touchpad input. A conventional keyboard generally requires a flat resting surface such as a table or desk for the user to efficiently utilize the keyboard. As such, using a keyboard in a mobile work environment may prove challenging.

Therefore, a need continues to exist in the art for improved data entry devices and computing devices.

SUMMARY OF THE INVENTION

The invention addresses these and other problems associated with the prior art by providing an ergonomic data entry device and electronic computing device. Embodiments of a data entry device consistent with the invention include a housing comprising a front and rear surface and laterally separated grip portions each configured to engage with a hand of a user. The user may thereby support the housing by engaging the grip portions of the housing. The rear surface includes first and second generally concave portions disposed proximate the first and second grip portions. The first and second generally concave portions are configured to curve generally towards the hand of the user when the housing is supported by the user. The device further includes input keys positioned on each of the first and second generally concave portions of the rear surface. The user may thereby actuate the input keys with fingers of each hand while engaging the grip portions to thereby input data to an associated electronic computing device. The generally concave portions of the rear surface may thereby be configured to facilitate ergonomic access to the input keys such that a user may type with the input keys while holding the grip portions.

These and other advantages and features, which characterize the invention, are set forth in the claims annexed hereto and forming a further part hereof. However, for a better understanding of the invention, reference should be made to the Drawings, and to the accompanying descriptive matter, in which there is described exemplary embodiments of the invention.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention.

FIG. 5 is a top view of the data entry device of FIG. 1 taken along the view line 5-5 of FIG. 4.

FIG. 6 is a side view of the data entry device of FIG. 1 taken along the view line 6-6 of FIG. 5.

DESCRIPTION

Figure 1:
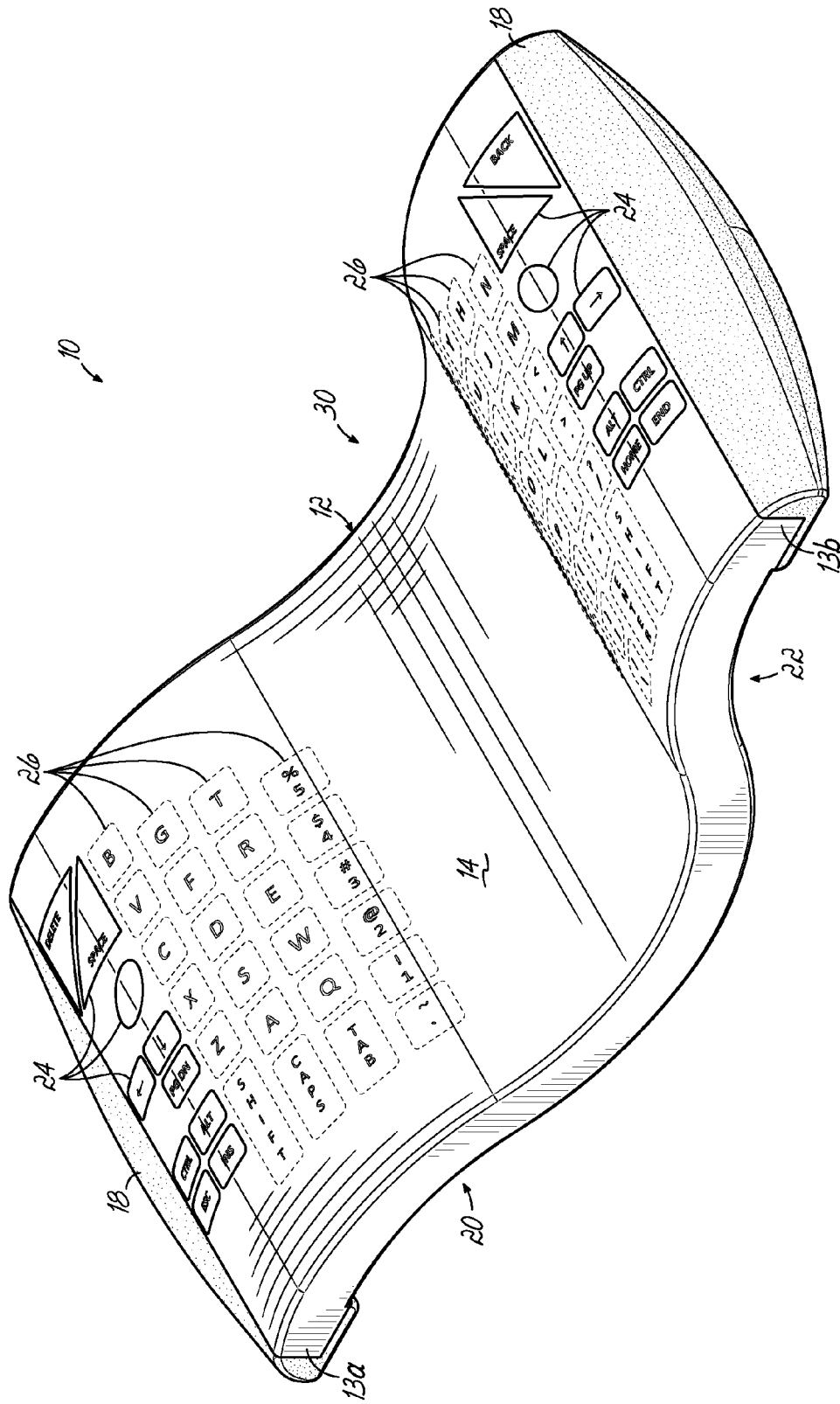
FIG. 1 is a front isometric view of an embodiment of a data entry device.

Embodiments consistent with the invention generally utilize a plurality of keys disposed along a generally concave portion of a rear surface of a data entry device such as a hand held keyboard to facilitate user input. As will become more apparent below, by orienting keys within a generally concave portion, the keys are located in an ergonomic and comfortable position for a user holding the device in laterally separated grip portions of the device.

In general, users inputting data on conventional mobile computing devices hold such devices in a manner that limits the users' ability to input data. For some conventional mobile computing devices, the user holds the mobile computing device with a first hand and inputs data to the mobile computing device with a second hand, i.e., the user inputs data to such conventional mobile computing devices with only one hand. For other conventional mobile computing devices, the user holds the mobile computing device with both hands and inputs data using only the user's thumbs. For other conventional mobile computing devices, the user rests the mobile computing device on a supporting surface and inputs data with a conventional keyboard. Hence, in general, conventional systems generally limit the user's ability to input data (i.e., using only one hand or only thumbs) or generally limit the user's mobility while inputting data (i.e., using a conventional keyboard input peripheral).

A user utilizing embodiments of the invention to input data to a mobile computing device, however, may utilize all fingers of each hand (i.e., two-handed input) while also supporting the device. Consistent with embodiments of the invention, a user may support a data entry device by holding laterally separated grip portions of the data entry device, and the user may input data by actuating input keys on a rear surface of the device with the user's fingers and/or actuating input keys on the front surface of the device with the user's thumbs. In addition, the user may input data by moving the device, such that movement sensors of the device detect the movement and generate input data based on the movement. For example, the user may move the device to generate input data that may correspond to movement of a pointer in an executing application. Furthermore, embodiments of the invention facilitate navigation of software applications executing on an associated electronic device (e.g., a personal computing device, a mobile computing device, etc.) and input of data to such executing applications while supporting the data input device. Therefore, the hands of the user may not disengage from the grip portions of the data entry device (i.e., let go of the grip portions) to input data to an associated electronic computing device. For example, if the data entry device is coupled to a mobile computing device, the user may input data using both hands and simultaneously support the data entry device and coupled mobile computing device.

For the purposes of the invention, references to directions and orientations, e.g., with regard to laterally separated grip portions, front and rear surfaces, etc. are relative to when a data entry device is being held by a user in an operative position. As such, in the embodiments discussed hereinafter, lateral separation may be considered to represent a separation generally along a direction between a user's hands, a front surface may generally be considered to be one or more surfaces that generally face toward a user when in an operative position, and a rear surface may generally be considered to be one or more surface that generally face away from a user when in an operative position.

Figure 2:
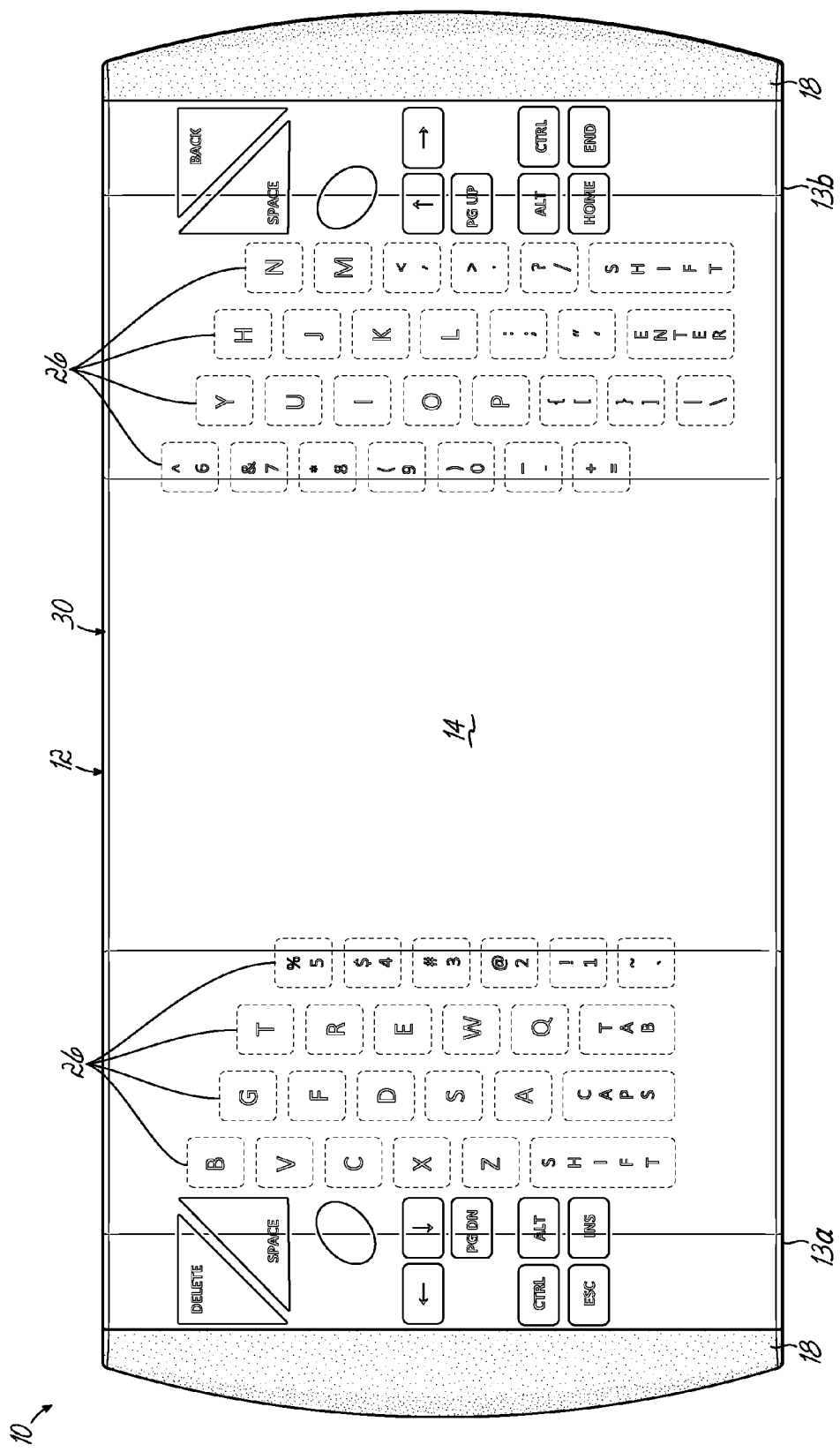
FIG. 2 is a front view of the data entry device of FIG. 1.
Figure 3:
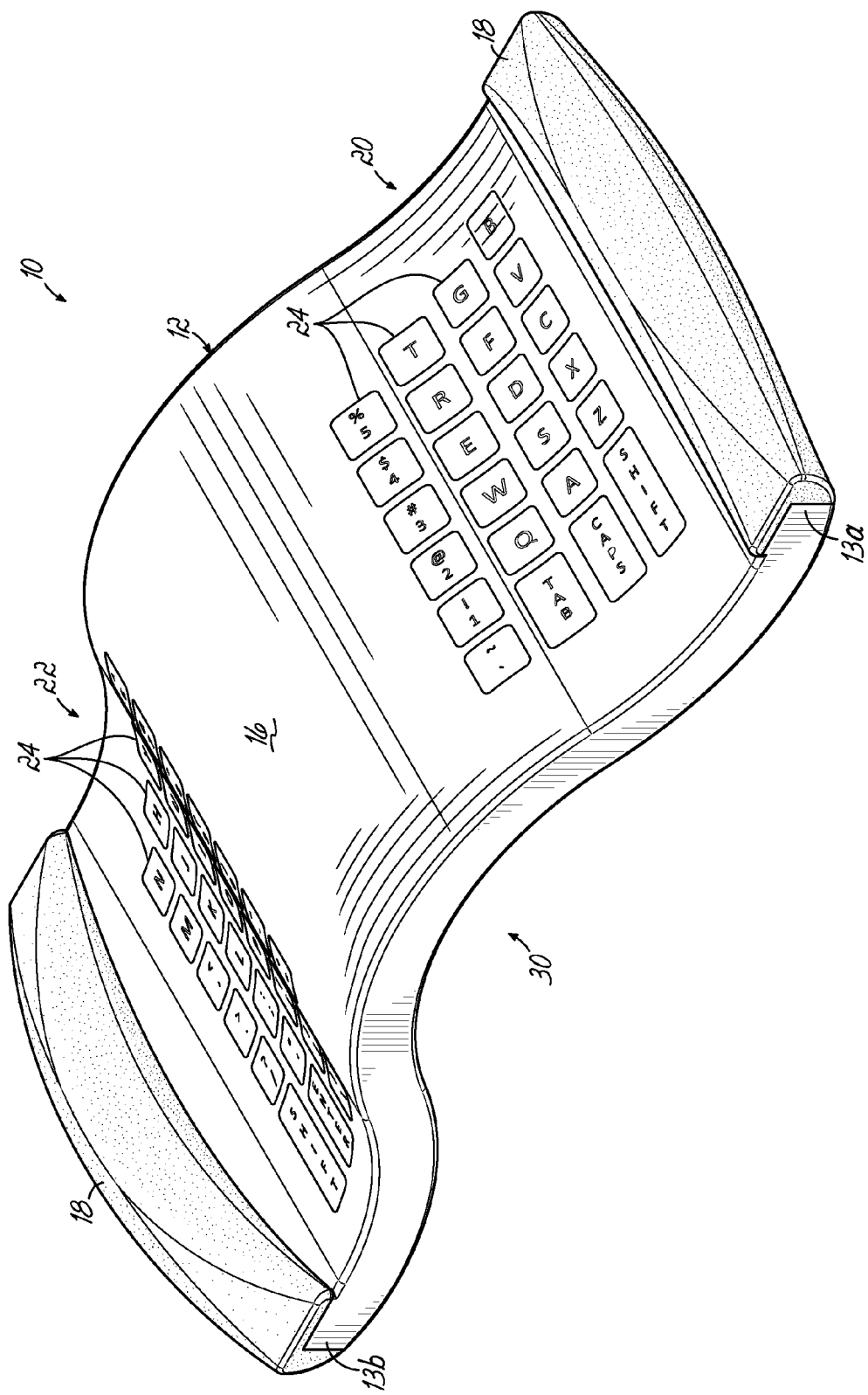
FIG. 3 is a rear isometric view of the data entry device of FIG. 1.
Figure 4:
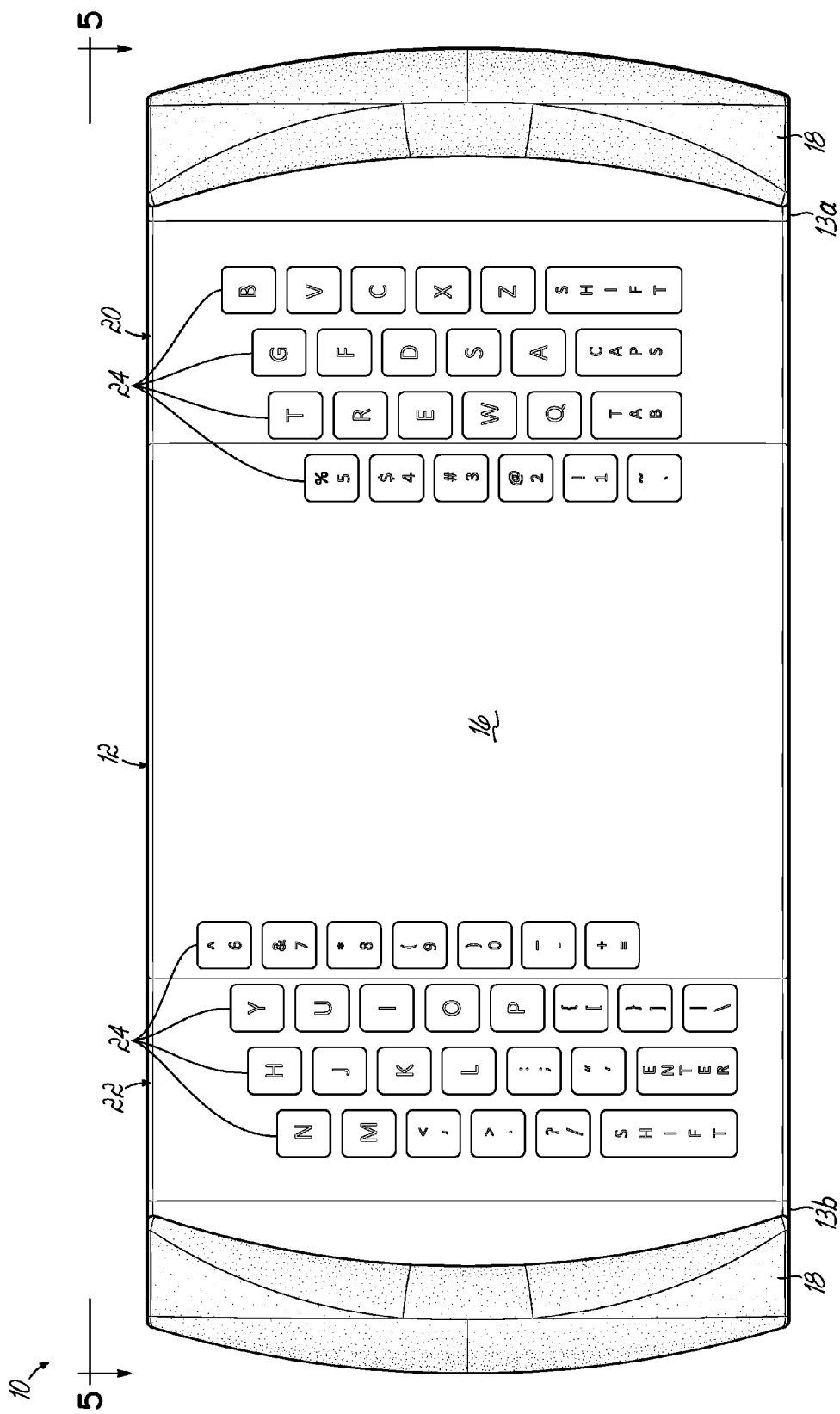
FIG. 4 is a rear view of the data entry device of FIG. 1.

Referring to the figures, and specifically FIGS. 1-8, these figures provide views of a data entry device consistent with some embodiments of the invention. FIG. 1 provides a front perspective view of a data entry device 10, FIG. 2 provides a front view of the data entry device 10, FIG. 3 provides a rear perspective view of the data entry device 10, and FIG. 4 provides a rear view of the data entry device 10.

As shown in FIGS. 1-5, the data entry device includes housing 12 having a front surface 14, a rear surface 16, and laterally separated grip portions 18 proximate opposite, first and second ends 13a, 13b of the housing 12. The rear surface 16 includes first and second generally concave portions 20, 22, where each generally concave portion 20, 22 is positioned proximate an end 13a, 13b of the housing 12. The device 10 includes a plurality of input keys 24 positioned on each generally concave portion 20, 22 on the rear surface 16 proximate the first end 13a or the second end 13b. As shown in this embodiment, the arrangement of the input keys 24 on each generally concave portion 20, 22 generally forms a split format QWERTY keyboard with left hand input keys 24 positioned on the first generally concave portion 20 proximate the first end 13a and first grip portion and right hand input keys 24 positioned on the second generally concave portion 22 proximate the second end 13b and second grip portion 18. It will be appreciated, however, that practically any alternative arrangement of keys may be used in other embodiments, including, for example, various combinations of letter keys, numerical keys, typographical keys, control keys and/or modifier keys (e.g., shift, command, control, function, etc. keys). Furthermore, alternatives to the QWERTY keyboard layout may be used. In addition, in some embodiments the keys need not be aligned in linear rows and/or columns, and may be offset from one another in various arrangements.

The device 10 further includes a plurality of corresponding key indicators 26 positioned on the front surface 14, where each key indicator 26 corresponds to a particular input key 24 configured on the rear surface 16, and each key indicator 26 may be activated responsive to a user actuating the corresponding input key 24 such that the user may visually confirm actuating the desired input key 24. As shown, the position of each key indicator 26 on the front surface 14 generally corresponds to the position of the corresponding input key 24 on the rear surface 16, such that the position of the key indicator 26 on the front surface may indicate to a user the position of the corresponding input key 24 on the rear surface 16.

In some embodiments, the key indicators 26 may be activated responsive to one or more user actions. For example, responsive to a user resting a finger on a particular input key 24, the corresponding key indicator 26 may light up a first color. Responsive to the user actuating the particular input key 24, the corresponding key indicator 26 may light up a second color. In other embodiments, the key indicators 26 may be non-active, i.e., the key indicators 26 may only denote the relative position of corresponding input keys 24 on the rear surface 16. For example, each key indicator 26 may be a patterned emblem of the corresponding input key 24.

In addition, the device 10 may include some input keys 24 configured on the front surface 14. The input keys 24 on the front surface 14 may be assigned one or more functions, including, for example, functions generally associated with mouse buttons, directional arrow keys, a space bar key, control keys, and/or other such functions. In general, the input keys 24 positioned on the front surface may be actuated by a user's thumbs while supporting the device 10 by holding the grip portions 18.

In one embodiment, the front surface 14 also includes a generally concave front portion 30. In other embodiments, the front surface 16 does not necessarily mimic the rear surface 16, as shown in the Figures. For example, the front surface 16 may be generally flat, and/or comprise one or more angled/curved portions.

FIG. 5 provides a view along the view line 5-5 of FIG. 4. As shown in FIG. 5, the second generally concave portion 22 is configured such that the input keys 24 on the second generally concave portion are positioned such that the user may actuate such input keys 24 while supporting the housing 12 by engaging the grip portions 18.

A generally concave portion, such as the first and second generally concave portions 20, 22 of FIG. 1, may comprise any combination of curved and/or planar surfaces that form a concave shape, much like the interior surface of a cylinder or sphere. The generally concave portions 20, 22 of the rear surface 16 are configured such that input keys 24 disposed in such portion 20, 22 are generally oriented such that the input keys 24 curve generally towards the hands of a user when the housing 12 is supported by the user to orient the input keys 24 in an ergonomically comfortable position for the user's fingers, and generally minimizing a difference in the distances that the user's fingers are required to reach in order to actuate the keys. While some of the input keys are positioned on the generally concave portions 20, 22, other input keys may be disposed elsewhere on the housing, e.g., on flat and/or generally convex portions of the housing.

A grip portion, such as the grip portions 18 of FIG. 1, may be considered to include a portion of a housing that is adapted to engage with a user's hand while the user is supporting the housing 12. A grip portion may be integral with the rest of the housing 12 or may be permanently or removably coupled to the rest of the housing 12. A grip portion 18 may be formed from the same material as the rest of the housing 12 or may be formed from different materials, e.g., softer materials that provide additional comfort to the user, different color materials to present a visual contrast, etc. A grip portion 18 may be recessed relative to the rest of the housing 12 or may project outwardly from the housing 12. A grip portion 18 may be disposed at an end of the housing 12 or may be formed proximate, but not completely at, an end of the housing 12, e.g., as might be the case were the grip portion defined by an aperture formed in the housing 12 and within which a user would insert his or her fingers. Moreover, consistent with embodiments of the invention, the grip portions 18 may be moveable/adjustable relative to the housing 12 such that the grip portions may be adjusted to accommodate different hand/finger sizes for different users and facilitate access to all input keys 24 positioned on the generally concave portions 20, 22.

Figure 7:
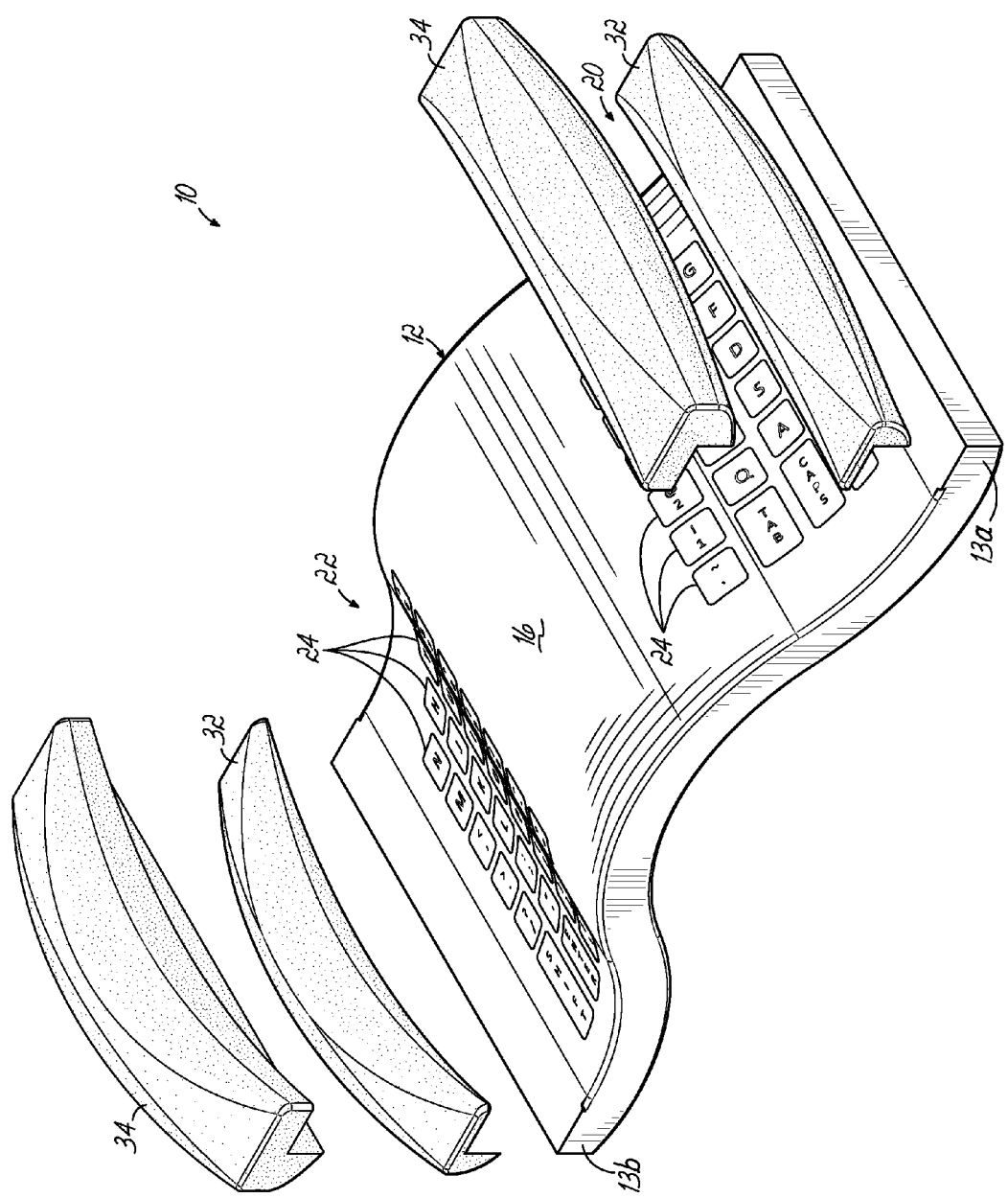
FIG. 7 is a rear isometric view of the data entry device of FIG. 1 with removable grip sets separated from the device.
Figure 8:
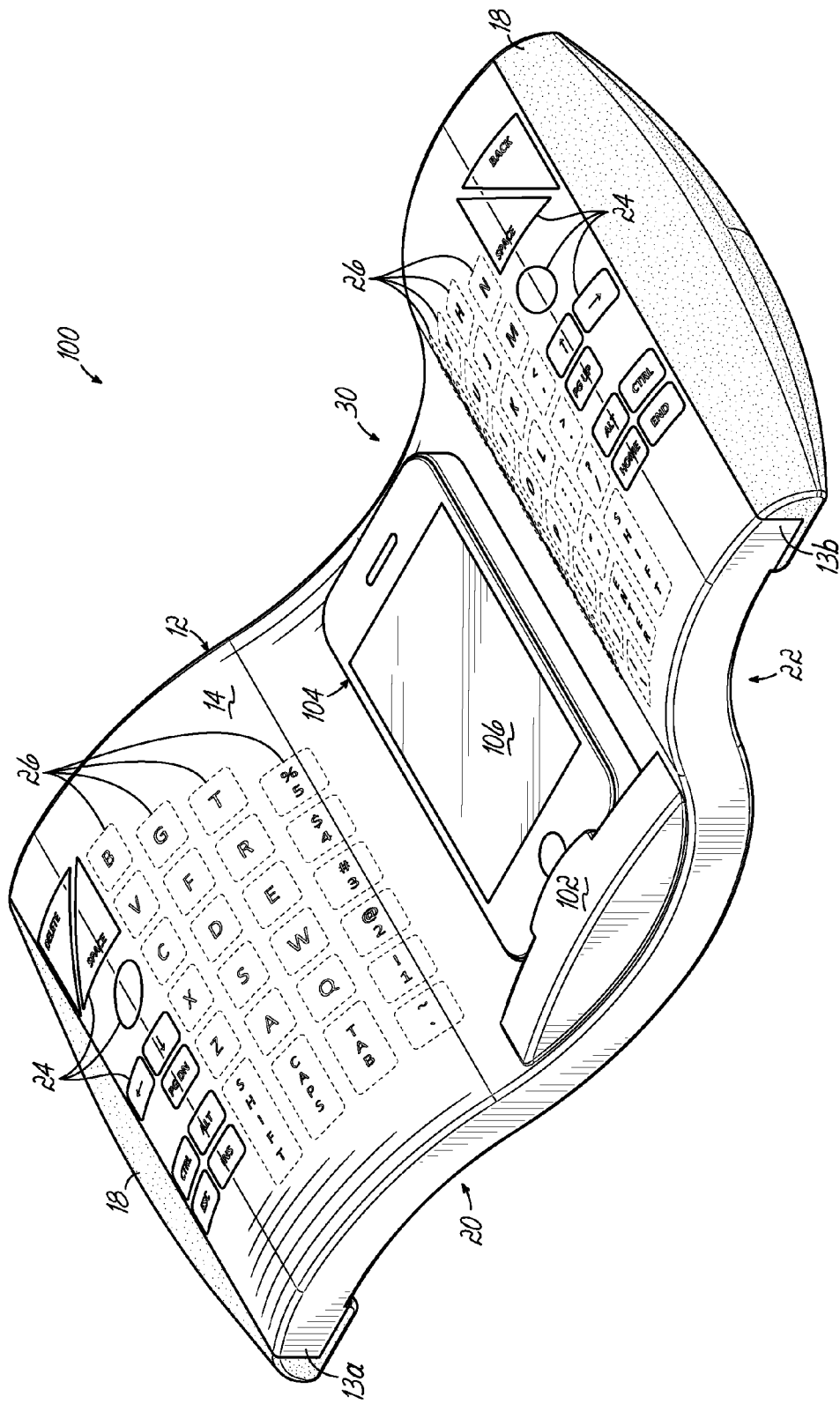
FIG. 8 is a front isometric view of a data entry device and an electronic computing device coupled thereto.

FIG. 6 provides a view along view line 6-6 of FIG. 5 and further illustrates the second generally concave portion 22 and some of the input keys 24 positioned thereon. As shown, the grip portion 18 is configured such that a user may support the device 10 by holding the grip portion 18, and the user may actuate the input keys 24 on generally concave portion 22 with one or more fingers. FIGS. 7 and 8 provide exploded views of the device 10, and these figures illustrate grip portions 18 in the form of two different sized removable sets of grips 32, 34 that may be coupled to the device 10. For example, different sets of grips 32, 34 may be provided to accommodate different hand/finger sizes. In addition, in some embodiments, different sets of grips may be provided based upon aesthetic concerns, e.g., so that a user can select different colors/materials/patterns of grips to personalize the device. In one embodiment, for example, different contrasting colors may be used for different sets of grips.

Referring to FIG. 8, this figure illustrates a data entry device 100 including a dock 102 affixed to and/or forming a part of a housing 12 that removably couples/docks and thereby supports an electronic computing device 104, such as a smart phone or tablet. In some embodiments, the dock 102 may include a device connector (not shown) that may connect to the electronic device 104 such that data and/or power may be communicated/shared between the data entry device 100 and the electronic device 104. In other embodiments, the dock 102 may not include a device connector for communicating/sharing data and/or power, and the dock 102 may function only to mechanically couple the electronic computing device 104 to the housing 12 of the device 100. As shown, dock 102 is generally positioned on a generally concave portion 30 of the front surface 14, such that a user of the device 100 may view data output on a display 106 of the electronic computing device 104 while supporting the device 100 and the docked electronic computing device 104. However, it will be appreciated that various alternative docking arrangements may be used depending upon the type of electronic computing device to be docked.

Figure 9:
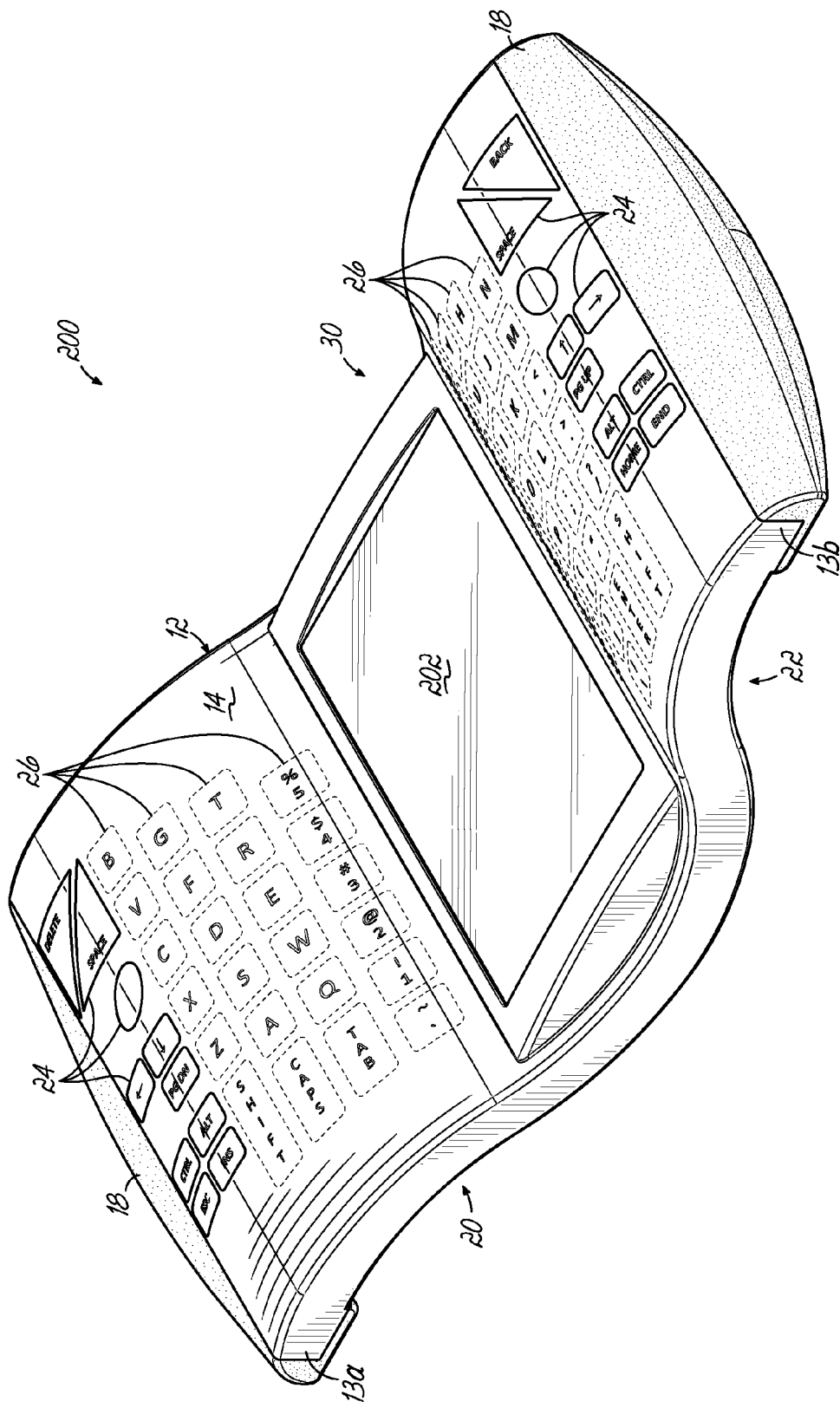
FIG. 9 is a front isometric view of a data entry device including an attached display.

Turning now to FIG. 9, this figure illustrates a data entry device 200 including components of an electronic computing device configured therein. In these embodiments, the data entry device 200 may include a display 202 affixed to a housing 12 for outputting data to a user in an understandable format such as a graphical user interface. The display 202 and/or other components generally associated with an electronic computing device (e.g., a processor, memory, user interface controller, etc.) may be affixed to/configured on a generally concave portion 30 of a front surface 14 of the housing 12, or may be integrated into a housing. FIG. 9 provides a front isometric view of the data entry device 200.

Figure 10:
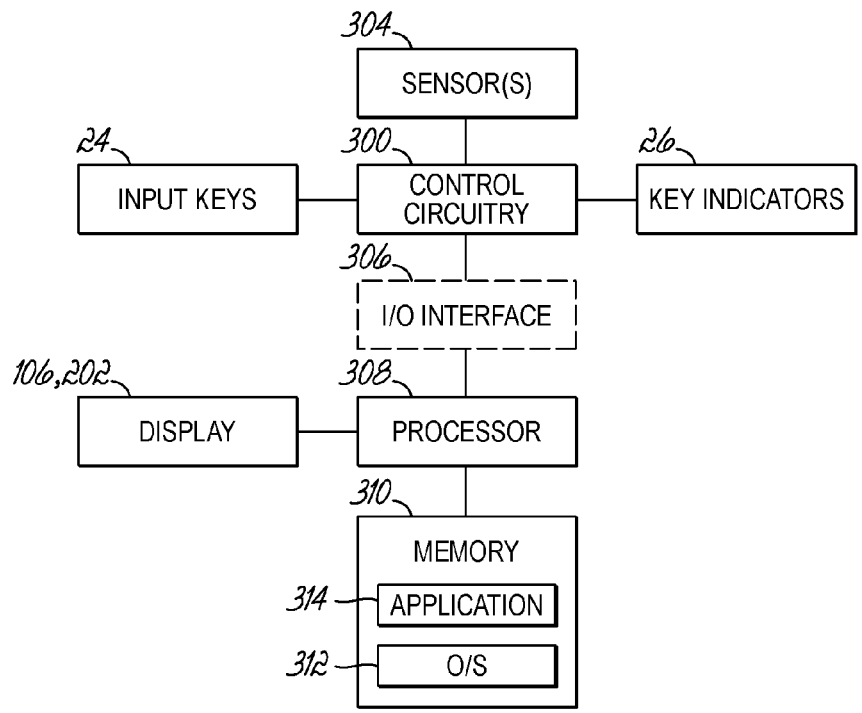
FIG. 10 is a block diagram illustrating hardware components associated with the data entry devices of FIGS. 1, 8, and 9.

FIG. 10 provides a block diagram illustrating electronic components suitable for incorporation into a data entry device 10, 100, 200 consistent with embodiments of the invention. As described above with respect to FIGS. 1-9, in some embodiments, the data entry device may function as a peripheral input device that connects to an electronic computing device 104 wired/wirelessly, such as the data entry devices 10,100 shown in FIGS. 1 and 8, whereas in other embodiments, the data entry device may include components of an electronic computing device, such as the data entry device 200 shown in FIG. 9. In general, the data entry device 10, 100, 200 includes input keys 24 and key indicators 26, where each key indicator 26 corresponds to a particular input key 24. The data entry device 10, 100, 200 generally includes control circuitry 300 configured to receive user input via the input keys 24 and selectively power one or more corresponding key indicators 26 based on the received user input.

For example, an input key 24 of the data entry device 10, 100, 200 may be associated with the letter 'Q', and responsive to a user actuating the 'Q' input key 24, the control circuitry 300 may receive input data indicating actuation of the 'Q' input key 24, and the control circuitry 300 may activate the corresponding key indicator 26. The control circuitry 300 may comprise a special purpose and/or general purpose microcontroller, logic circuit, printed circuit board and/or other such types of control circuits configured to perform one or more operations consistent with embodiments of the invention.

The input keys 24 may comprise switch based keys that may be depressed for actuation and/or touch keys that may be touched for actuation. The key indicators 26 may comprise circuitry configured to output a visual indicator when activated and/or output different visual indicators depending on an activation state. For example, the key indicators 26 may comprise circuitry configured to selectively output one or more frequencies of light (e.g., illuminate in one or more different colors), such as one or more light emitting diodes and associated circuitry. In other embodiments, the key indicators 26 may comprise a non-functional visual indicator such as an emblem, drawing, or the like.

In addition, the device 10, 100, 200 includes one or more sensors 304 that may detect motion of the device 10, 100, 200 and generate input data based at least in part on the motion which may be input to the control circuitry 300. For example, the one or more sensors 304 may include an accelerometer/gyroscope such that one or more characteristics of motion (e.g., direction, acceleration, angle, etc.) may be detected. In some embodiments, motion detected via the associated sensors 304 and/or user input via input keys 24 configured on the front surface 14 of the device may generally be associated with commands of a conventional computer mouse, a space bar, control keys, etc.

For example, the user may support the device 10, 100, 200 by holding the grip portions 18 and move a mouse of a graphical user interface displayed on the display 106, 202 of the electronic computing device by tilting and/or moving the device 10, 100, 200, where the sensors 304 may generate input data based on such tilting/moving (i.e., motion), and movement of the mouse indicator in the graphical user interface may be based at least in part on such input data. Similarly, input keys 24 configured on the front surface 14 of the device 10, 100, 200 may function as mouse buttons of conventional computer mice. In other embodiments, the input data generated by the sensors 304 based on motion may be utilized to perform other operations such, including for example refreshing a display, scrolling a menu, controlling movement in a game application, etc. In addition, in some embodiments, other user input controls, e.g., touch sensitive surfaces, joysticks, etc., may be disposed on the front and/or rear surfaces of the housing.

The device 10, 100, 200 includes input/output (I/O) interface circuitry 306, where the I/O interface circuitry is configured to communicate data and/or transmit power between the control circuitry 300 and a processor 308. As described above, in some embodiments, the device may generally be considered an input peripheral that communicates data to a stand-alone electronic computing device 104 (e.g., devices 10, 100 of FIGS. 1-7 and 8), such as a personal computer, smart phone, tablet computer, etc. In these embodiments, the I/O interface circuitry 306 may comprise wireless/wired data/power transceiving circuitry. In embodiments of the invention including power transceiving circuitry the device 10, 100, 200 may provide power to the electronic computing device, and/or the electronic computing device may provide power to the device 10, 100, 200. Alternatively, in some embodiments, the device 10, 100, 200 may include removable and/or non-removable, rechargeable batteries to supply power to the device 10, 100, 200.

For example, in some embodiments, the I/O interface circuitry 306 may include Bluetooth transceiver circuitry associated with the device 10, 100, 200. In this example, an electronic computing device, such as the electronic computing device 104 of FIG. 8, may also include Bluetooth transceiver circuitry, and the device 10, 100, 200 and the electronic computing device 104 may communicate data therebetween via the I/O interface circuitry 306 comprising the Bluetooth transceiver circuitry. Continuing the example, a user may actuate an input key 24 associated with the letter 'Q', the control circuitry 300 may cause the corresponding key indicator 26 to indicate that the 'Q' input key 24 has been actuated, and the control circuitry 300 may communicate input data based at least in part on the user's actuation of the 'Q' input key to the processor 308 of the electronic computing device 54 via Bluetooth transceiver circuitry of the I/O interface 306. As another example, the I/O interface circuitry 306 may include a device connector (e.g., a USB connector, a FireWire connector, a PS/2 connector, etc.), and in this example, data and/or power may be transmitted between the device 10, 100, 200 and an associated electronic computing device via the device connector.

In other embodiments, the device may include the processor 308 and other components of an electronic computing device, such as the device 200 of FIG. 9. In these embodiments, the I/O interface 306 may comprise circuitry such as a data bus or other such logic that communicates data input by the user via the input keys 24 to the processor 308. In these embodiments, the device 200 generally includes a memory 310 storing an operating system (O/S) 312 and one or more applications 314. In general, the device 200 may operate by executing instructions stored in the O/S 312 with the processor 308 and/or instructions stored in specific applications 314. The instructions and/or operations stored in the O/S 312 and/or applications 314 may be referred to as program code, where such program code generally includes specific instructions stored in a format executable by the processor 308 to perform one or more operations consistent with embodiments of the invention. In addition, in these embodiments, the device 200 generally includes a display 202, where the display 202 may output data from the processor 308 in a format understandable by the user. In addition, in some embodiments, the display 202 may include a touch-screen, such that the user may input data via the touch-screen of the display 202, and such data may be communicated to the processor 308.

Figure 11:
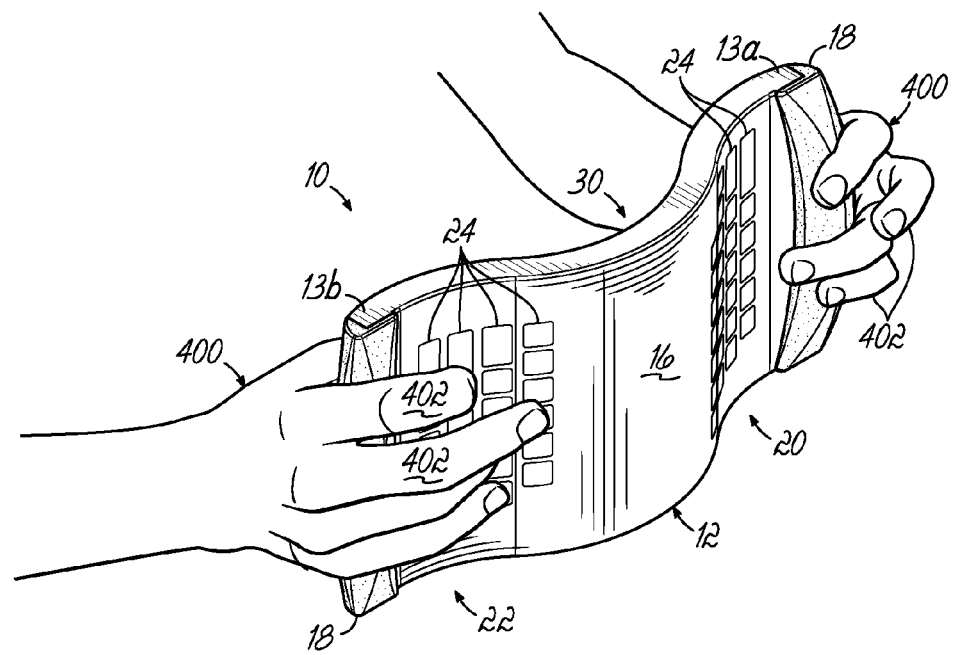
FIG. 11 is a view of a generally concave portion of a rear surface of the data entry devices of FIGS. 1, 8, and 9 that illustrates an example of the positioning of a user's hands and fingers when using the devices.
Figure 12:
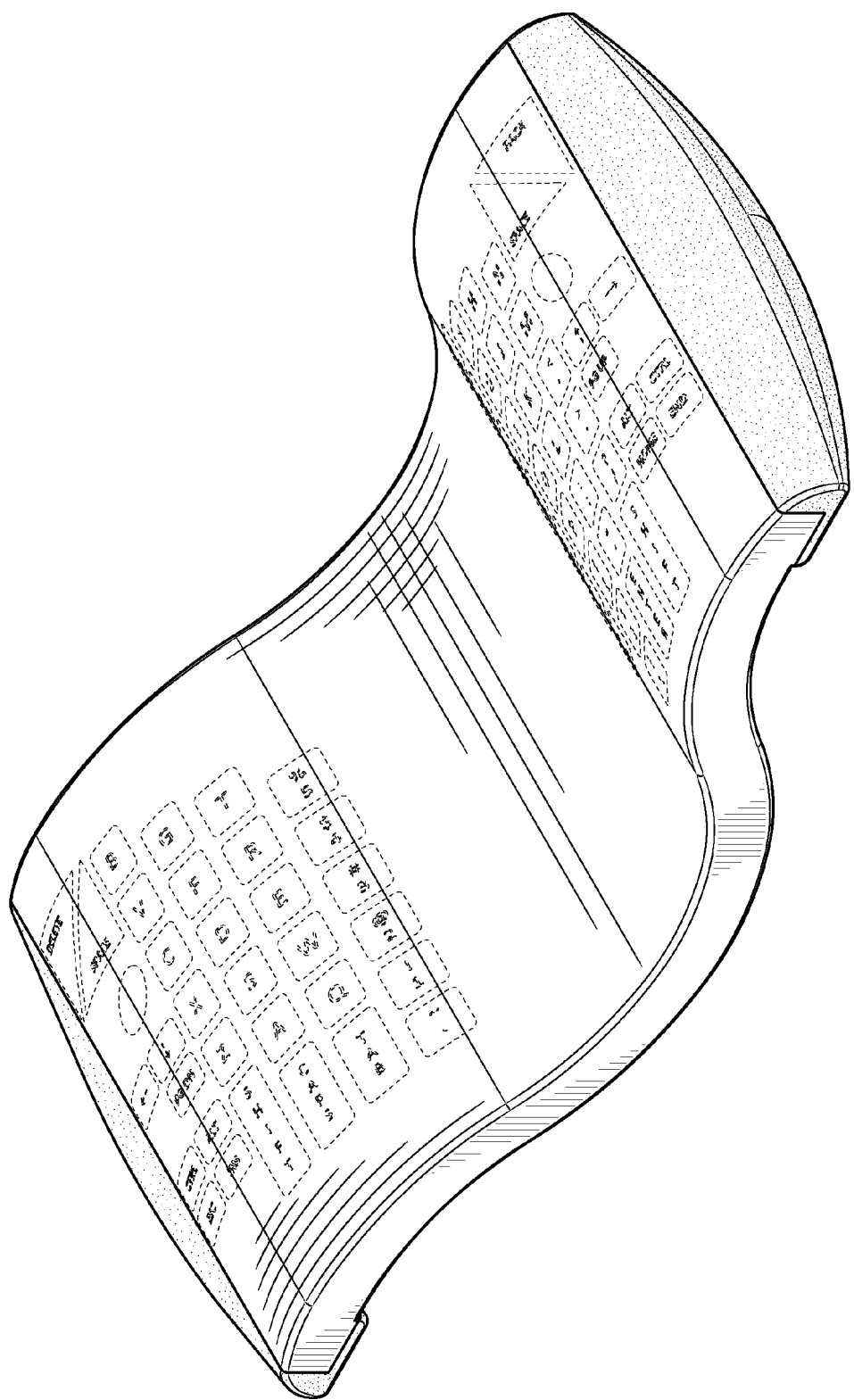
FIG. 12 is a front isometric view of a data entry device with environment.
Figure 13:
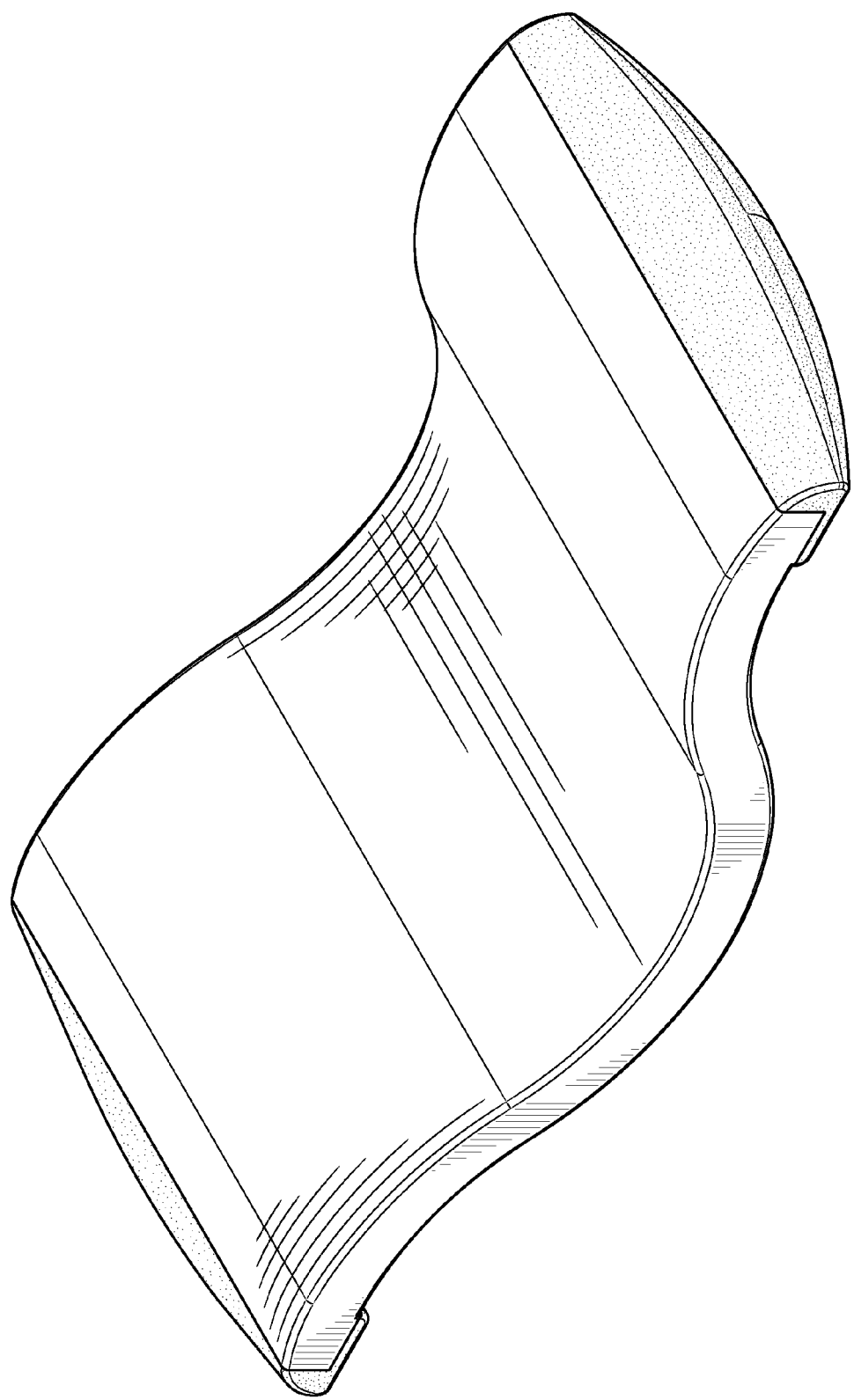
FIG. 13 is a front isometric view of the data entry device of FIG. 12.
Figure 14:
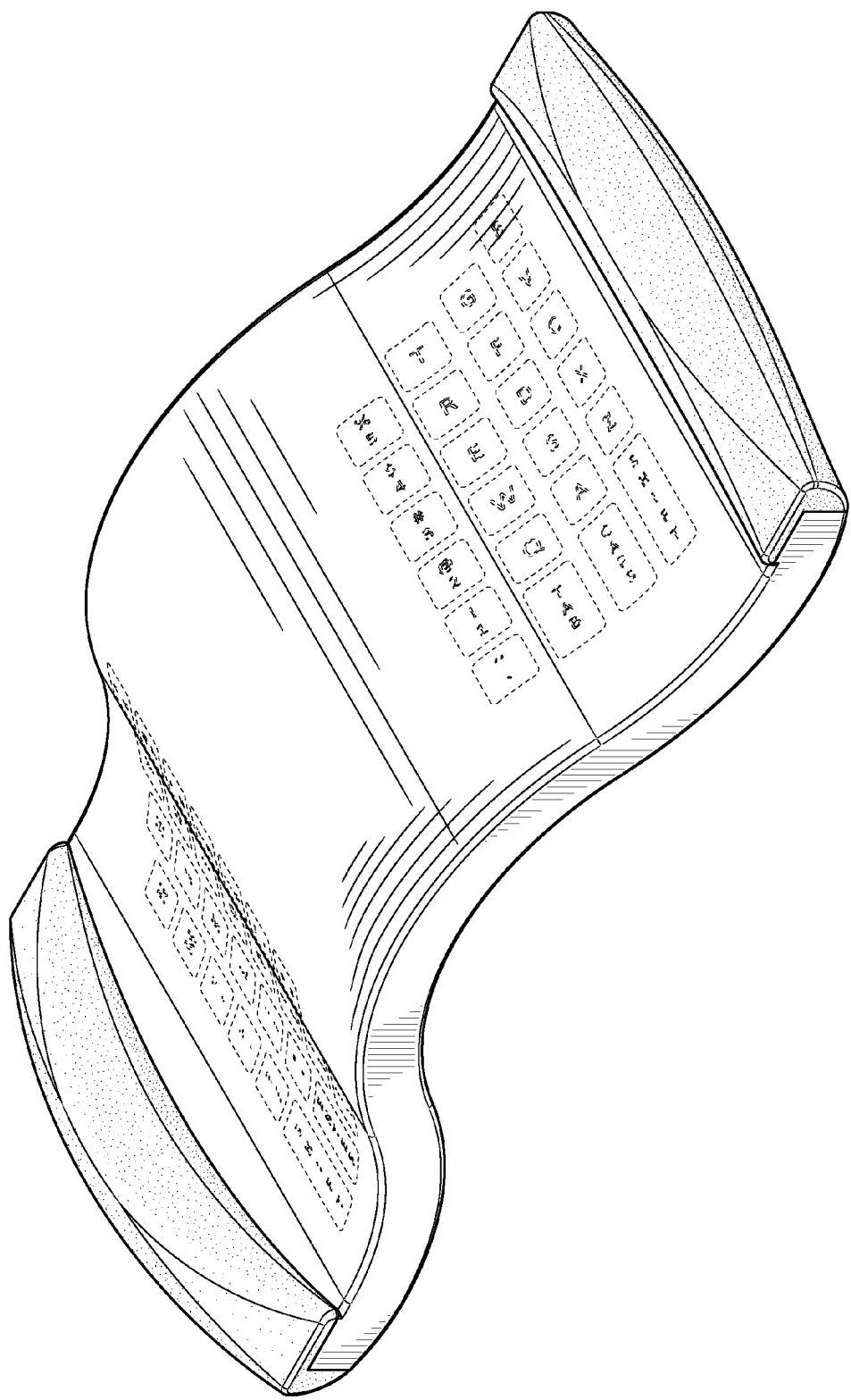
FIG. 14 is a rear isometric view of the data entry device of FIG. 12 with environment.
Figure 15:
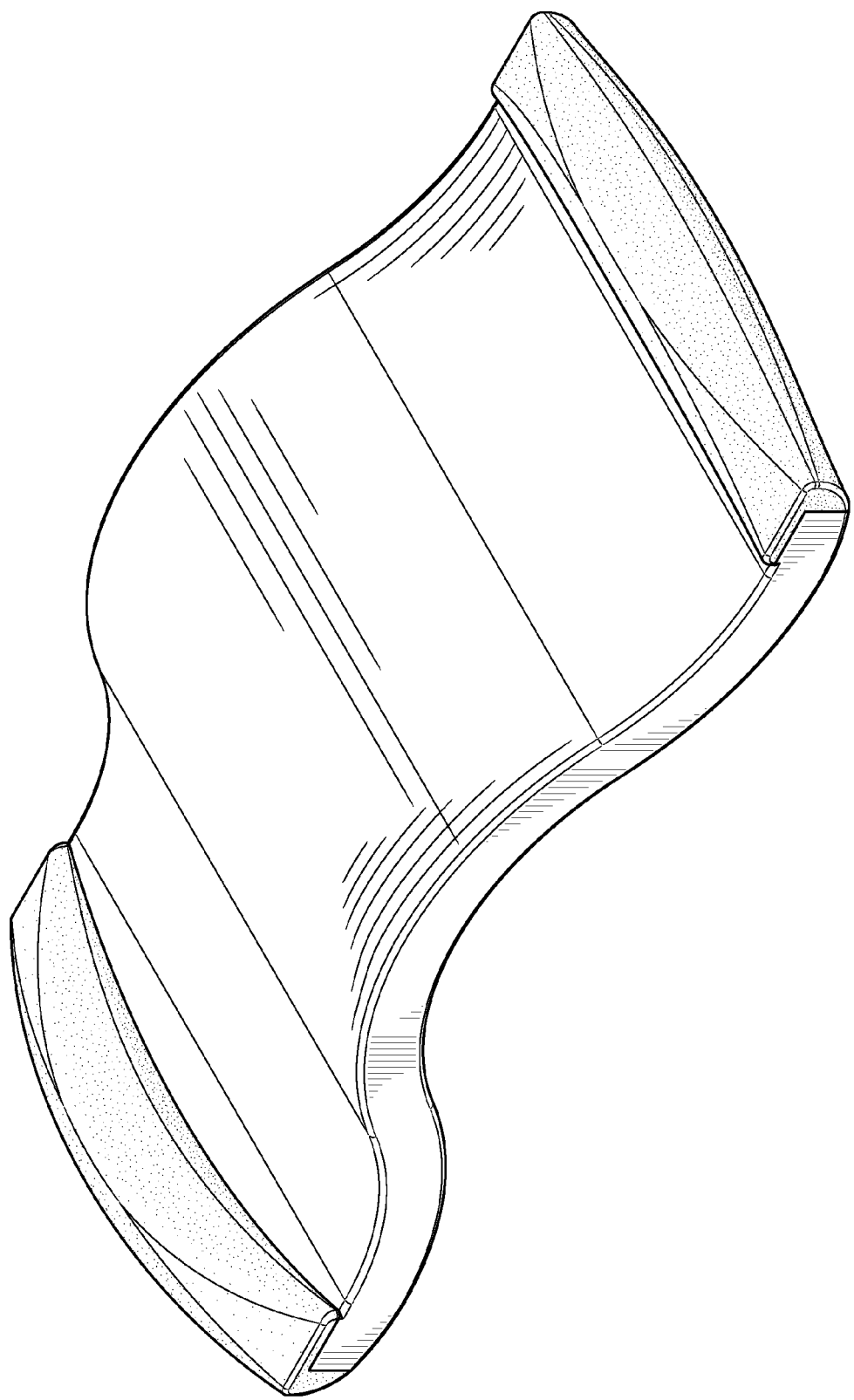
FIG. 15 is a rear isometric view of the data entry device of FIG. 12.
Figure 16:
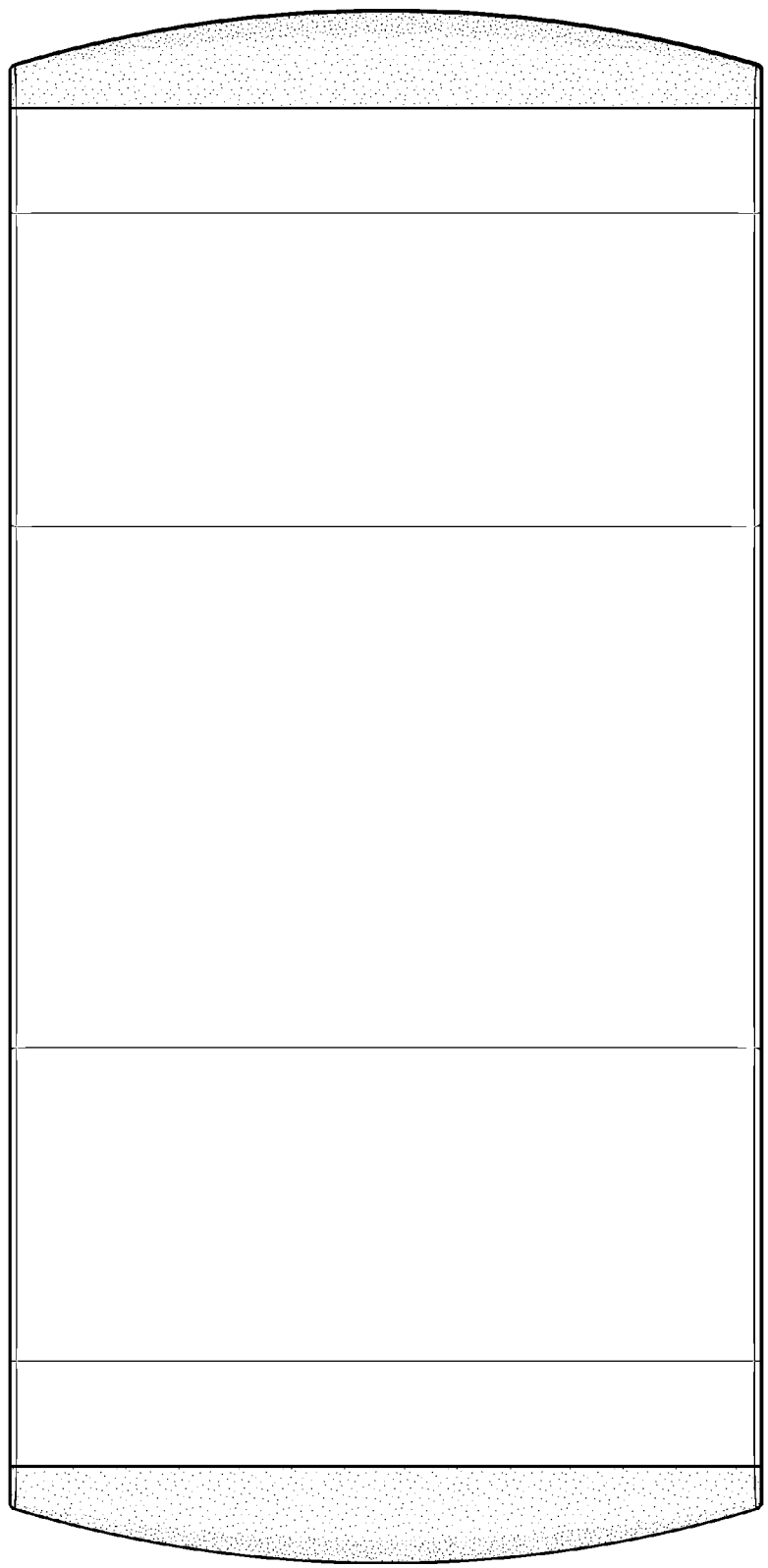
FIG. 16 is a front view of the data entry device of FIG. 12.
Figure 17:
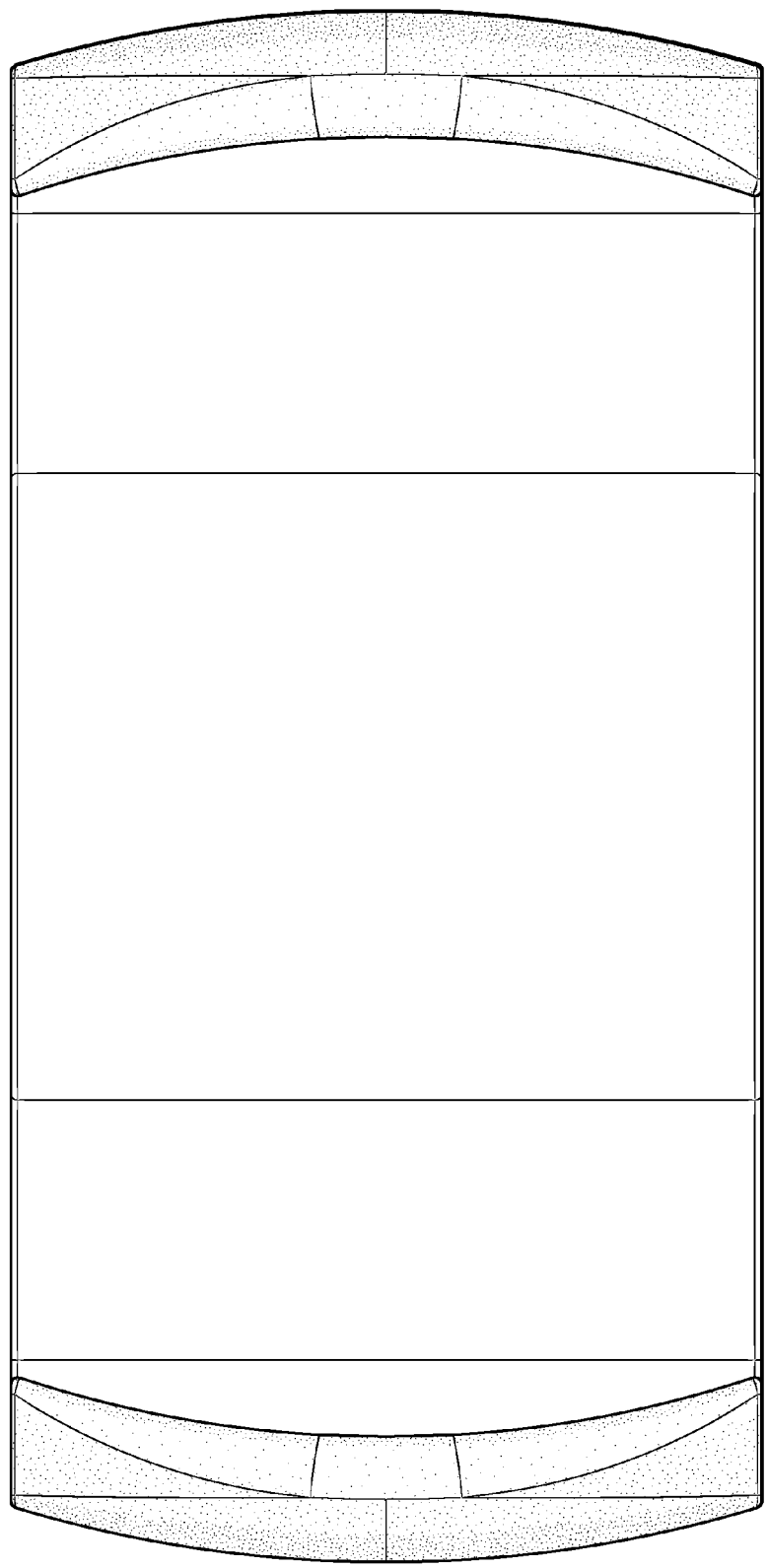
FIG. 17 is a rear view of the data entry device of FIG. 12.
Figure 18:
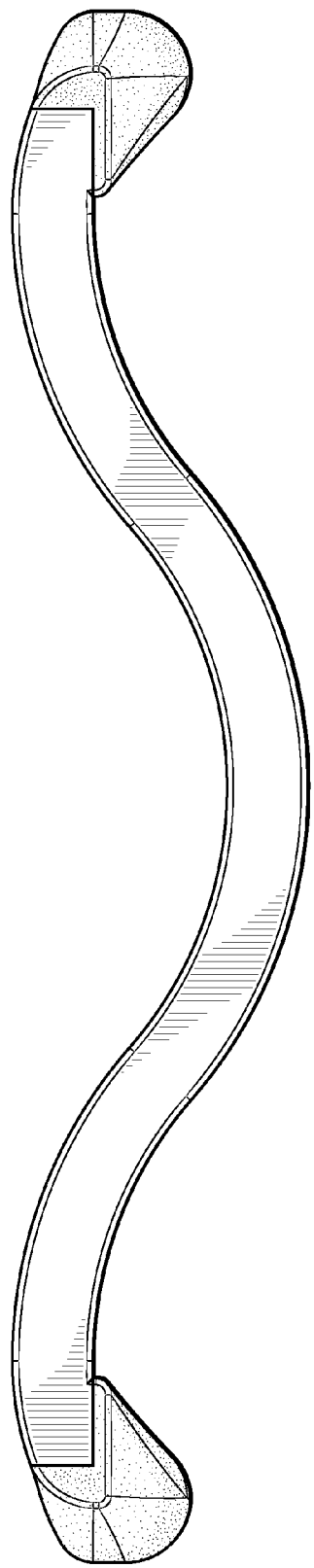
FIG. 18 is a bottom view of the data entry device of FIG. 12, and a top view of the data entry device of FIG. 12 is a mirror image of FIG. 18.
Figure 19:
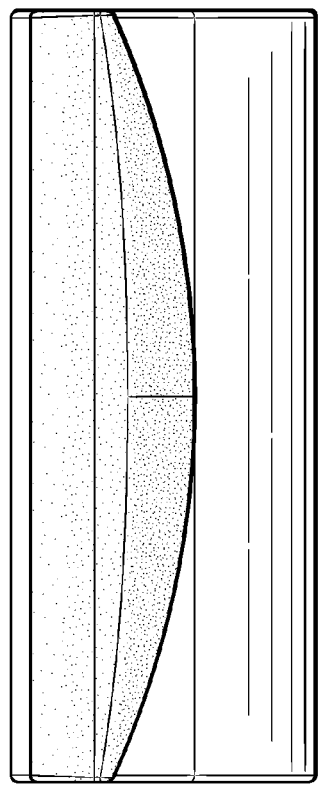
FIG. 19 is a right side view of the data entry device of FIG. 12, and a left side view of the data entry device of FIG. 12 is identical to FIG. 19.
Figure 20:
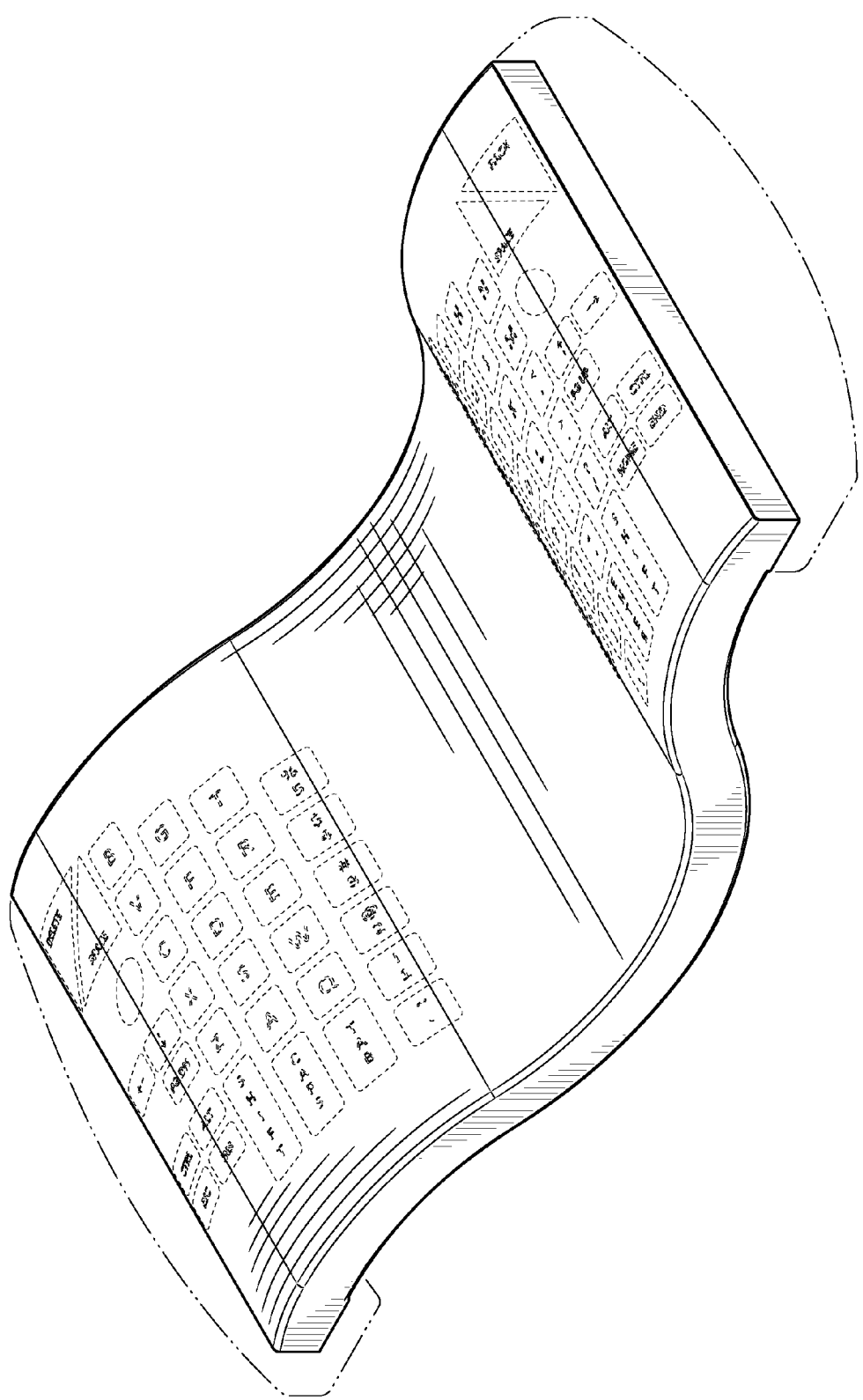
FIG. 20 is a front isometric view of a data entry device with environment.
Figure 21:
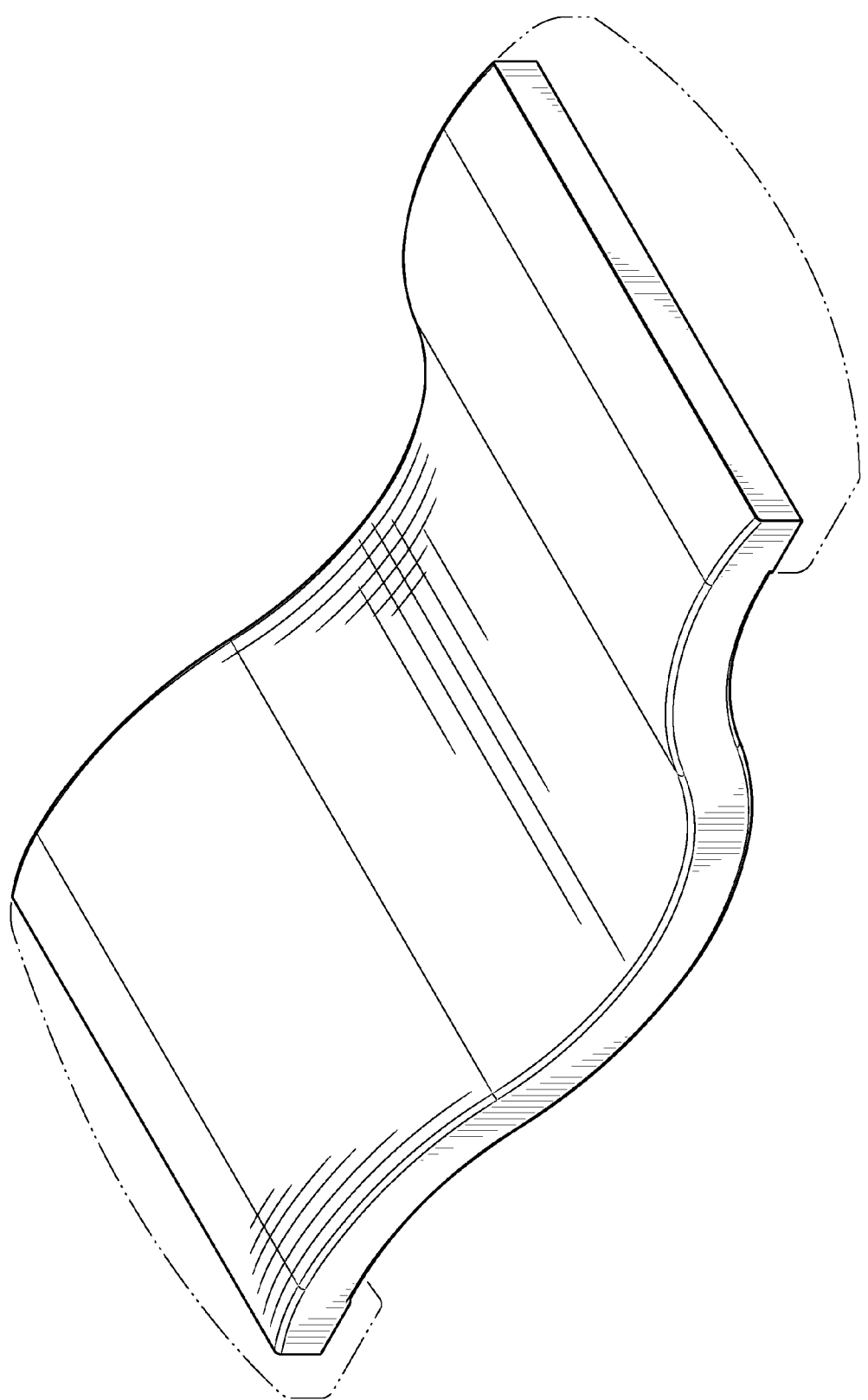
FIG. 21 is a front isometric view of the data entry device of FIG. 20.
Figure 22:
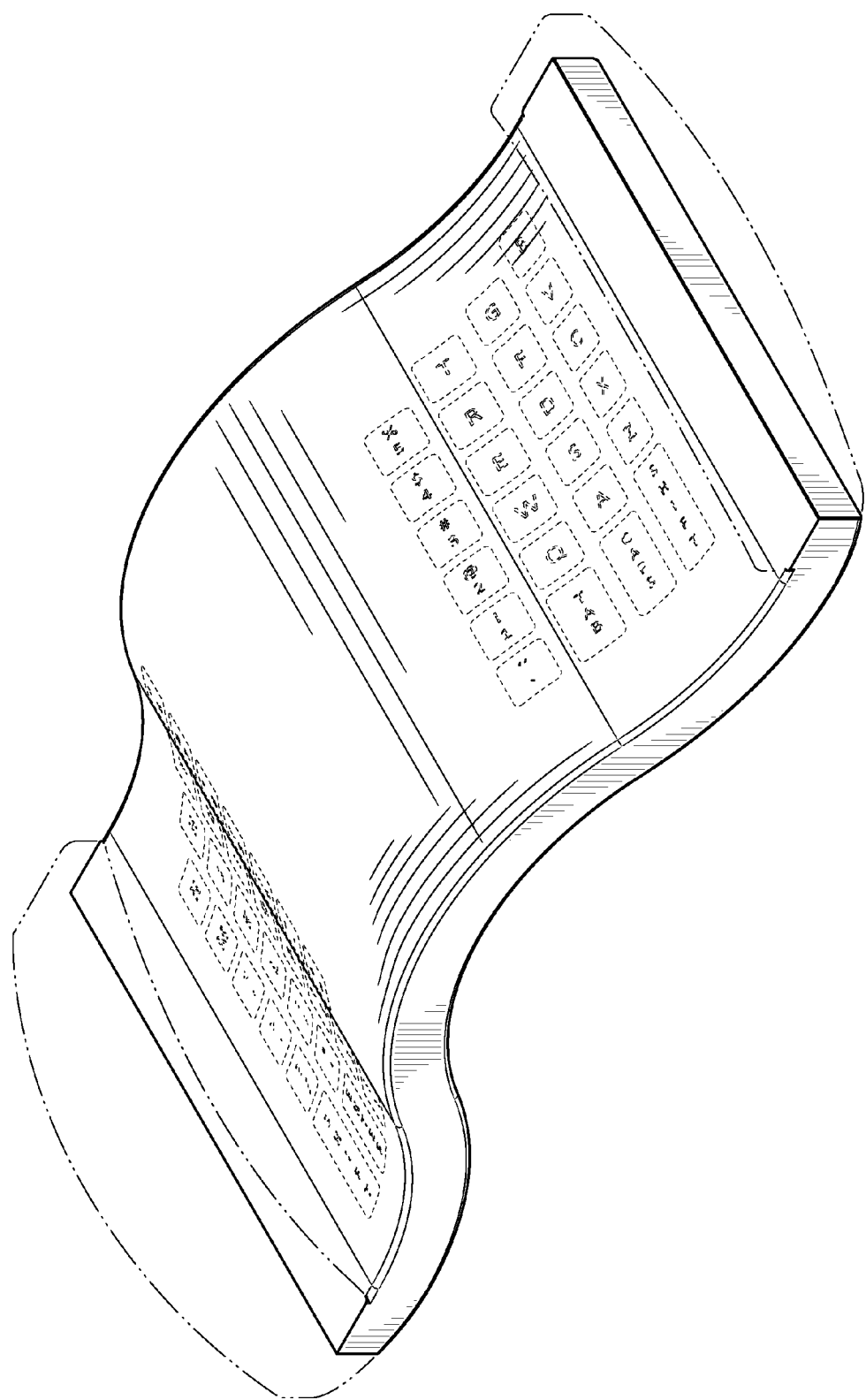
FIG. 22 is a rear isometric view of the data entry device of FIG. 20 with environment.
Figure 23:
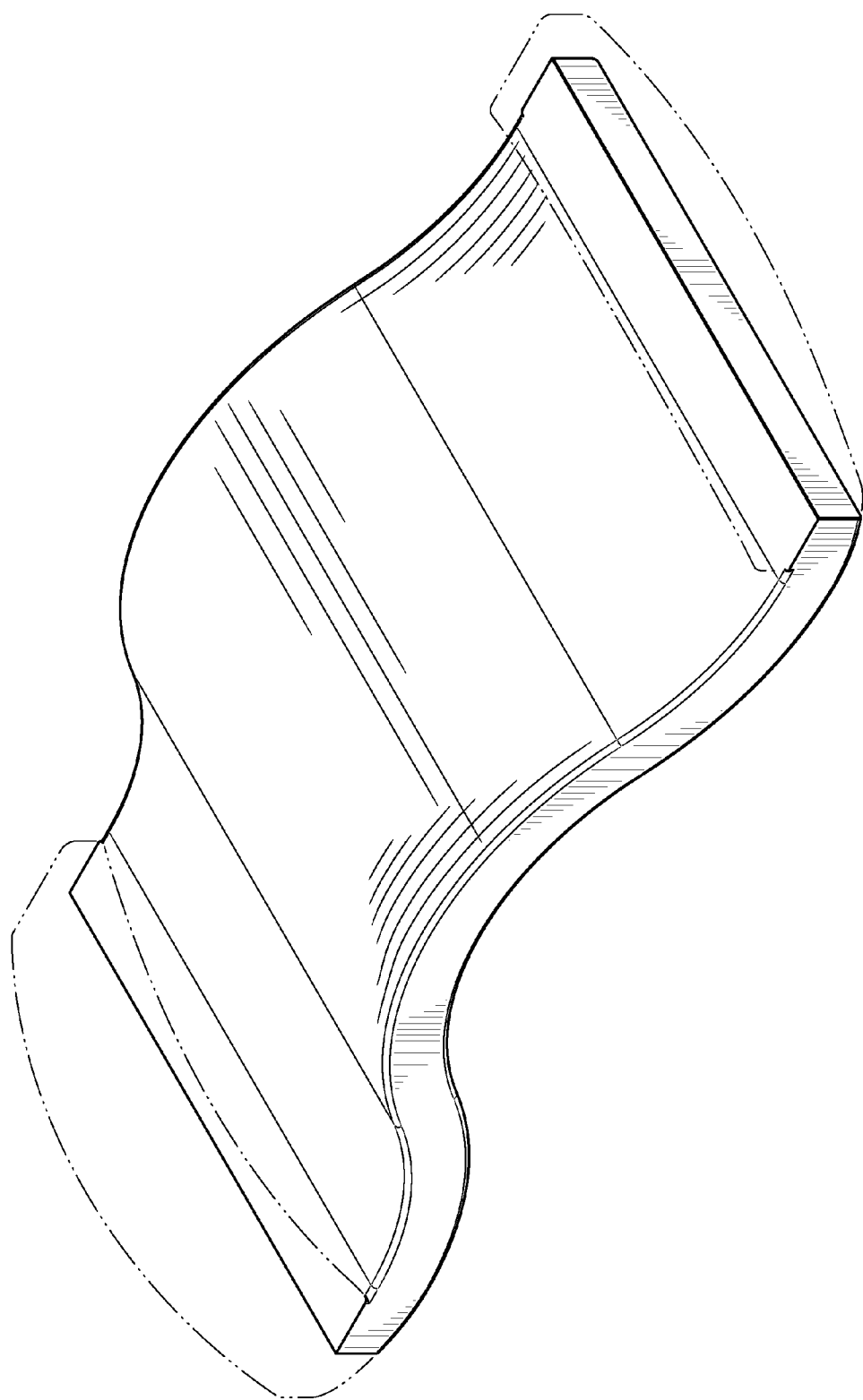
FIG. 23 is a rear isometric view of the data entry device of FIG. 20.
Figure 24:
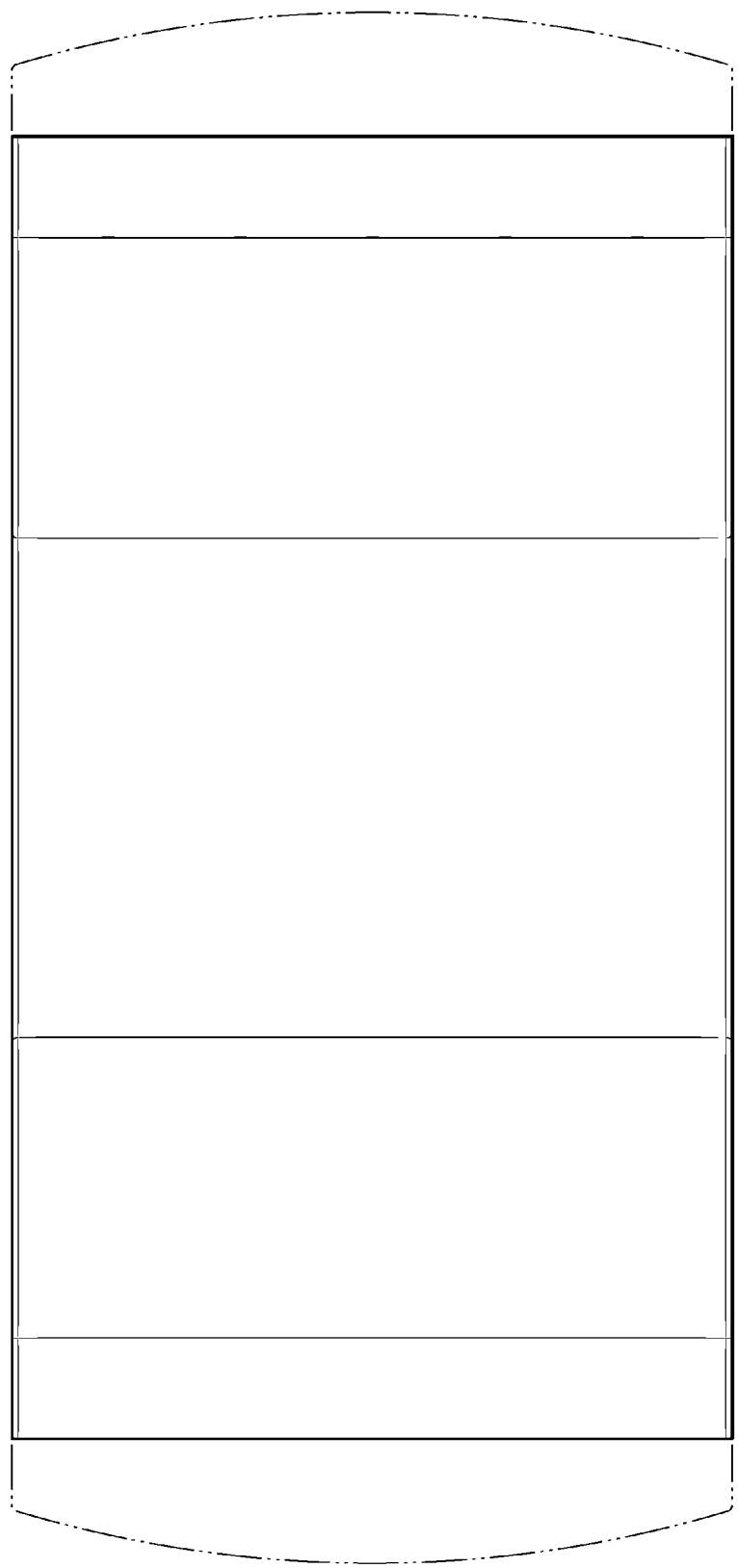
FIG. 24 is a front view of the data entry device of FIG. 20.
Figure 25:
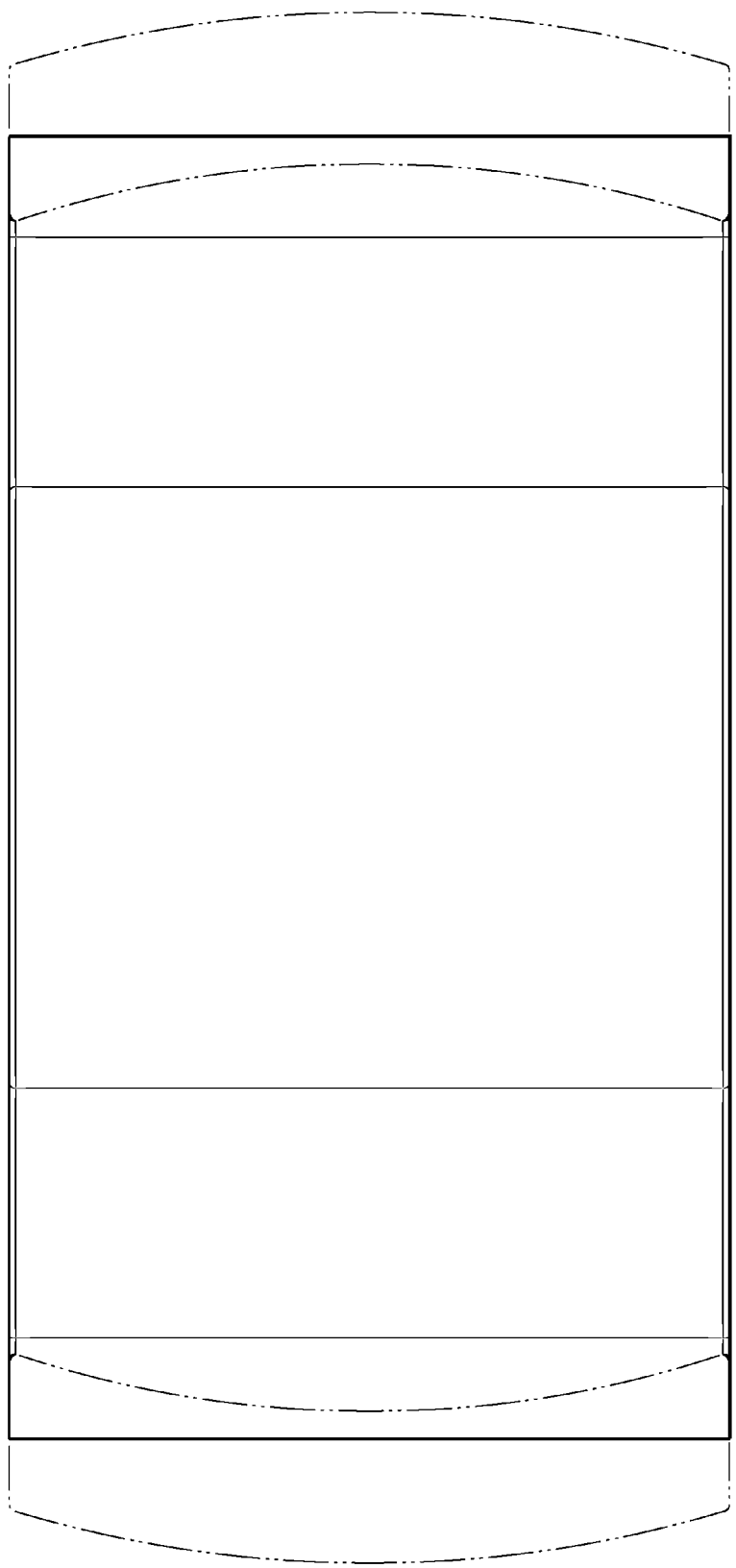
FIG. 25 is a rear view of the data entry device of FIG. 20.
Figure 26:
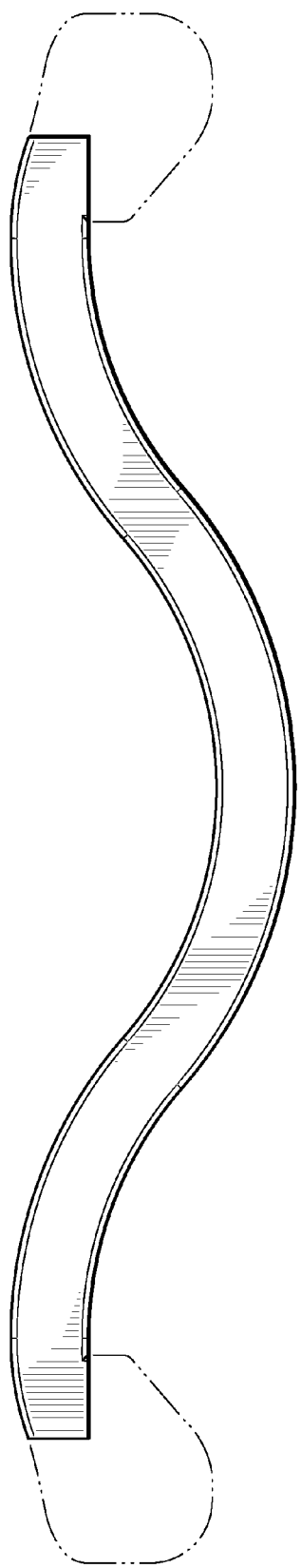
FIG. 26 is a bottom view of the data entry device of FIG. 20, and a top view of the data entry device of FIG. 20 is a mirror image of FIG. 26.
Figure 27:
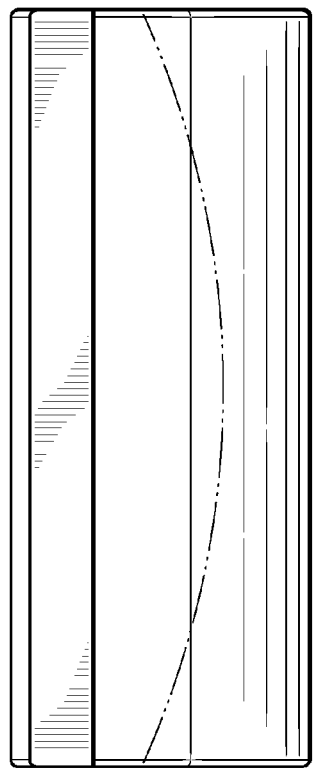
FIG. 27 is a right side view of the data entry device of FIG. 20, and a left side view of the data entry device of FIG. 20 is identical to FIG. 27.
Figure 28:
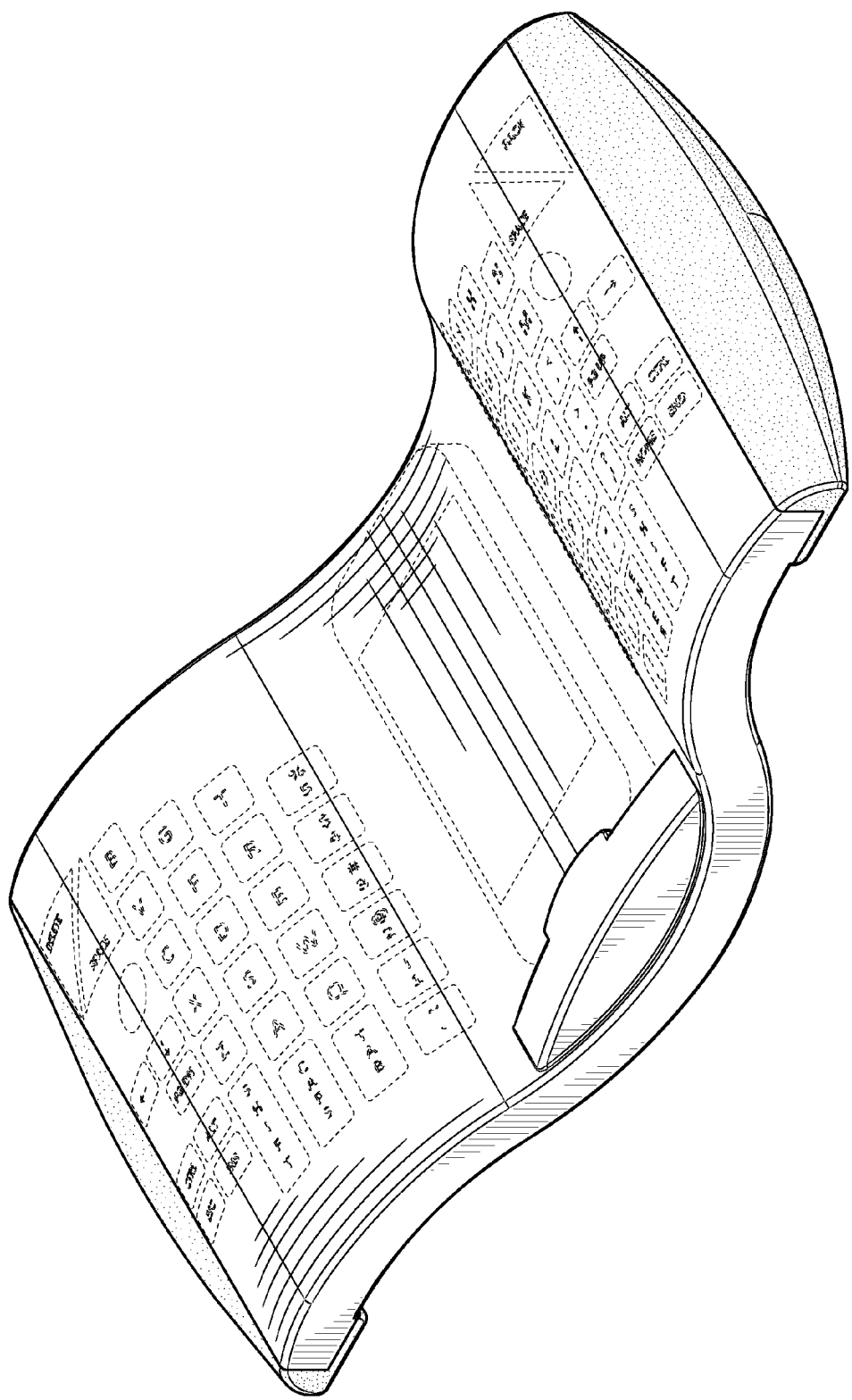
FIG. 28 is a front isometric view of a data entry device with environment.
Figure 29:
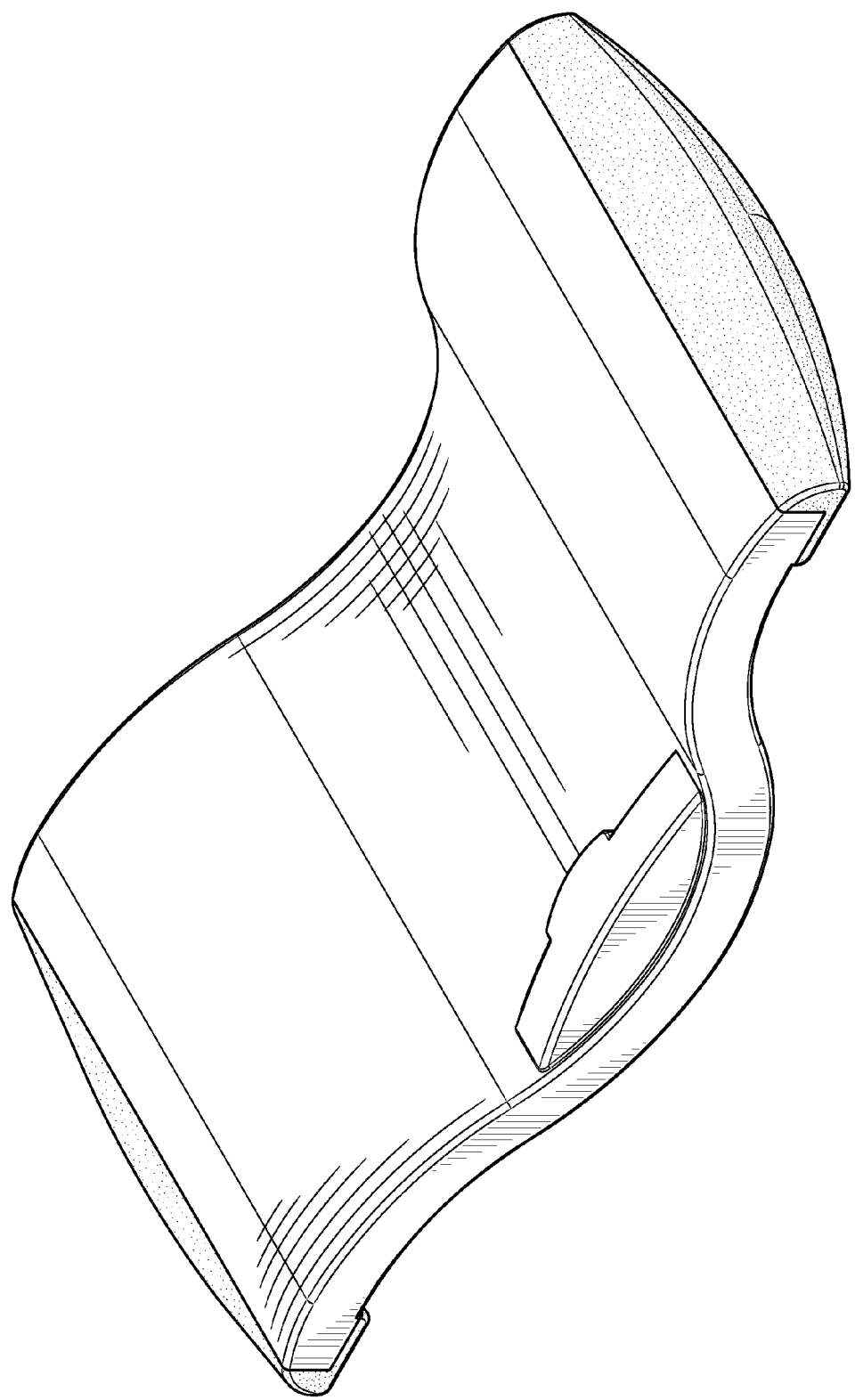
FIG. 29 is a front isometric view of the data entry device of FIG. 28.
Figure 30:
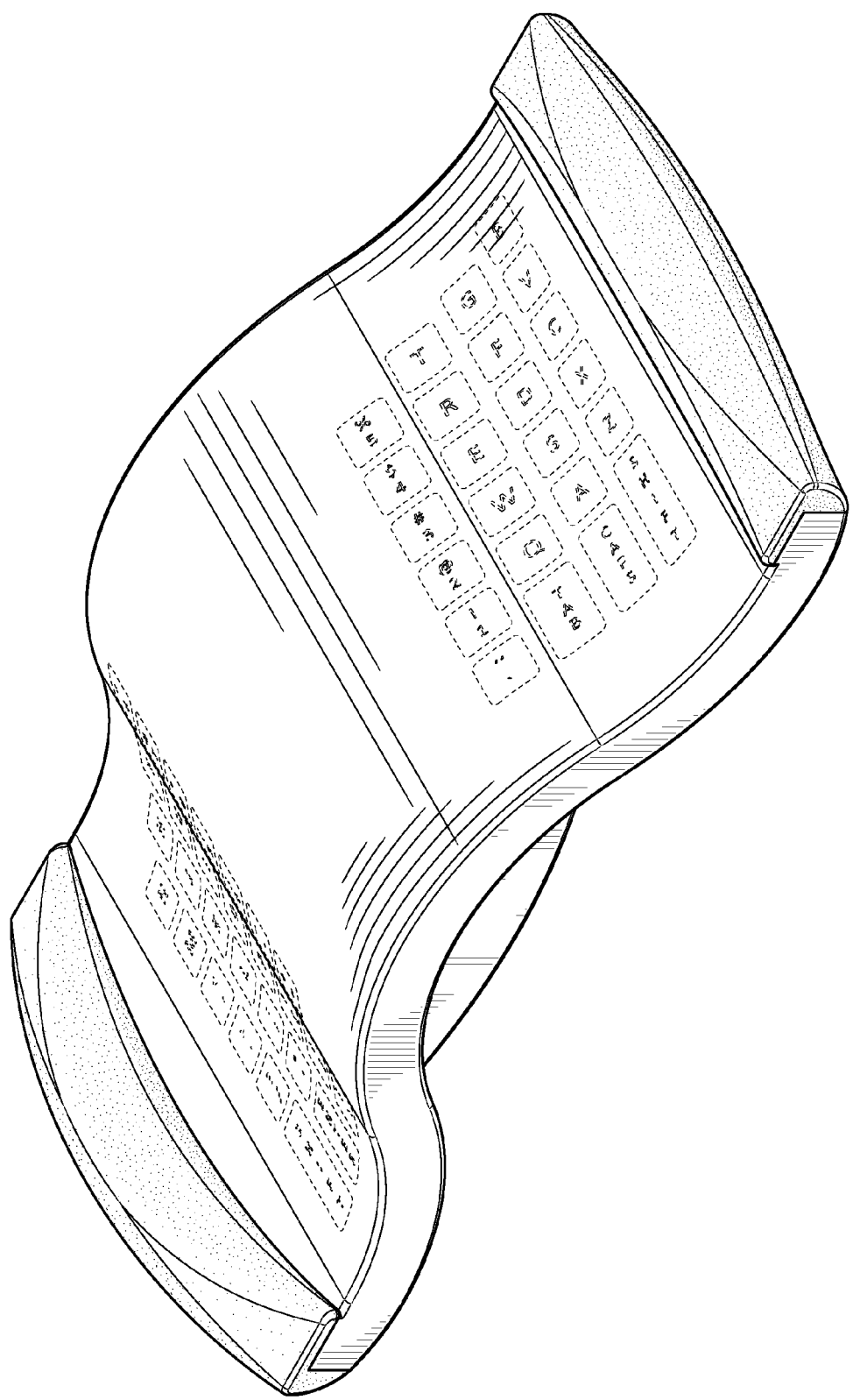
FIG. 30 is a rear isometric view of the data entry device of FIG. 28 with environment.
Figure 31:
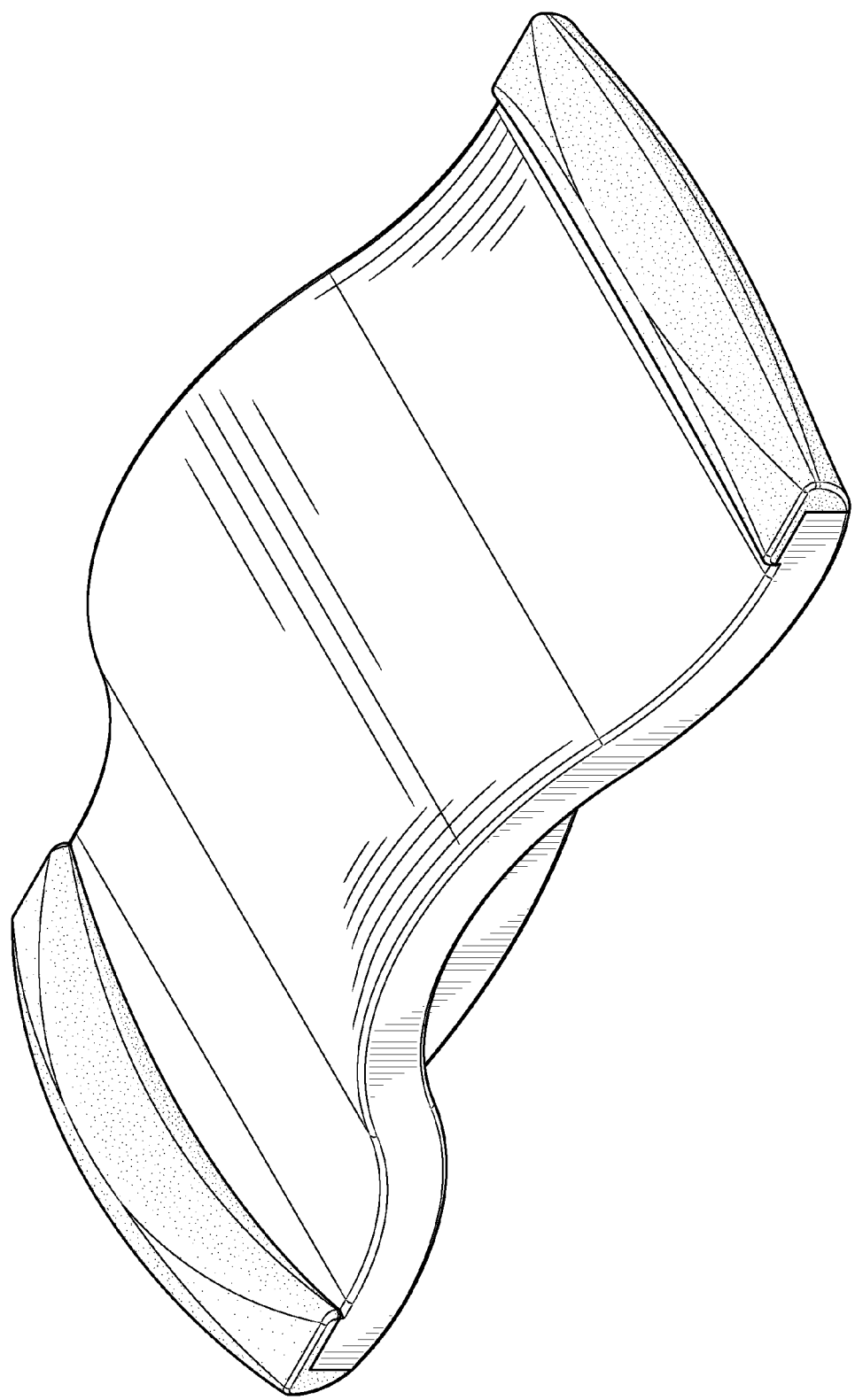
FIG. 31 is a rear isometric view of the data entry device of FIG. 28.
Figure 32:
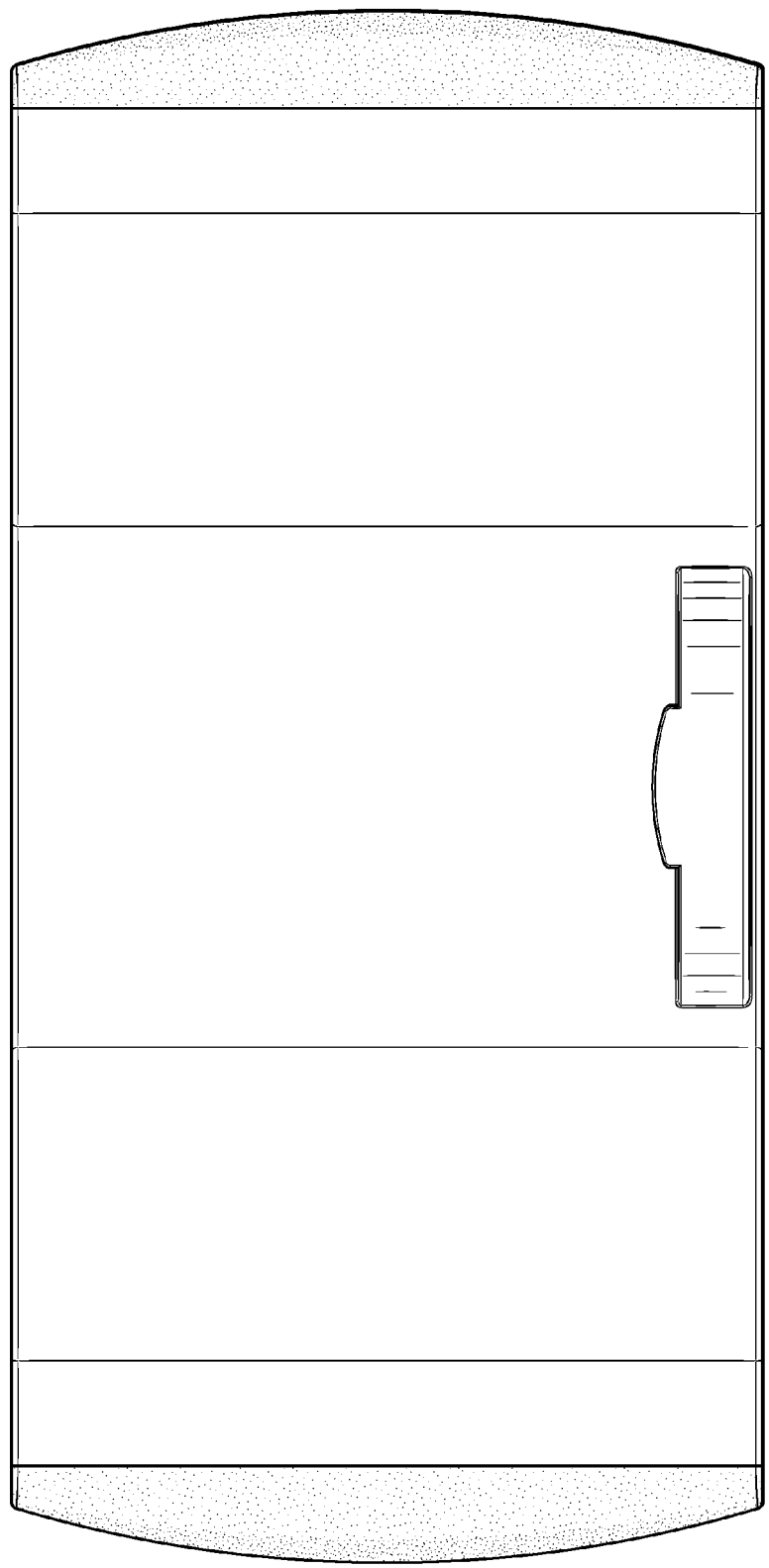
FIG. 32 is a front view of the data entry device of FIG. 28.
Figure 33:
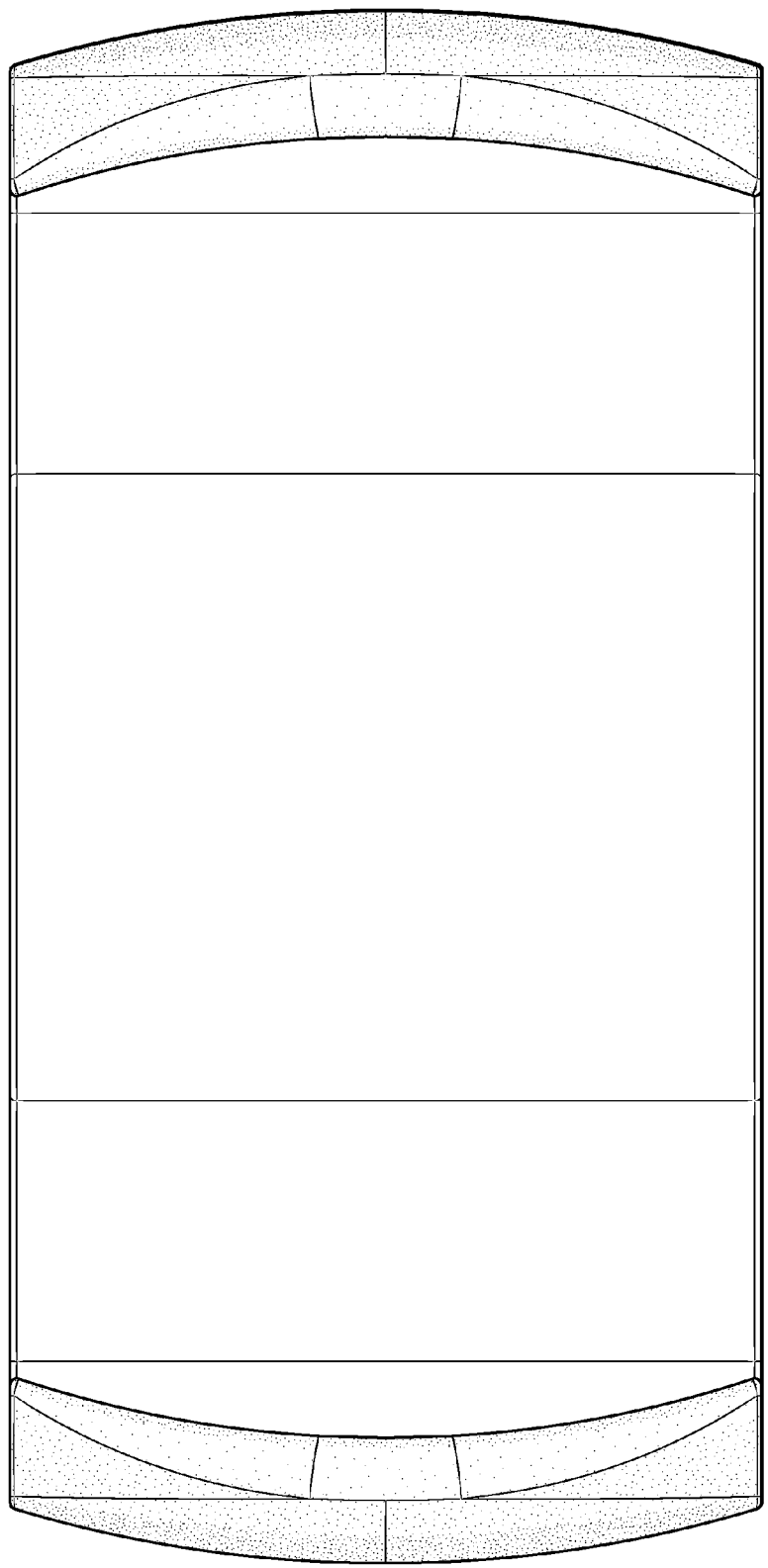
FIG. 33 is a rear view of the data entry device of FIG. 28.
Figure 34:
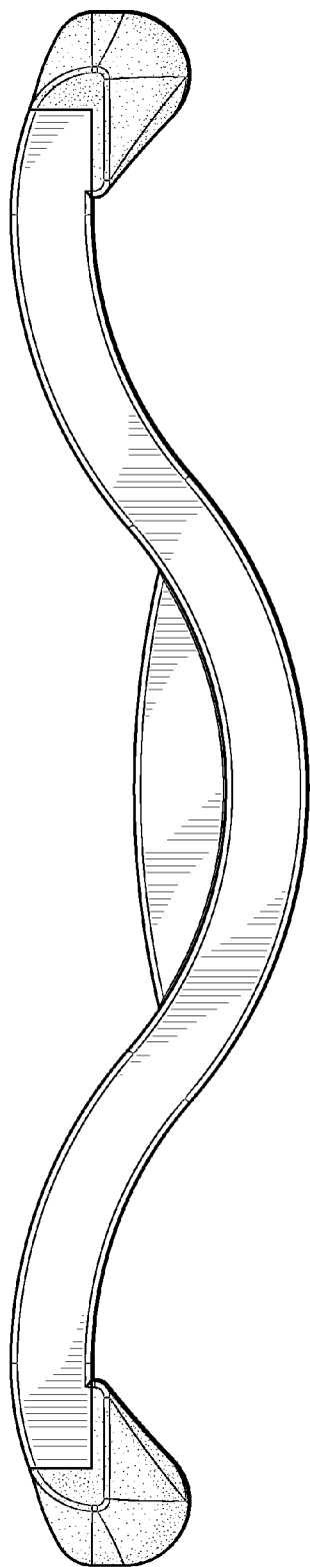
FIG. 34 is a bottom view of the data entry device of FIG. 28.
Figure 35:
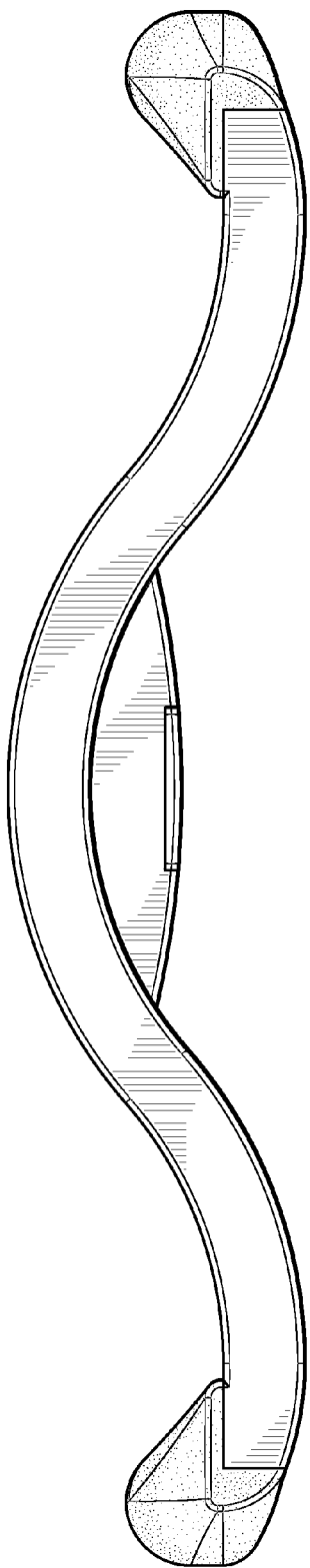
FIG. 35 is a top view of the data entry device of FIG. 28.
Figure 36:
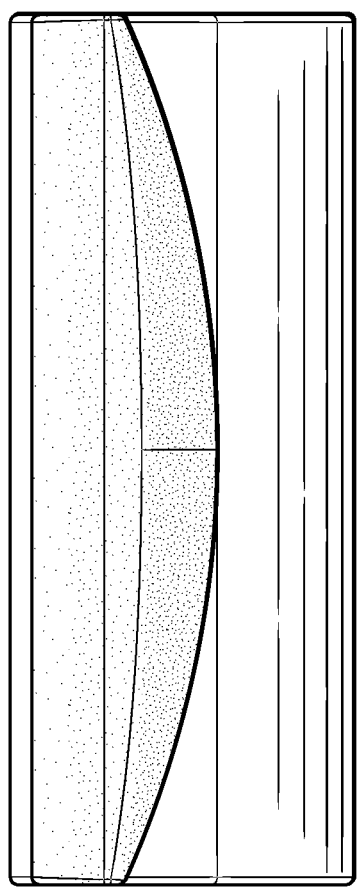
FIG. 36 is a right side view of the data entry device of FIG. 28, and a left side view of the data entry device of FIG. 28 is identical to FIG. 36.
Figure 37:
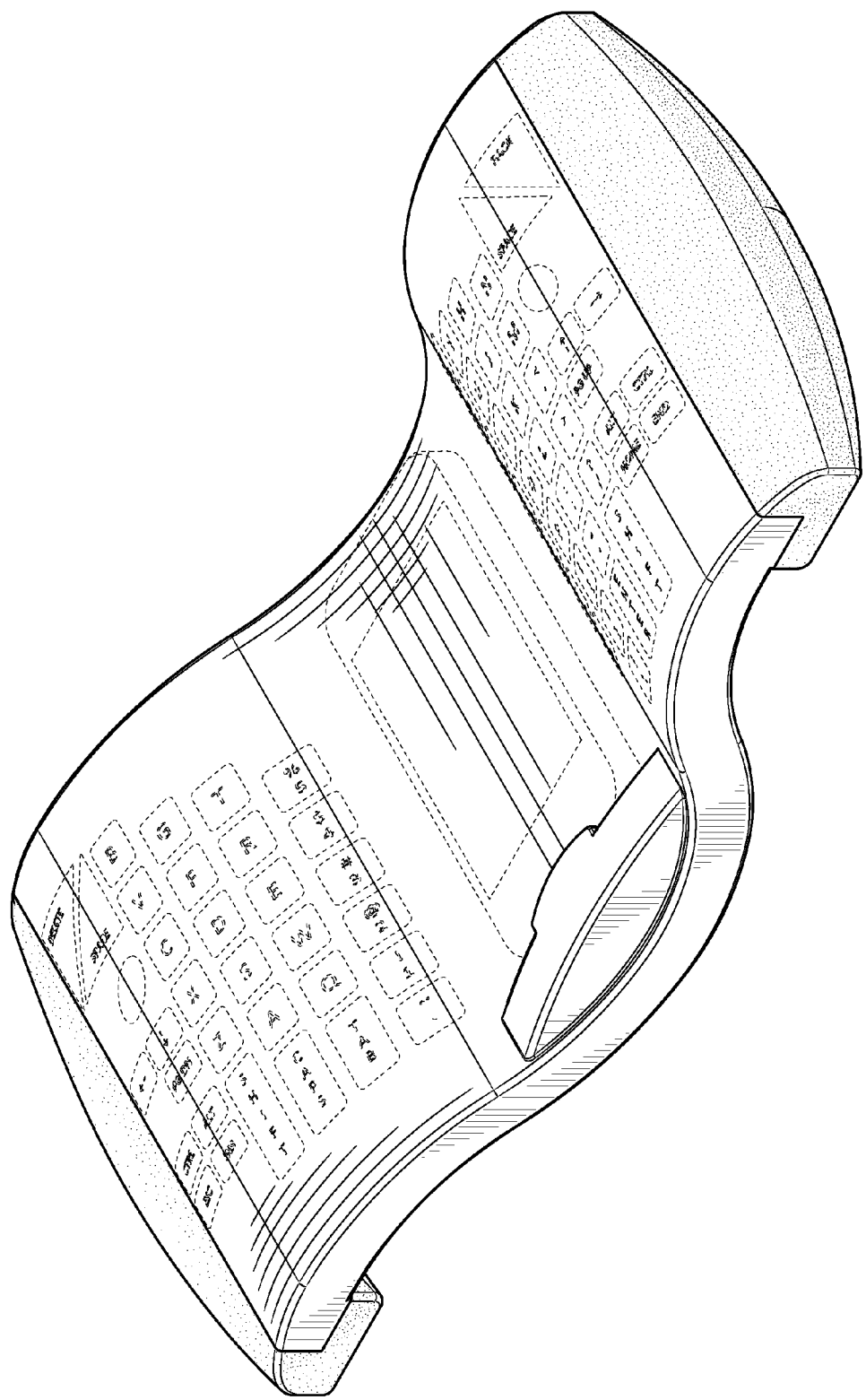
FIG. 37 is a front isometric view of a data entry device with environment.
Figure 38:
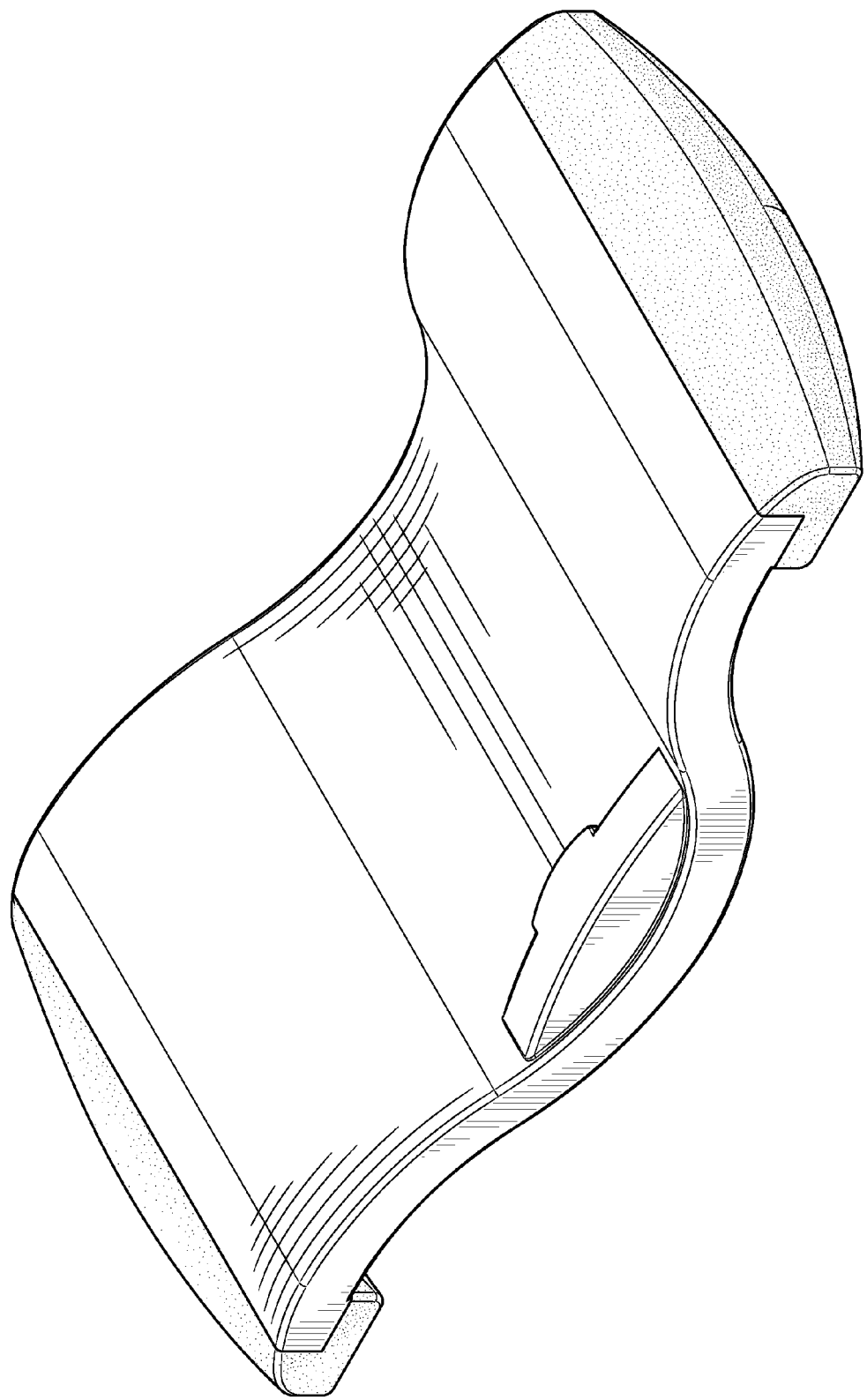
FIG. 38 is a front isometric view of the data entry device of FIG. 37.
Figure 39:
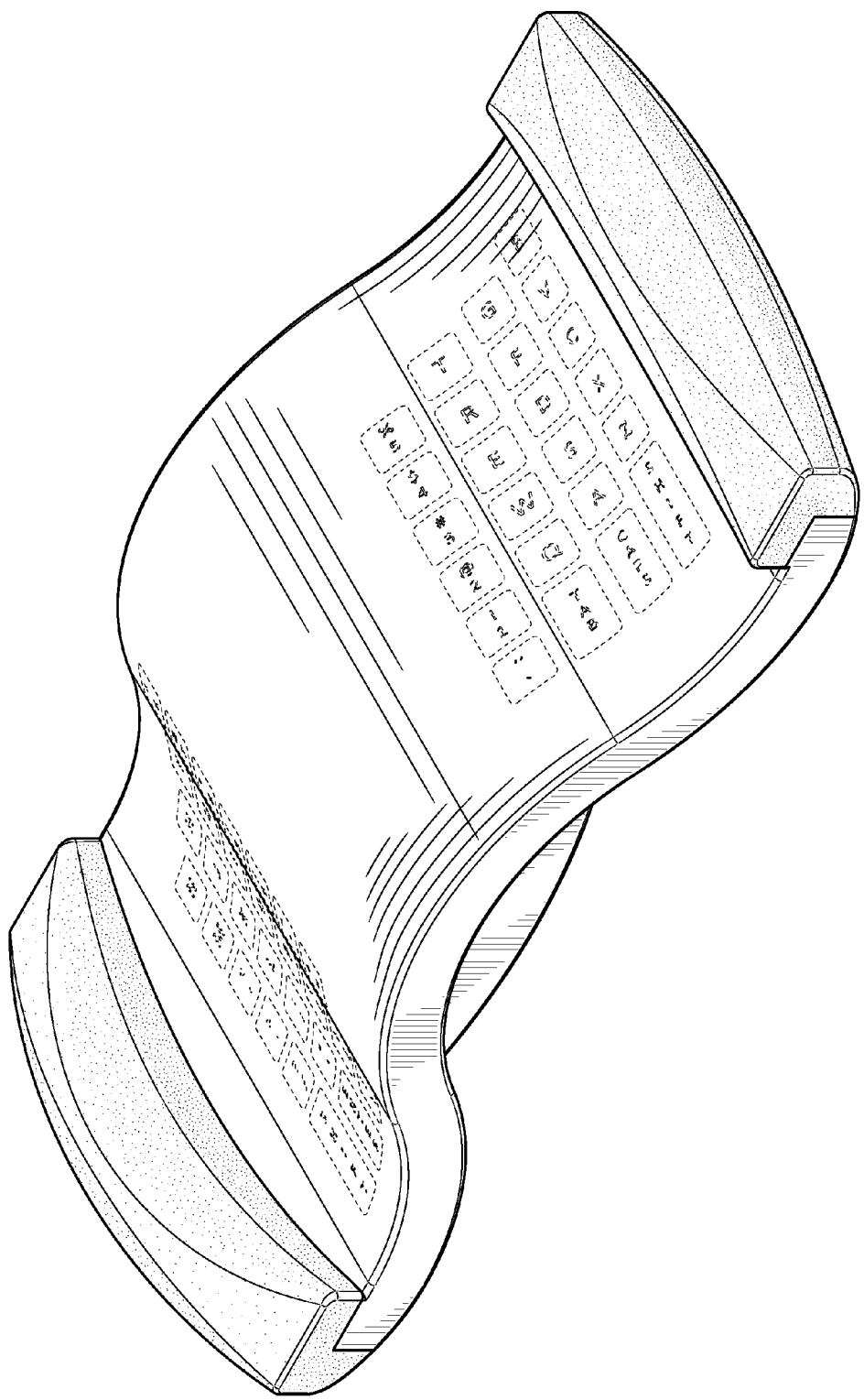
FIG. 39 is a rear isometric view with environment of the data entry device of FIG. 37.
Figure 40:
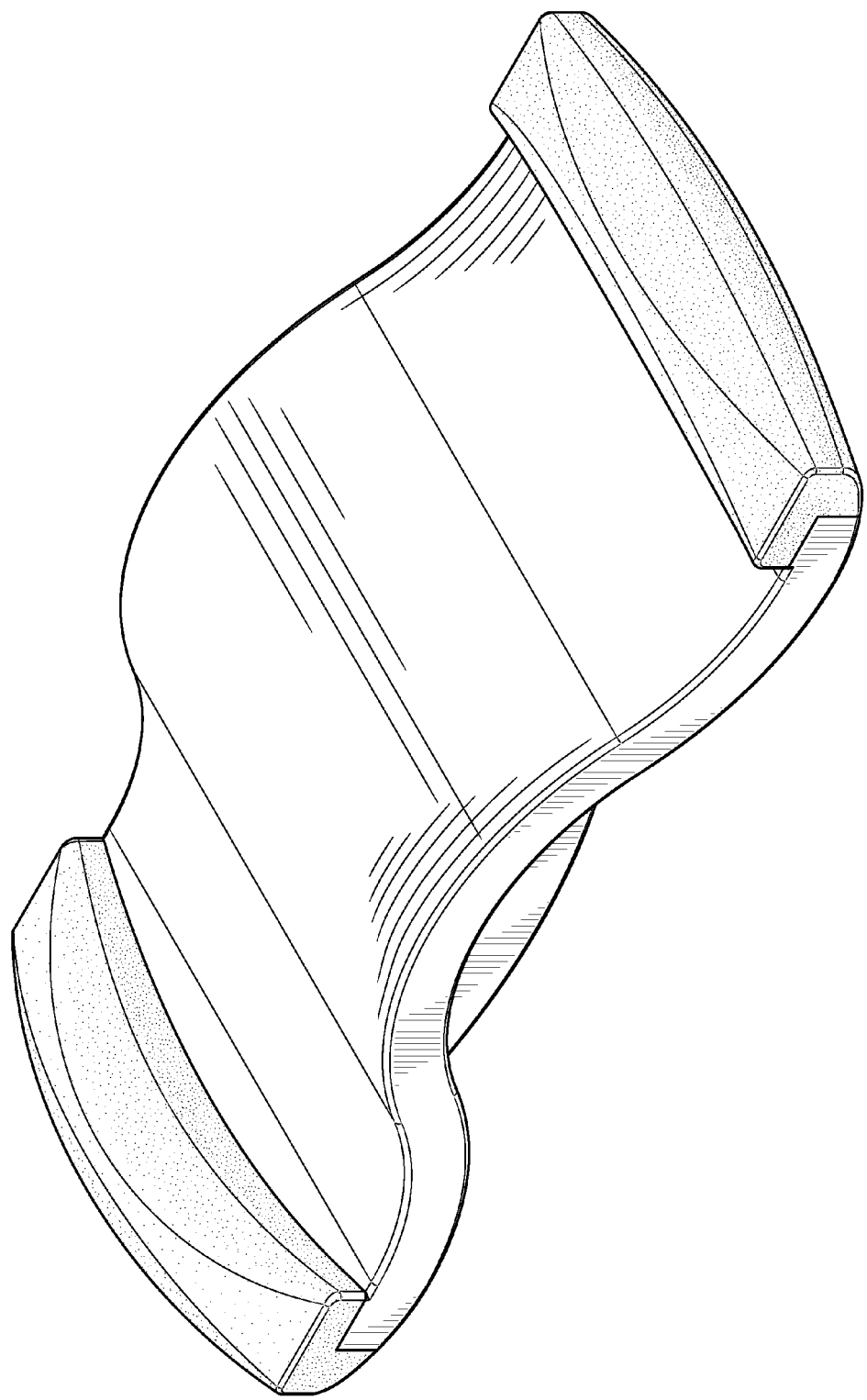
FIG. 40 is a rear isometric view of the data entry device of FIG. 37.
Figure 41:
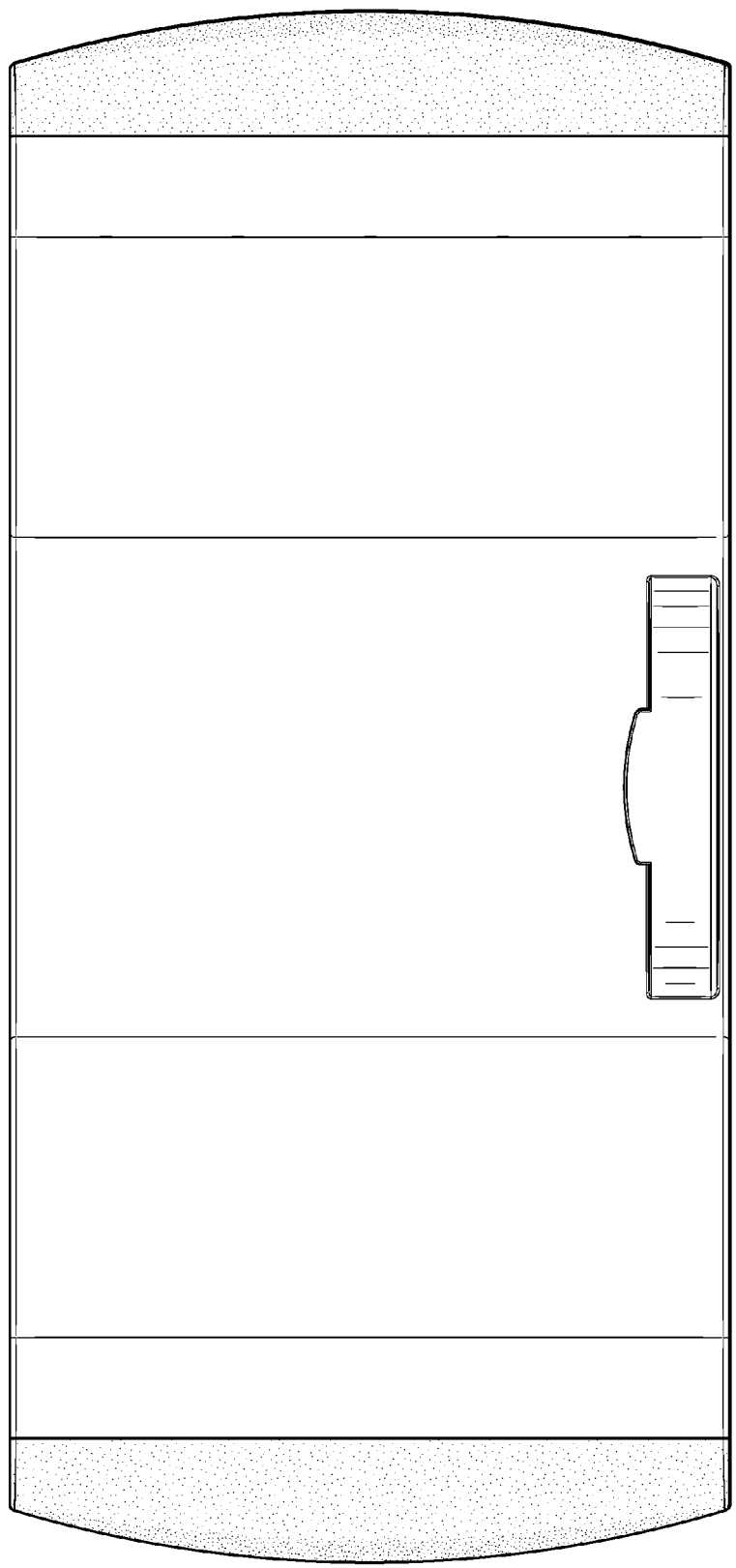
FIG. 41 is a front view of the data entry device of FIG. 37.
Figure 42:
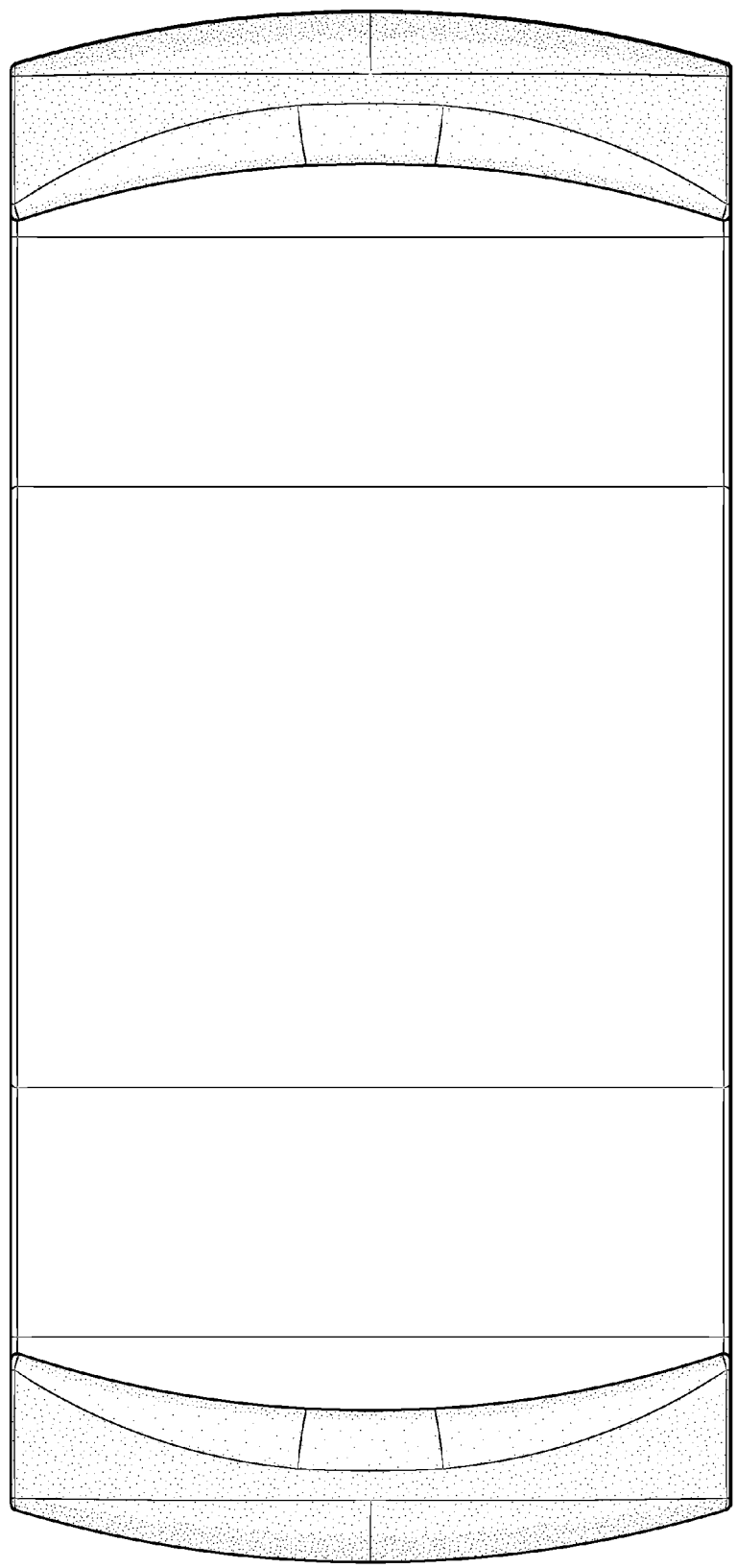
FIG. 42 is a rear view of the data entry device of FIG. 37.
Figure 43:
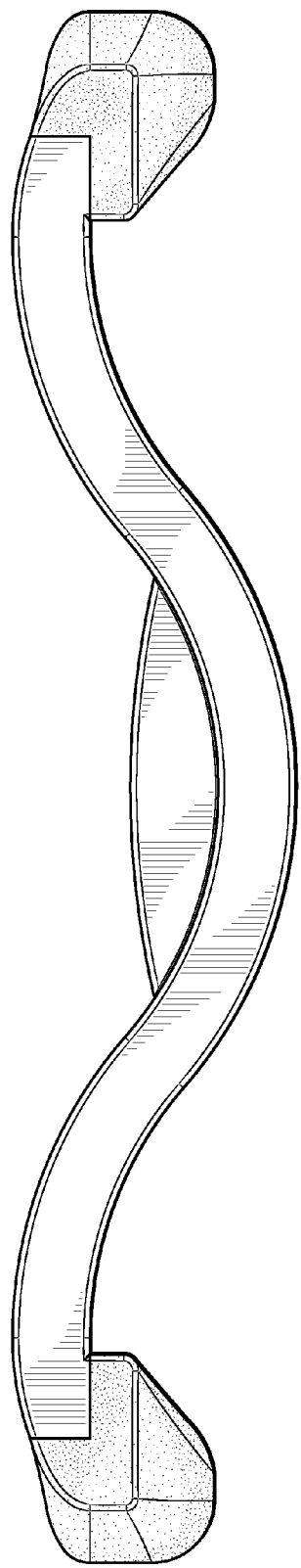
FIG. 43 is a bottom view of the data entry device of FIG. 37.
Figure 44:
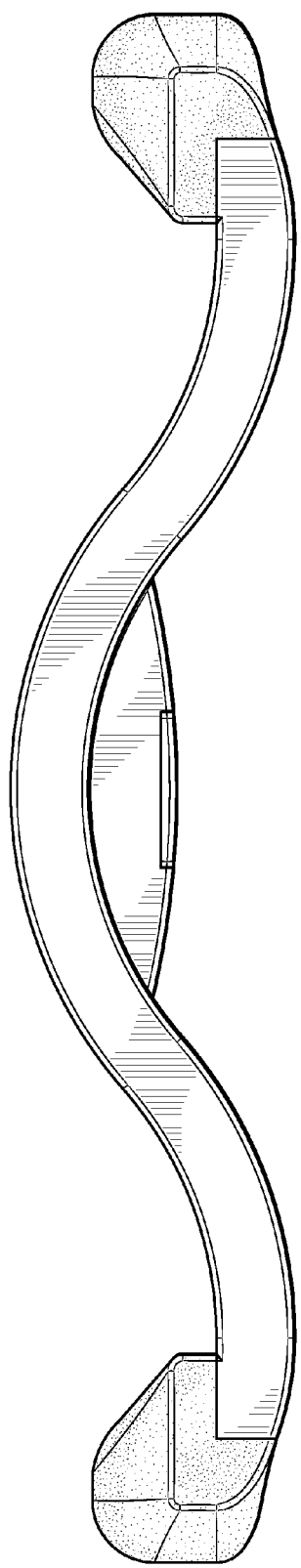
FIG. 44 is a top view of the data entry device of FIG. 37.
Figure 45:
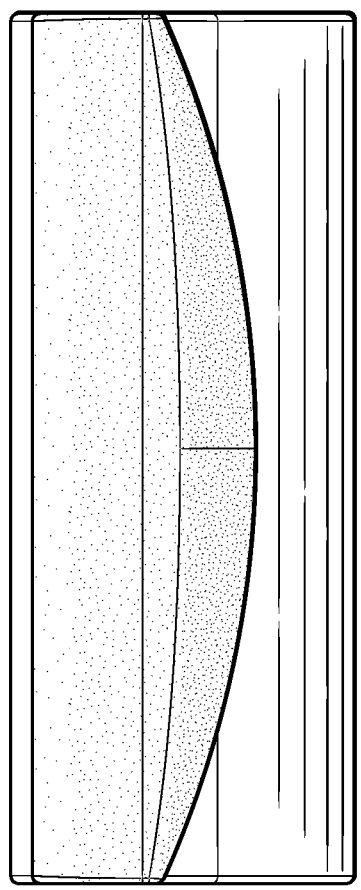
FIG. 45 is a right side view of the data entry device of FIG. 37, and a left side view of the data entry device of FIG. 37 is identical to FIG. 45.
Figure 46:
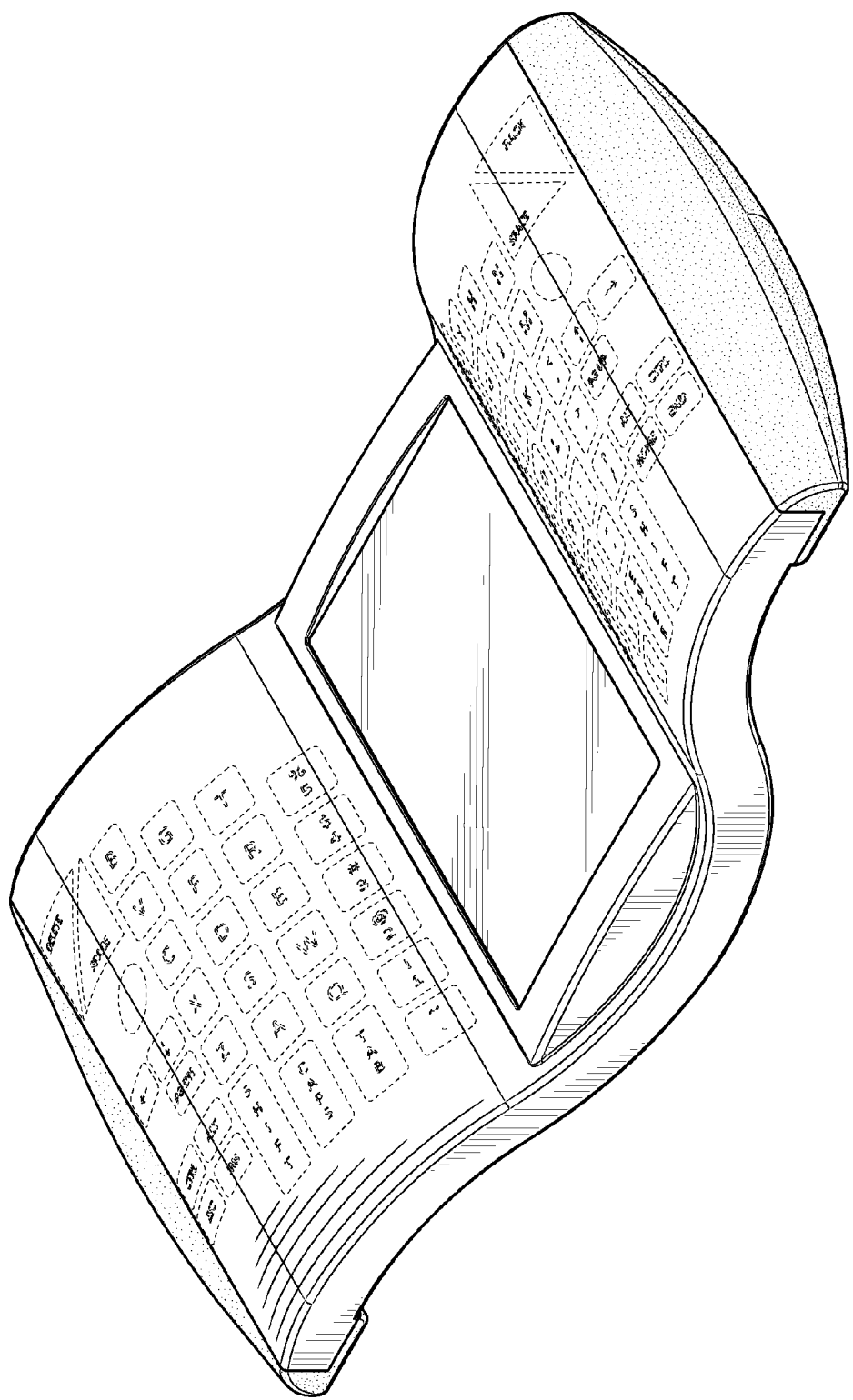
FIG. 46 is a front isometric view of a data entry device with environment.
Figure 47:
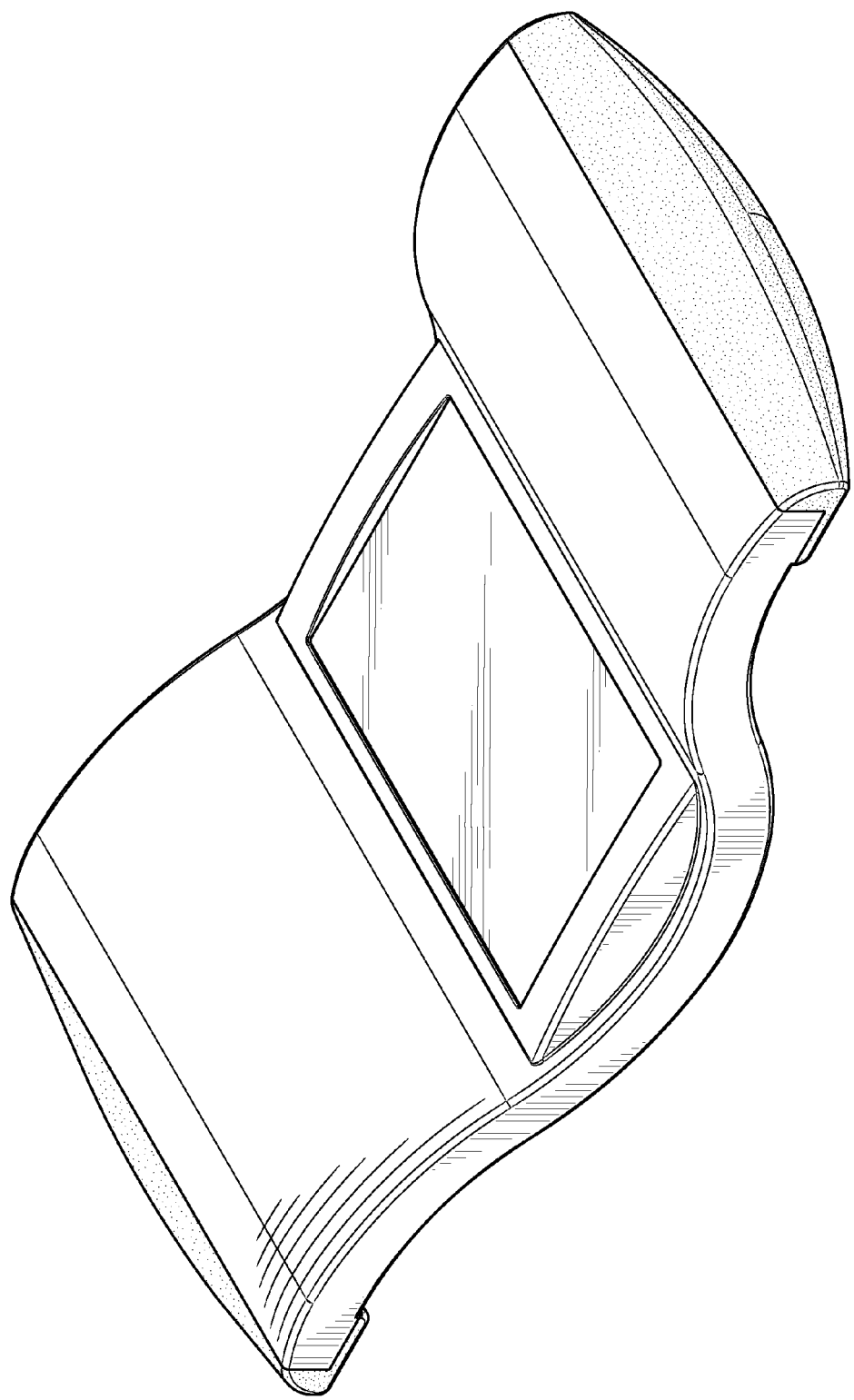
FIG. 47 is a front isometric view of the data entry device of FIG. 46.
Figure 48:
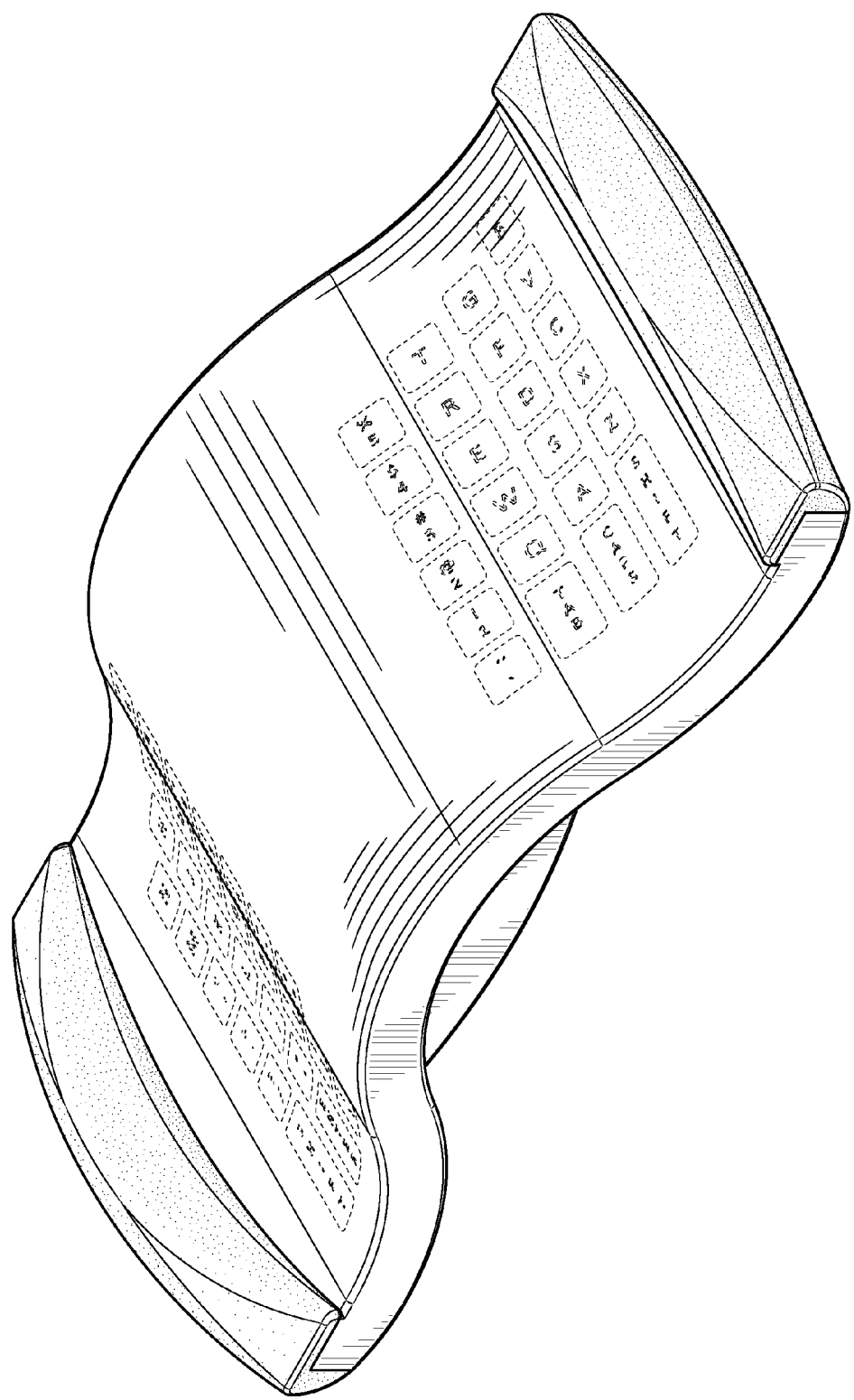
FIG. 48 is a rear isometric view of the data entry device of FIG. 46 with environment.
Figure 49:
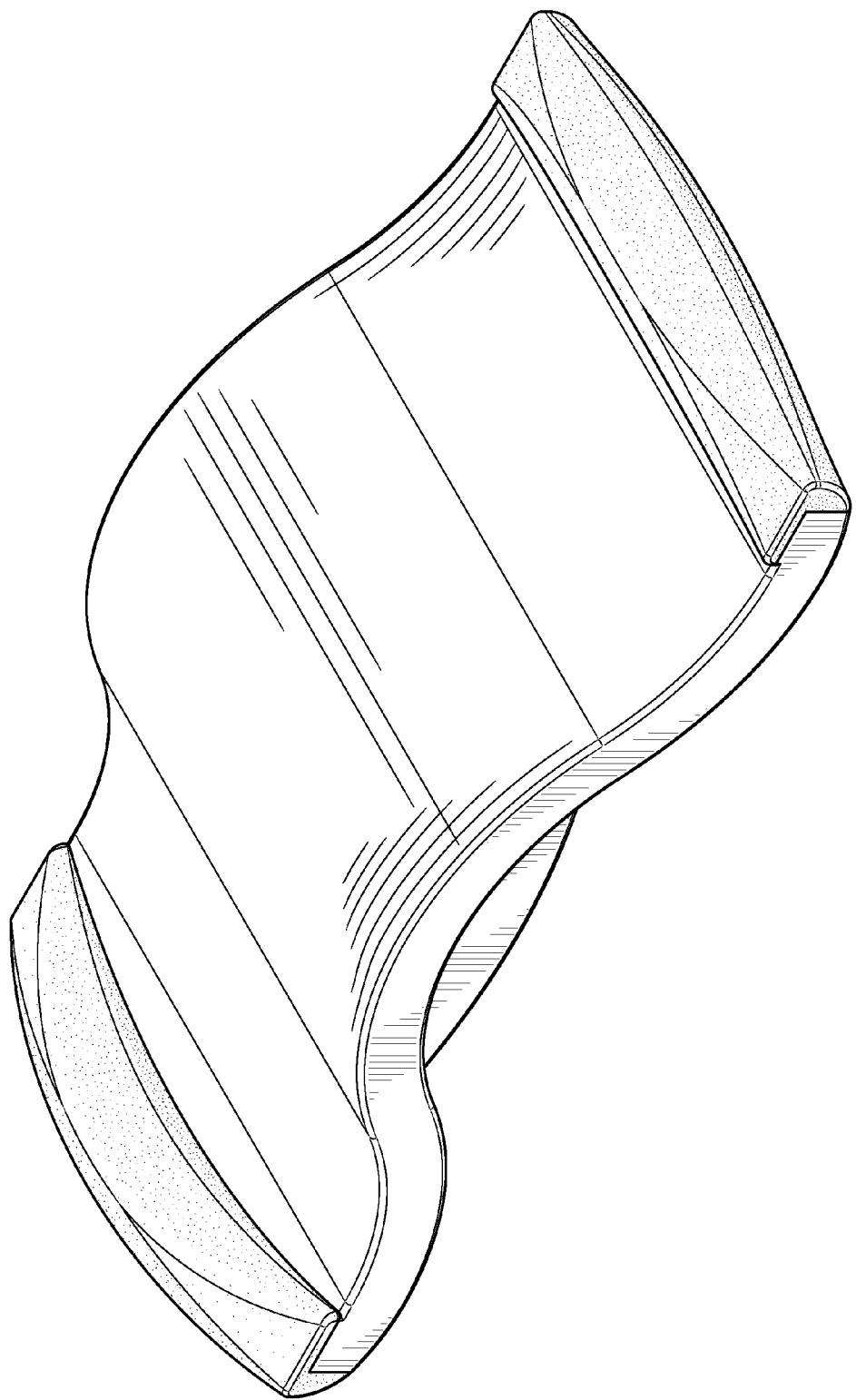
FIG. 49 is a rear isometric view of the data entry device of FIG. 46.
Figure 50:
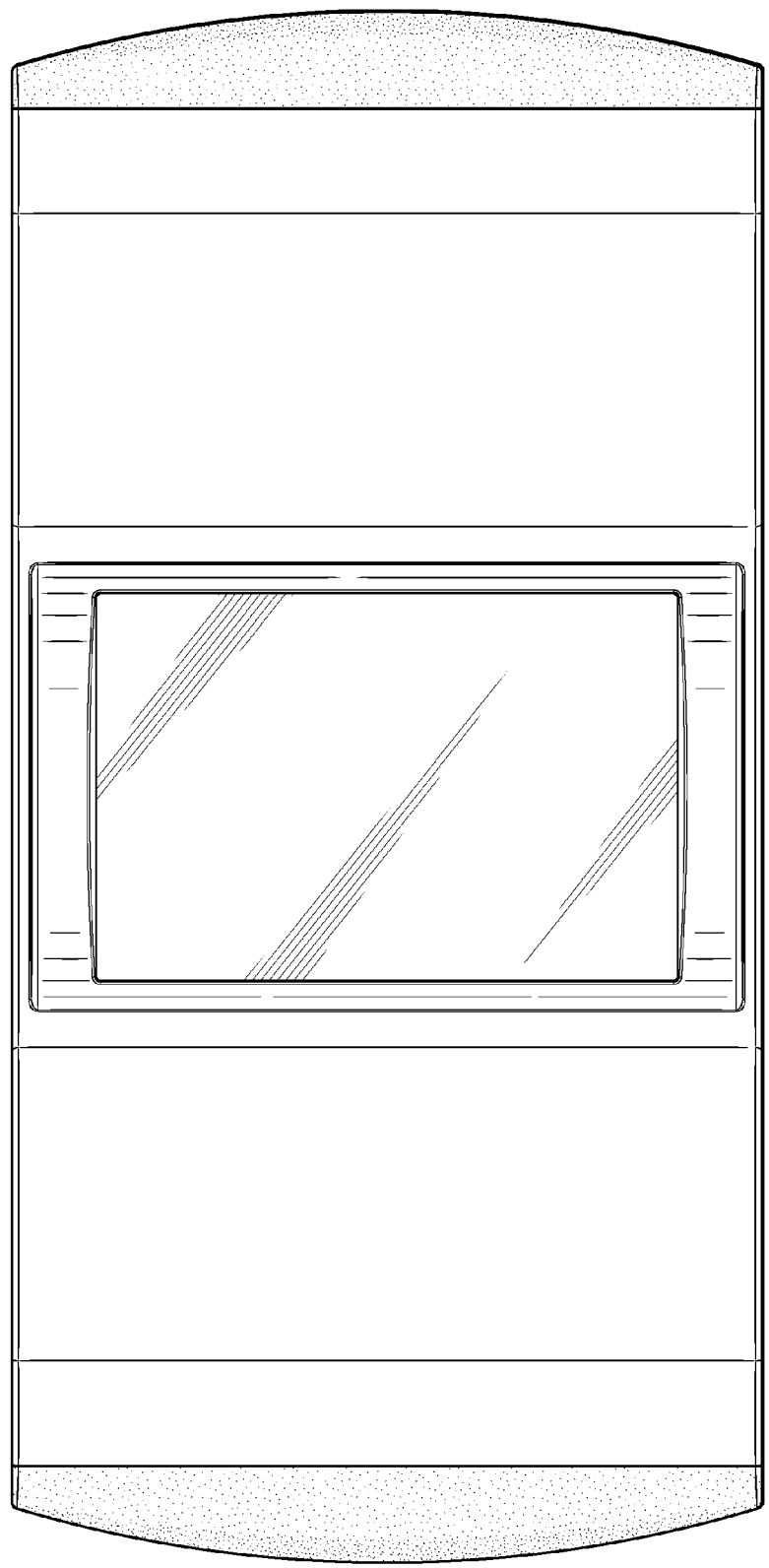
FIG. 50 is a front view of the data entry device of FIG. 46.
Figure 51:
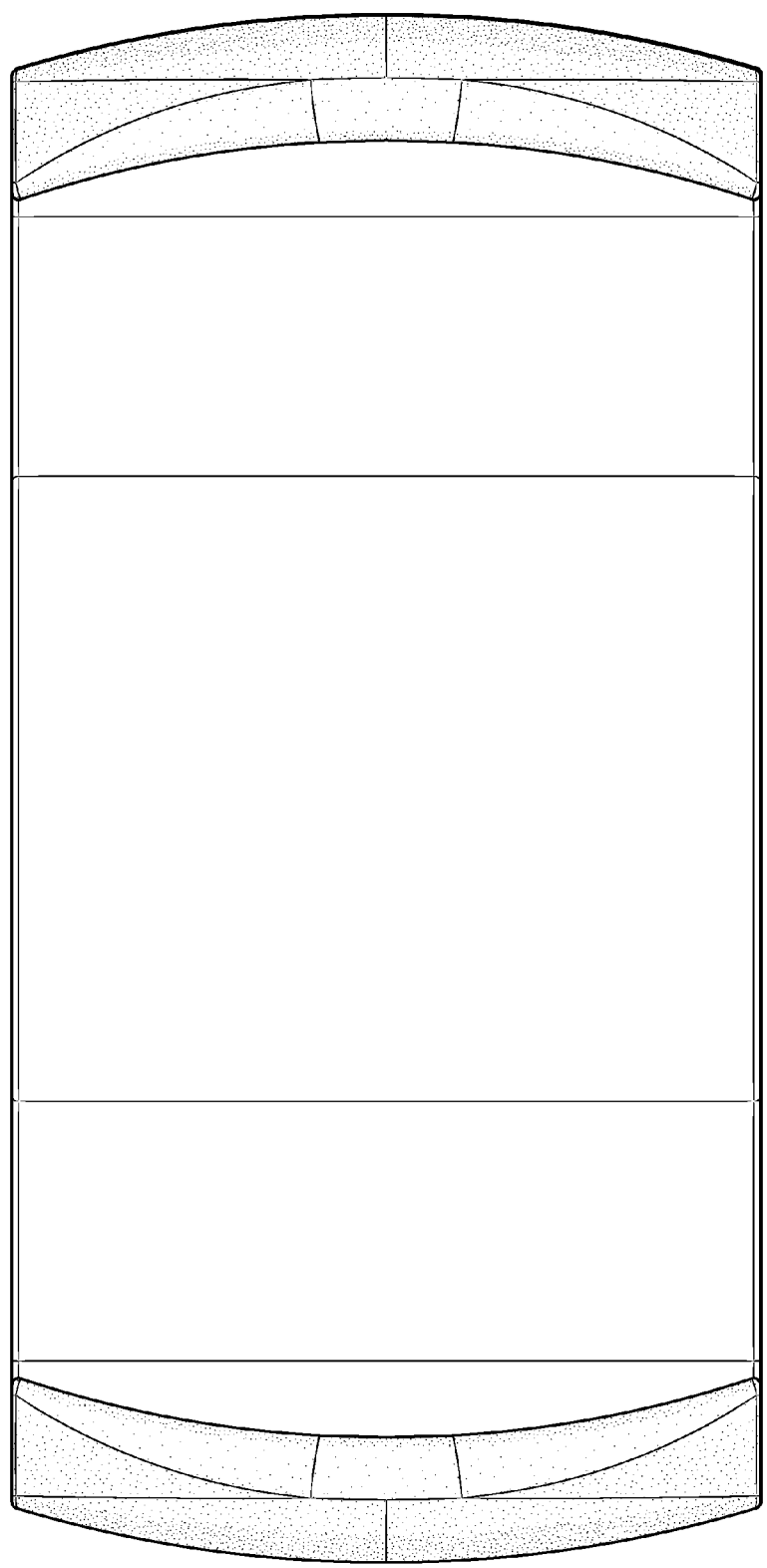
FIG. 51 is a rear view of the data entry device of FIG. 46.
Figure 52:
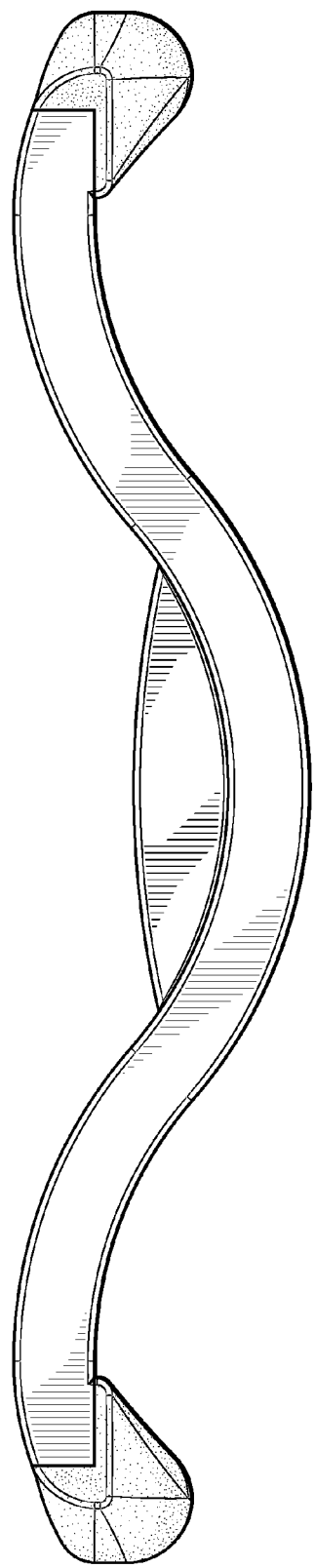
FIG. 52 is a bottom view of the data entry device of FIG. 46, and a top view of the data entry device of FIG. 46 is a mirror image of FIG. 52.
Figure 53:
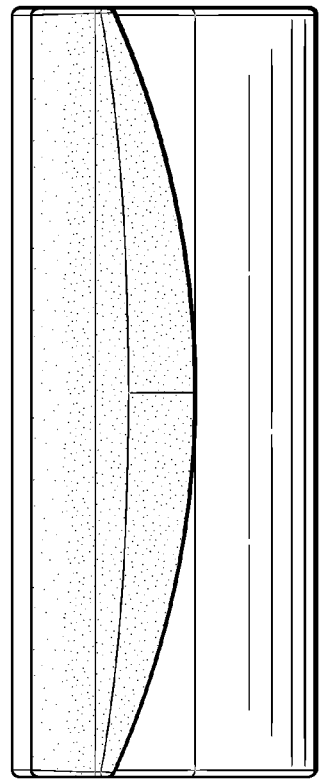
FIG. 53 is a right side view of the data entry device of FIG. 46, and a left side view of the data entry device of FIG. 46 is identical to FIG. 53.
Figure 54:
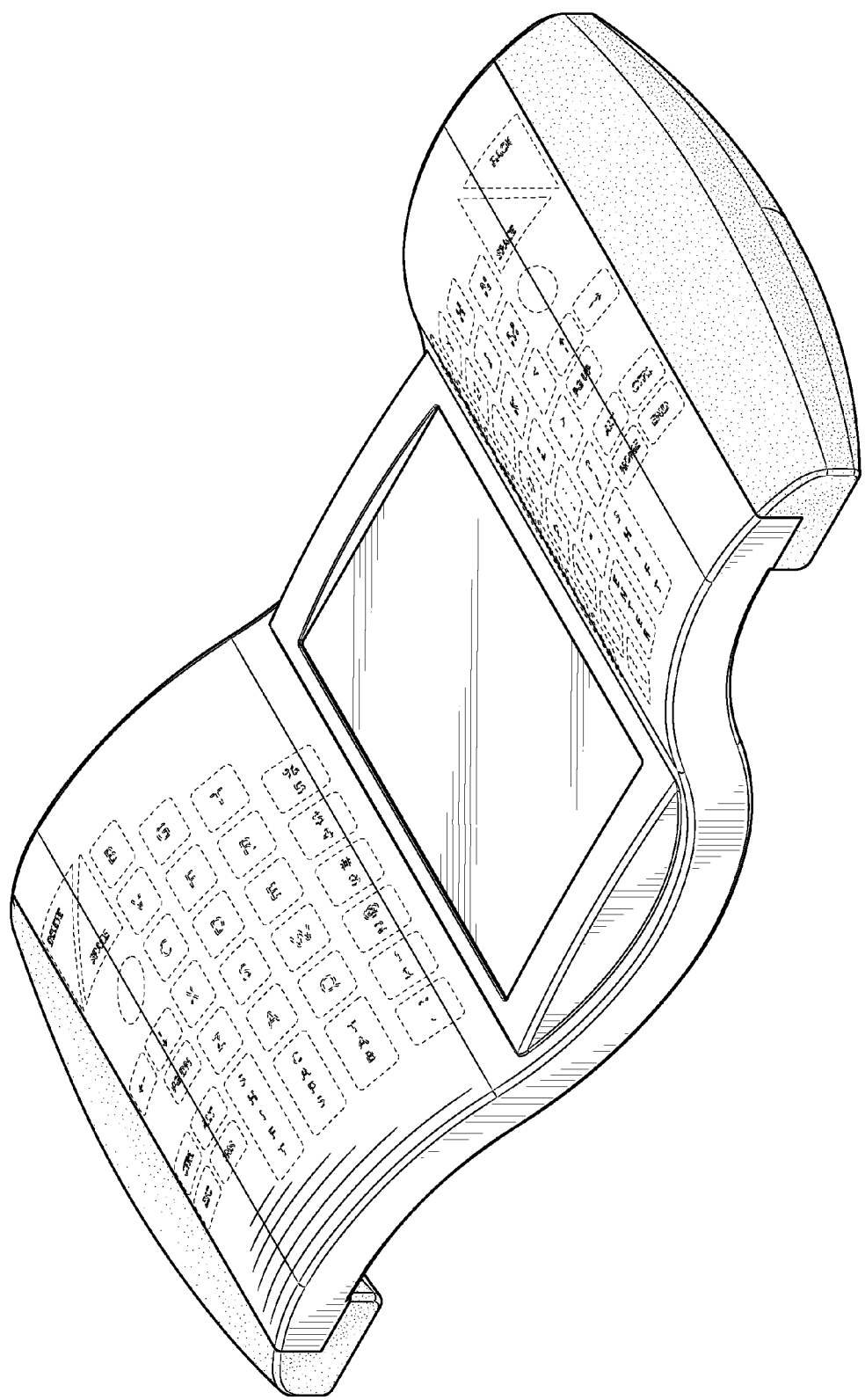
FIG. 54 is a front isometric view of a data entry device with environment.
Figure 55:
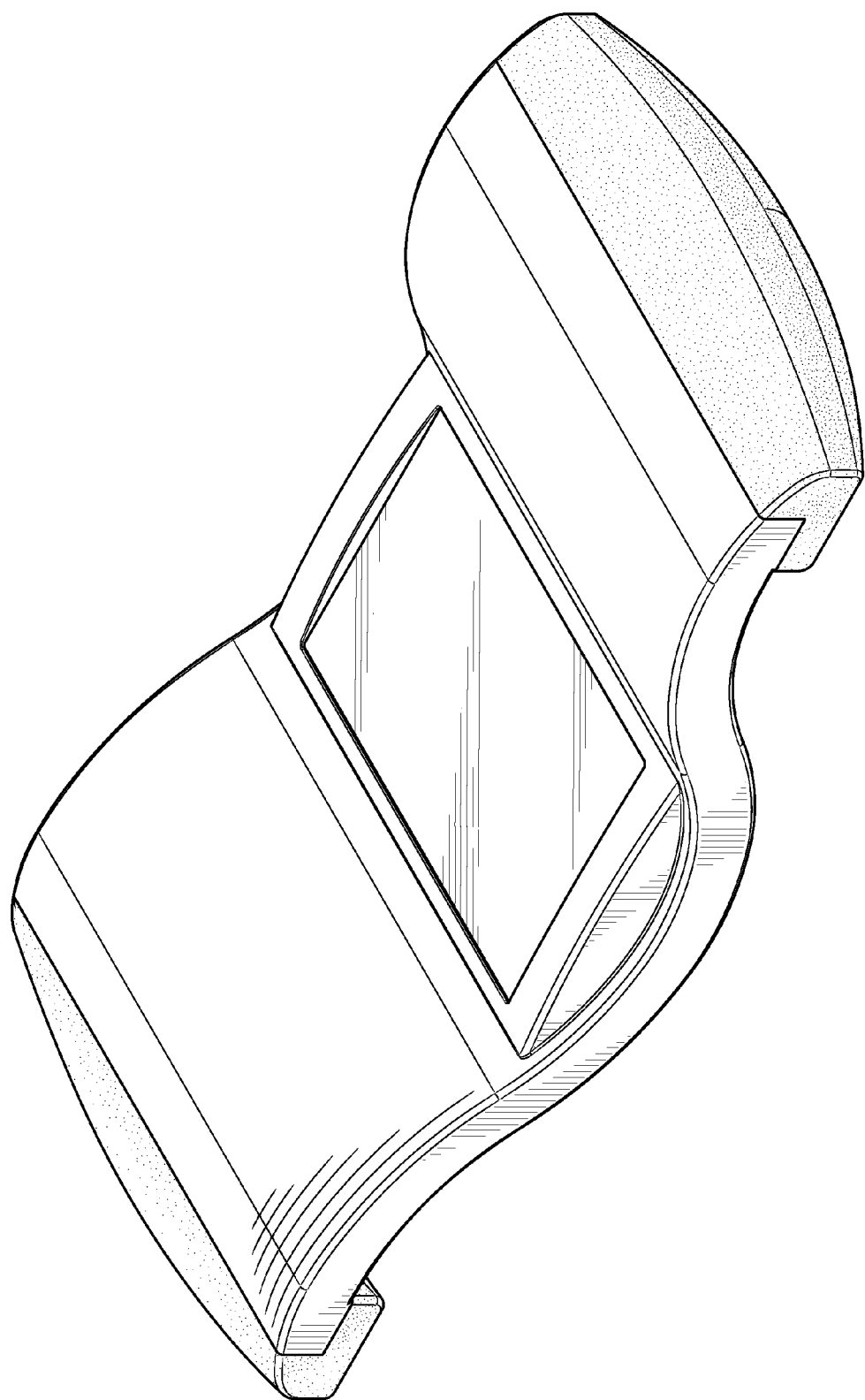
FIG. 55 is a front isometric view of the data entry device of FIG. 54.
Figure 56:
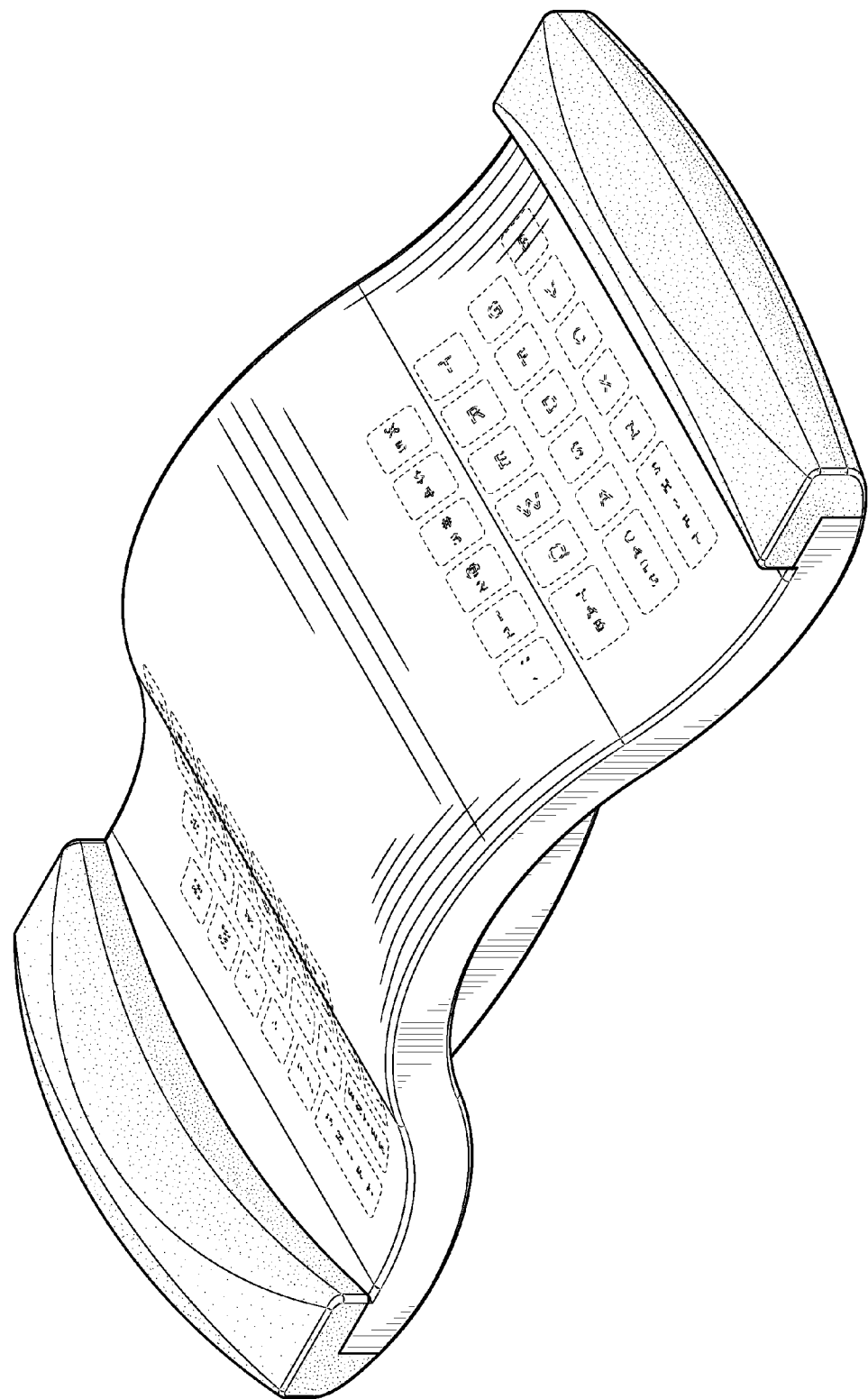
FIG. 56 is a rear isometric view of the data entry device of FIG. 54 with environment.
Figure 57:
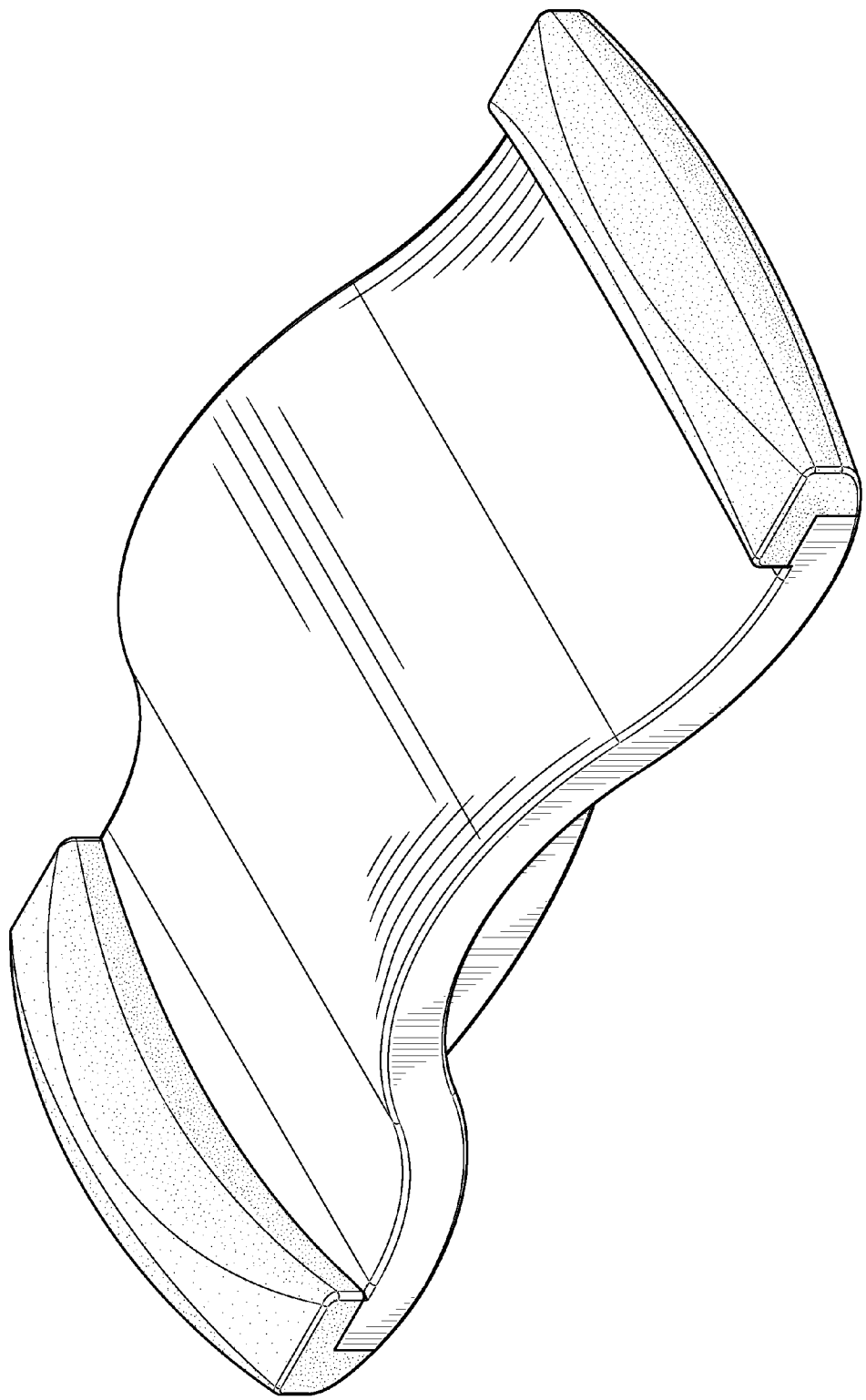
FIG. 57 is a rear isometric view of the data entry device of FIG. 54.
Figure 58:
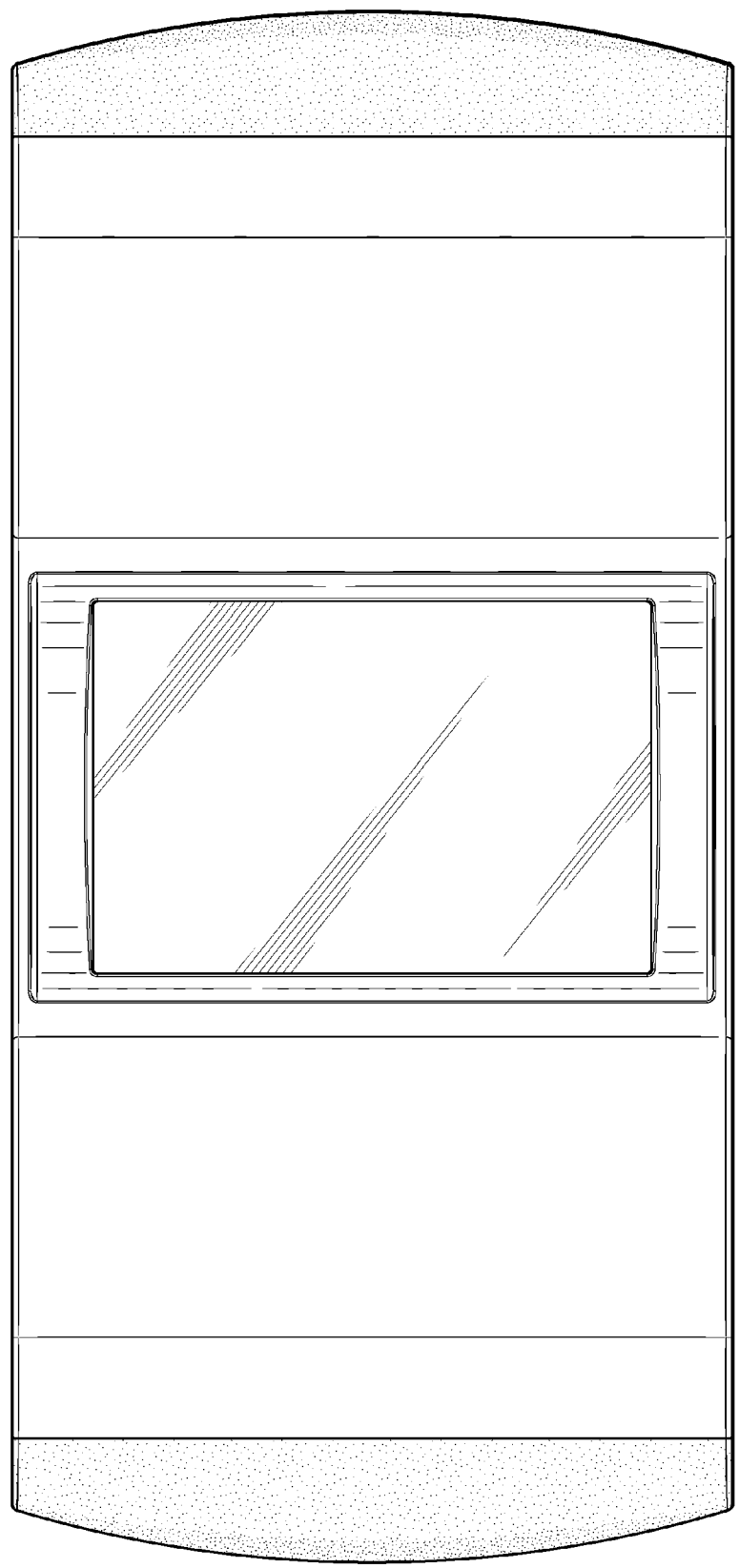
FIG. 58 is a front view of the data entry device of FIG. 54.
Figure 59:
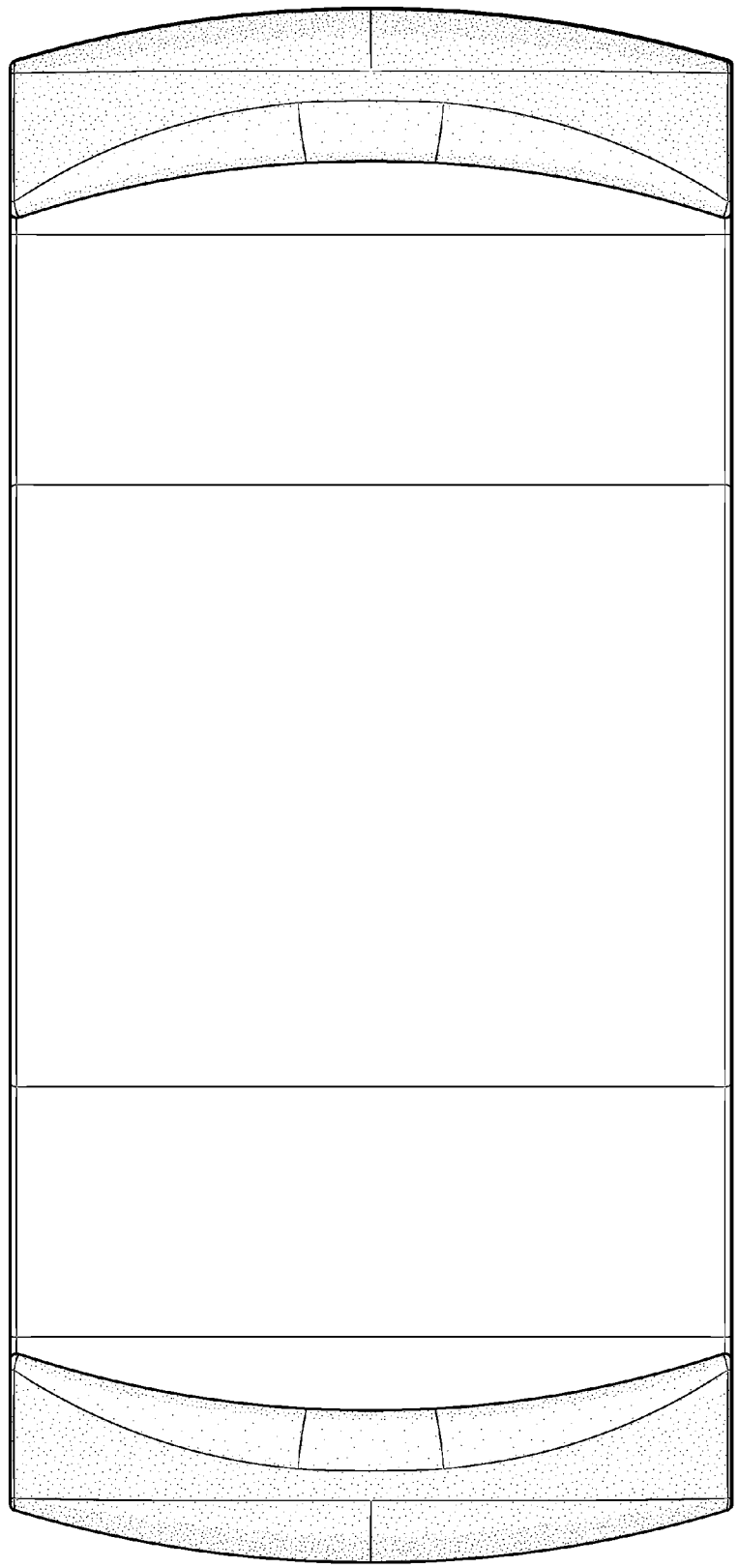
FIG. 59 is a rear view of the data entry device of FIG. 54.
Figure 60:
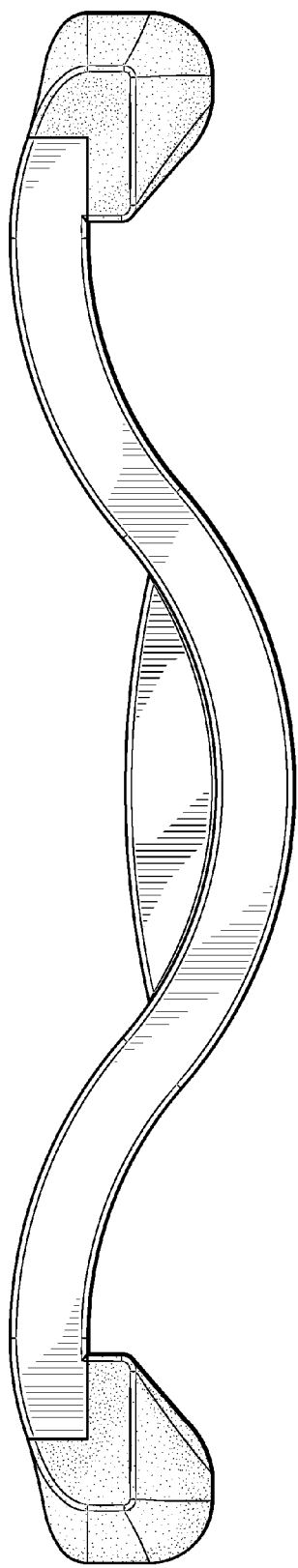
FIG. 60 is a bottom view of the data entry device of FIG. 54, and a top view of the data entry device of FIG. 54 is a mirror image of FIG. 60.
Figure 61:
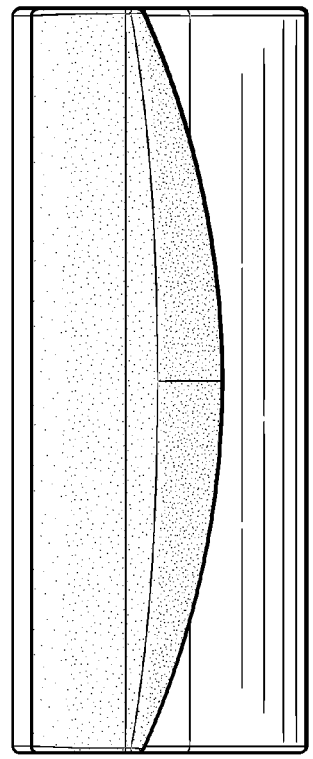
FIG. 61 is a right side view of the data entry device of FIG. 54, and a left side view of the data entry device of FIG. 54 is identical to FIG. 61.

The generally concave portions 20, 22 on the rear surface 16 facilitate positioning input keys 24 proximate the user's fingers for actuation while the user is holding the device 10 via the grip portions 18. FIG. 11 provides a view of a user's hand 400 engaging the grip portion 18 such that some of the user's fingers 402 are positioned proximate the generally concave portion 22 to actuate/touch input keys 24 positioned thereon. Generally, some input keys 24 positioned on either generally concave portion 22 on the rear surface 16 may be configured in rows. As shown in FIG. 11, such rows of input keys 24 may be positioned on the generally concave portion 22 with different axes of actuation, and/or some of the rows of input keys may be positioned in different planes. Positioning rows of input keys 24 in different planes and/or with different axes of actuation generally facilitates ergonomic typing for the user. As shown in FIG. 11, positioning the rows of input keys 24 in different planes and/or with different axes of actuation facilitates positioning the rows of input keys 24 proximate to the fingers 402 of the user's hand 400, such that a distance that the user's finger 402 generally travels to actuate a first input key 24 of a first row is similar to a distance that the user's finger 402 generally travels to actuate a different input key 24 of a different row. As such, each generally concave portion 20, 22 may minimize distances that the user's fingers 402 generally travels when typing on the device 10, 100, 200 while supporting the device 10, 100, 200 by holding the grip portions 18, 118, 218.

As shown in FIG. 11, the user's hands 400 engage the grip portions 18, while the user's fingers 402 may selectively actuate input keys 24 on the concave portions 20, 22 of the rear surface 16 of the housing 12 of the device 10. Therefore, consistent with embodiments of the invention, the user may input data with fingers 402 of both hands 400 while supporting the device 10. While not shown in FIG. 11, the user may also actuate input keys 24 positioned on the front surface 14 of the device 10 with the user's thumbs while supporting the device 10 by holding the grip portions 18. Moreover, while not shown in FIG. 11, the user may also provide input data by moving the device 10 while holding the device 10 at the grip portions 18, where the device may include one or more sensors 304 for detecting movement and generating input data based on such detected movement.

By way of example, the device 10 may include input keys 24 positioned on the rear surface 16 that generally correspond to letter/number keys of a QWERTY keyboard, where some of these input keys 24 corresponding to letter keys may be positioned on the generally concave portions 20, 22 of the rear surface 16. In addition, the device 10 may include other keys 24 that correspond to control keys, space bar keys, shift keys, one or more functions keys, positioned on the front surface 14 and/or the rear surface 16. The device may further include input keys on the front surface 14 that generally correspond to directional keys, typical computer mouse input keys, etc. The user may interface with these input keys 24 to input data, including for example to type using the device 10. The user may actuate input keys 24 positioned on the rear surface 16 with the user's fingers 402. The user may actuate input keys positioned on the front surface 16 with the user's thumbs. The user may input data by moving/tilting the device 10 via one or more sensors 304. While such input of data is being performed with the device 10, the user may also support the device 10 by engaging the grip portions 18. As such, the user may preserve mobility, as the user generally will not need to support the device 10 on a surface, and the user may input data with both hands 400 while supporting the device 10.

The program code embodied in any of the applications described herein is capable of being individually or collectively distributed as a program product in a variety of different forms. In particular, the program code may be distributed using a computer readable media, which may include computer readable storage media and communication media. Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Communication media may embody computer readable instructions, data structures or other program modules. By way of example, and not limitation, communication media may include wired media such as a wired network or direct-wired connection, and wireless media such as acoustic, RF, infrared and other wireless media. Combinations of any of the above may also be included within the scope of computer readable media.

In general, embodiments of the invention may be utilized for inputting data to an electronic computing device. The curved design of embodiments of the invention facilitates user comfort and input key accessibility while supporting the data entry device by holding the device with the adjustable grips. Input keys may be configured on both a front surface and a rear surface of the device, where the input keys of the rear surface may include corresponding key indicators configured on the front surface such that the user may visually confirm actuation of a particular input key.

Moreover, in some embodiments, an application executing on an associated processor, whether remotely or locally, and/or operations being performed by the control circuitry may cause one or more specific key indicators to be activated in a first state to thereby instruct the user to actuate the one or more corresponding input keys, and based on whether the user actuates the correct one or more input keys, the one or more corresponding key indicators may change to a different state. In such embodiments, the device may train the user to accurately type using the input keys configured on the rear surface.

For example, key indicators may allow the user to see where the input keys are located on the rear surface of the device, and the user may locate the back-side keys using hand-eye coordination. The key indicators may activate, for example by illuminating, and have one or more modes of operation, such as different colors of illumination. A learning mode may assist the typist with learning to use the configuration of input keys on the device. In such mode, key indicators may illuminate to indicate which input key to press, and if an incorrect input key is pressed, the corresponding key indicator may illuminate red. If the correct input key is pressed, the corresponding key indicator may illuminate a different color, such as green. In an indicator mode may illuminate each key indicator as the corresponding input key is pressed. Additionally, the key indicators may illuminate in a first state for a low-light mode (e.g., night-time mode), and the key indicators may change to a second state responsive to an actuation of a corresponding input key. In other modes key indicators may not illuminate. Such modes may be implemented by instructions of an application executing on a processor associated with the device, and/or by operations performed by the control circuitry of the device.

In some embodiments, the executing application/performed operations may comprise a learning based game such that the user may learn the input key configuration and/or motion based input in a game setting. In general, a challenge to overcome may be getting users to commit sufficient time to learn the input key configuration. To overcome this challenge, one or more games with varying levels of complexity may be utilized to assist users with learning the input key configuration and/or motion detection input of the device. Utilizing a combination of application software and/or operations configured to be performed by the control circuitry and/or processor as well as key indicators, games may balance the skills associated with typing and mouse movement with game play.

In embodiments incorporating learning and/or game functions, the control circuitry and processor may communicate data therebetween. The processor may communicate data to the control circuitry to cause the control circuitry to activate one or more particular key indicators. The control circuitry may communicate input data generated using the input keys to the processor, and the processor may communicate response data to the control circuitry based on the input data. The response data may cause the control circuitry to activate one or more key indicators to thereby indicate to the user whether the correct input keys were actuated.

Embodiments consistent with the invention may be utilized to input data to a remote electronic computing device. In these embodiments, a user may input data via the input keys configured on the front and rear surfaces of the device while supporting the device by holding the grip portions. For example, the user may provide computer keyboard and/or computer mouse associated input data without necessarily supporting the device on a surface. Moreover, in some embodiments the device may dock with an electronic computing device, such that the device and docked electronic computing device may be utilized by the user while holding the device and docked electronic computing device via the grip portions.

Furthermore, with respect to smaller electronic computing devices, such as smart phones or tablet computers, embodiments of the invention may facilitate more comfortable data input for the user without necessarily sacrificing the mobility/portability of the electronic computing devices. In other embodiments, components generally associated with an electronic computing device (e.g., a processor, a memory, display, etc.) may be configured with the device, such that the device comprises a mobile electronic computing device that the user may interface with via the input keys and motion sensors without the need to place the device on a support surface.

It will be appreciated that certain aspects of the embodiments disclosed herein, including but not limited to the design of the housing, with or without input keys, grips and/or other components, may be ornamental, as well as functional. As such, inclusion of these ornamental aspects in the instant application should not be considered an admission of functionality of any of these ornamental aspects. In addition, it will be appreciated that any broken lines in certain drawings form no part of the designs illustrated in such drawings.

For example, FIGS. 12-19 illustrate a design for a data entry device in which the data entry device may be a stand-alone input peripheral. FIGS. 20-27 similarly illustrate a design for a data entry device in which the data entry device may be a stand-alone input peripheral. FIGS. 28-36 illustrate a design for a data entry device that may be docked to a mobile computing device. FIGS. 37-45 illustrate another design for a data entry device that may be docked to a mobile computing device. FIGS. 46-53 illustrate a design for a data entry device that may include a display, and FIGS. 54-61 illustrate another design for a data entry device that may include a display.

While the invention has been illustrated by a description of the various embodiments and the examples, and while these embodiments have been described in considerable detail, it is not the intention of the applicants to restrict or in any other way limit the scope of the appended claims to such detail. Additional advantages and modifications will readily appear to those skilled in the art. Thus, the invention in its broader aspects is therefore not limited to the specific details, representative apparatus and method, and illustrative example shown and described. Accordingly, departures may be made from such details without departing from the spirit or scope of applicants' general inventive concept.

What is claimed is:

1. A data entry device, comprising: a housing including: a front surface configured to face a user when the housing is supported by the user; first and second laterally separated grip portions disposed proximate opposing ends of the housing, each configured to engage with a hand of the user when the housing is supported by the user; and a rear surface including first and second generally concave portions that are configured to curve generally toward the hands of the user when the housing is supported by the user, the generally concave portions respectively disposed proximate the first and second laterally separated grip portions, the generally concave portions generally facing away from one another and facing away from the front surface and concave in an outwardly-facing direction with respect to the rear surface; and a split format keyboard disposed on the rear surface, the split format keyboard including input keys configured in a plurality of rows and positioned on each of the first and second generally concave portions of the rear surface, wherein each row in each of the first and second generally concave portions includes a plurality of input keys and is positioned in a different plane, the rear surface including an intermediate portion disposed intermediate the first and second generally concave portions, wherein first ends of each of the first and second generally concave portions proximate the intermediate portion are rearwardly offset from a plane extending between the first and second laterally separated grip portions further than second ends of each of the first and second generally concave portions proximate the first and second laterally separated grip portions, and wherein the plurality of rows includes at least three rows on each of the first and second generally concave portions of the rear surface between the intermediate portion and a respective laterally separated grip portion to reduce a difference in distances that fingers of a user reach in order to actuate input keys positioned on each of the first and second generally concave portions, and wherein the split format keyboard includes at least A-Z letter keys and 0-9 numerical keys disposed on the rear surface with a row in the first generally concave portion closest to the intermediate portion including a first portion of the 0-9 numerical keys and the at least three rows in the first generally concave portion including a first portion of the A-Z letter keys, and with a row in the second generally concave portion closest to the intermediate portion including a second portion of the 0-9 numerical keys and the at least three rows of the second generally concave portion including a second portion of the A-Z letter keys.

2. The data entry device of claim 1, further comprising:
key indicators positioned on a front surface of the housing, wherein the position of each key indicator on the front surface corresponds to a position of a corresponding input key on the rear surface.

3. The data entry device of claim 2, wherein each input key is configured to generate input data responsive to an actuation of such input key.

4. The data entry device of claim 3, further comprising:
control circuitry disposed in the housing and configured to receive input data from the input keys and selectively activate at least one key indicator.

5. The data entry device of claim 4, further comprising:
an input/output interface disposed in the housing and configured to communicate data, wherein the control circuitry is further configured to communicate data using the input/output interface based on the received input data.

6. The device of claim 5, wherein the input/output interface includes wireless data transceiving circuitry.

7. The device of claim 6, wherein the wireless data transceiving circuitry comprises Bluetooth compatible transceiving circuitry.

8. The device of claim 5, wherein the input/output interface includes wired data transceiving circuitry.

9. The device of claim 5, further comprising:
at least one motion sensor disposed in the housing and configured to generate input data based at least in part on motion detected with the at least one motion sensor.

10. The device of claim 4, wherein the control circuitry is configured to selectively activate at least one key indicator based on the input data.

11. The device of claim 4, wherein the control circuitry is configured to activate the key indicators in a first state and change at least one key indicator to a second state based on actuation of at least one input key.

12. The device of claim 1, wherein the housing includes a front surface including a generally concave portion, the data entry device further comprising:
a dock positioned on the front surface of the housing proximate the generally concave portion and configured to electrically and mechanically couple an electronic device to the housing.

13. The device of claim 1, further comprising:
a grip removably coupled to each grip portion of the housing.

14. The device of claim 13, wherein each grip is adjustable relative to the housing.

15. The device of claim 13, wherein the grips are a contrasting color relative to the housing.

16. The device of claim 13, wherein the grips are selected from a set of differently sized grips.

17. The device of claim 1, further comprising:
a display coupled to the housing.

18. A computing device comprising: a housing including: a front surface configured to face a user when the housing is supported by the user; first and second laterally separated grip portions disposed proximate opposing ends of the housing, each configured to engage with a hand of the user when the housing is supported by the user; and a rear surface including first and second generally concave portions that are configured to curve generally toward the hands of the user when the housing is supported by the user, the generally concave portions respectively disposed proximate the first and second laterally separated grip portions, the generally concave portions generally facing away from one another and facing away from the front surface and concave in an outwardly-facing direction with respect to the rear surface; a split format keyboard disposed on the rear surface, the split format keyboard including input keys configured in a plurality of rows and positioned on each of the first and second generally concave portions of the rear surface, wherein each row in each of the first and second generally concave portions includes a plurality of input keys and is positioned in a different plane, the rear surface including an intermediate portion disposed intermediate the first and second generally concave portions, wherein first ends of each of the first and second generally concave portions proximate the intermediate portion are rearwardly offset from a plane extending between the first and second laterally separated grip portions further than second ends of each of the first and second generally concave portions proximate the first and second laterally separated grip portions, and each input key is configured to generate input data responsive to an actuation of such input key, wherein the plurality of rows includes at least three rows on each of the first and second generally concave portions of the rear surface between the intermediate portion and a respective laterally separated grip portion to reduce a difference in distances that fingers of a user reach in order to actuate input keys positioned on each of the first and second generally concave portions, and wherein the split format keyboard includes at least A-Z letter keys and 0-9 numerical keys disposed on the rear surface with a row in the first generally concave portion closest to the intermediate portion including a first portion of the 0-9 numerical keys and the at least three rows in the first generally concave portion including a first portion of the A-Z letter keys and with a row in the second generally concave portion closest to the intermediate portion including a second portion of the 0-9 numerical keys and the at least three rows of the second concave portion including a second portion of the A-Z letter keys; key indicators positioned on the front surface, wherein the position of each key indicator on the front surface corresponds to a position of a corresponding input key on the rear surface; control circuitry supported by the housing and configured to receive input data from the input keys and selectively activate a key indicator based on the received input data; a processor disposed in the housing and connected to the control circuitry; and memory.

19. The device of claim 18, further comprising:
program code stored in the memory and configured to be executed by the processor to cause the processor to communicate data to the control circuitry to thereby cause the control circuitry to selectively activate a particular key indicator to a first state, receive input data generated by a particular input key from the control circuitry, analyze the received input data to determine whether the particular input key corresponds to the particular key indicator, and communicate data to the control circuitry based at least in part on whether the particular input key corresponds to the particular key indicator.

20. The device of claim 18, further comprising:
a display coupled to the housing and connected to the processor.

\* \* \* \* \*